(12) United States Patent
Baum

(10) Patent No.: US 7,548,893 B2
(45) Date of Patent: Jun. 16, 2009

(54) SYSTEM AND METHOD FOR CONSTRUCTING COGNITIVE PROGRAMS

(76) Inventor: Eric Baum, 41 Allison Rd., Princeton, NJ (US) 08540

(*) Notice: Subject to any disclaimer, the term of this patent is extended or adjusted under 35 U.S.C. 154(b) by 0 days.

(21) Appl. No.: 11/811,067

(22) Filed: Jun. 7, 2007

(65) Prior Publication Data

US 2007/0245295 A1 Oct. 18, 2007

Related U.S. Application Data

(63) Continuation-in-part of application No. PCT/US2005/043604, filed on Dec. 1, 2005, which is a continuation-in-part of application No. 11/285,937, filed on Nov. 23, 2005, now Pat. No. 7,437,335.

(60) Provisional application No. 60/671,660, filed on Apr. 15, 2005, provisional application No. 60/633,959, filed on Dec. 7, 2004.

(51) Int. Cl.
G06F 15/18 (2006.01)
G06F 7/76 (2006.01)
G06N 3/00 (2006.01)

(52) U.S. Cl. .......................... 706/12; 706/13
(58) Field of Classification Search .................. 706/12, 706/13
See application file for complete search history.

(56) References Cited

U.S. PATENT DOCUMENTS

| | | | |
|---|---|---|---|
| 4,935,877 A | 6/1990 | Koza | |
| 5,136,686 A | 8/1992 | Koza | |
| 5,148,513 A | 9/1992 | Koza et al. | |
| 5,343,554 A | 8/1994 | Koza et al. | |
| 5,390,282 A | 2/1995 | Koza et al. | |
| 5,485,601 A | 1/1996 | Ching | |
| 5,742,738 A | 4/1998 | Koza et al. | |
| 5,790,760 A | 8/1998 | Arima et al. | |
| 5,867,397 A | 2/1999 | Koza et al. | |
| 5,870,303 A | 2/1999 | Trovato et al. | |
| 6,058,385 A | 5/2000 | Koza et al. | |
| 6,360,191 B1 | 3/2002 | Koza et al. | |
| 6,424,959 B1 | 7/2002 | Bennett, III et al. | |

(Continued)

OTHER PUBLICATIONS

Baum, "Toward a Model of Intelligence as an Economy of Agents", 1999.*

(Continued)

*Primary Examiner*—David R Vincent
*Assistant Examiner*—Nathan H Brown, Jr.
(74) *Attorney, Agent, or Firm*—Lerner, David, Littenberg, Krumholz & Mentlik, LLP

(57) ABSTRACT

The present invention is directed to a method to search for a solution to a problem in a domain. The method may comprise obtaining a plurality of agents each operable to produce one or more numerical bids and to propose one or more actions and a plurality of nodes each representing a state of the domain; automatically selecting a respective agent and a respective node based on a bids from the plurality of agents; and automatically adding a new node representing a new state which is obtained by applying to the state represented by the selected node an action proposed by the selected agent. The plurality of nodes may each have a depth associated therewith and the respective agent and the respective node may be selected regardless of the depth associated with the selected node.

21 Claims, 27 Drawing Sheets

U.S. PATENT DOCUMENTS

| | | |
|---|---|---|
| 6,532,453 B1 | 3/2003 | Koza et al. |
| 6,564,194 B1 | 5/2003 | Koza et al. |
| 6,658,645 B1 | 12/2003 | Akuta et al. |
| 2004/0158355 A1 | 8/2004 | Holmqvist et al. |

OTHER PUBLICATIONS

Eric B. Baum, A Bradford Book, The MIT Press, Cambridge, MA, London, England, "What is Thought?", 2004 MIT, pp. 215-269.

Eric B. Baum et al., "What Size Net Gives Valid Generalization?" MIT Press 1989, pp. 81-90.

Eric B. Baum et al., NEC Research Institute, Evolution of Cooperative Problem-Solving In An Artificial Economy Feb. 28, 2000, pp. 1-24.

Jurgen Schmidhuber, Machine Learning, 54, 211-254, 2004, "Optical Ordered Problem Solver" 2004 Kluwer Academic Publishers, Manufactured in The Netherlands.

Jurgen Schmidhuber, "Optimal Ordered Problem Solver", Technical Support IDSIA-12-02, Version 2.0, Dec. 23, 2003, pp. 1-43.

Juregen Schmidhuber, Advances in Neural Information Processing Systems 15, NIPS'15, MIT Press, Cambridge MA, 2003, in press. "Bias-Optimqal Incremental Problem Solving" (9 pages).

Jurgen Schmidhuber, Advances in Neural Information Processing Systems 15, NIPS'15, MIT Press, Cambridge MA, 2003, in press. "Bias-Optimal Incremental Problem Solving" (9 pages).

Nilsson, "Artificial Intelligence: A New Synthesis," 1998, pp. 62-63.

Dongkyu Choi and Pat Langley, "Learning Teleoreactive Logic Programs from Problem Solving", vol. 3625/2005, pp. 51-68.

Valiant, "A Neuroidal Architecture for Cognitive Computation", Journal of the ACM, 47(5): 854-882 Sep. 2000.

Valiant, "Robust Logcs", Artificial Intelligence 117; 231-253 (2000).

Eric B. Baum, "Focused Web Crawling using an Auction-based Economy", ACM Journal Name, V(N):Oct. 1-22, 2002.

Stuart Russell and Peter Norvig, "Artificial Intelligence: A Modern Approach", Prentice Hall of India, pp. 375-461 (2007).

Eric B. Baum, et al., NEC Research Institue, "An Evolutionary Post Production System" pp. 1-8 (2000).

Eric B. Baum, NEC Research Institute, "Manifesto For An Evoultionary Economics Of Intelligence" pp. 1-60 (1998).

Andreas Junghanns and Jonathan Schaeffer, "Sokoban: A Case-Study in the Application of Domain Knowledge in General Search Enhancements to Increase Efficiency in Single-Agent Search", 1-37 (2000).

Jurgen Schmidhuber, et al. IDSIA, galleria 2, 6928 Manno-Lugano, Switzerland "Bias-Optimal Incremental Learning Of Control Sequences For Virtual Robots" (2002).

Jonsson et al., Ari, "Planning in Inteplanetary Space: Theoryand Pratice", 2000.

* cited by examiner

A wins

A wins

B wins

B wins

B wins

B wins

SYSTEM AND METHOD FOR CONSTRUCTING COGNITIVE PROGRAMS

CROSS-REFERENCE TO RELATED APPLICATIONS

The present application is a continuation-in-part of International Application No. PCT/US05/43604, filed on Dec. 1, 2005, published on Jun. 15, 2006, which is a continuation-in-part of U.S. patent application Ser. No. 11/285,937, filed on Nov. 23, 2005, which claims the benefit of the filing dates of U.S. Provisional Application No. 60/671,660 filed on Apr. 15, 2005, and U.S. Provisional Application No. 60/633,959 filed Dec. 7, 2004. The disclosures of each of the preceding applications are hereby incorporated by reference.

FIELD OF THE INVENTION

The present invention is directed to a method and system for creating a program to solve a problem. More specifically, the present invention is directed to a method and system for generating a program that can learn from one problem so that its performance on other problems is enhanced.

BACKGROUND OF THE INVENTION

There has been extensive research in the field of computer programming to automatically design or evolve computer programs operable to solve problems posed as design specifications, or to solve the closely related problems of automatically designing or evolving complex systems, such as circuits, that satisfy posed requirements. Methods such as genetic programming, evolutionary programming, and other variants may be applied to such problems. In such methods, a user would supply a set of algorithm specifications that determine the form the algorithm is to take, such as an instruction set, initial programs written using the instruction set, an environment for the program, a fitness measure, major and minor parameters for the particular evolutionary algorithm chosen, decisions on whether to incorporate certain methods, and a termination condition.

Then an iterative process may be followed to search through the space of possible programs looking for a program that may satisfy the design constraints entered by a user. Typically, this occurs in a number of steps. First, if initial programs were not supplied, an initial set of programs are created by a random process. Then the initial set (or "population") of programs are typically executed in the environment; their fitness is assessed; new programs are produced out of the old ones (by methods such as crossover and mutation); these new programs are added to the population and some existing less fit programs may be eliminated. Such a process is iterated until the termination condition is satisfied. It has been observed that such processes (the details of which depend on the algorithmic specifications) tend to produce fitter programs over time, sometimes resulting in a program that satisfies the design constraints.

Although there has been extensive research on this field, the economic impact of such methods to date may be considered disappointing. This may be for the following reasons: first, the search space is too large, and second, the fitness landscape is too irregular.

The search space is the space of programs that can be built over the instruction set respecting any architectural or typing constraints that are imposed. The methods are attempting to evolve through this space by finding increasingly fitter programs until they find one satisfying the design conditions. But the number of programs that can be built is typically truly vast. For example, if there are ten possible instructions in the instruction set (and often there are hundreds), the number of possible programs that are only 100 instructions long (and this would be a fairly short program) would be $10^{100}$. These methods may thus be seen as attempting to find a needle in an unimaginably large haystack. Moreover, it is often the case that a modification of a program may create another program whose fitness is largely uncorrelated with the first, which makes it hard to evolve smoothly.

Biological evolution used a seemingly related process to design creatures, possibly ultimately resulting in human intelligence. But evolution used 4 billion years. Published estimates indicate that something in the neighborhood of $10^{35}$ creatures have lived and died, each potentially contributing to evolution. Each of these may be considered analogous to a candidate program in a run of a genetic or evolutionary programming algorithm. However, it is not common for genetic programming experiments to evaluate as many as $10^8$ candidate programs and it is hard to foresee any computers within the next 20 years that would allow use of many as $10^{20}$. The number of candidates that can be considered in evolutionary or genetic programming runs drops sharply when the evaluation of fitness is complex or requires interaction with real world processes outside of a computer simulation, to the point where considering $10^4$ candidates may become prohibitively expensive or time consuming for many problems of practical interest. For those fitness evaluation procedures that require human interaction (which might be useful or necessary for many practical problems, such as a recommended system or a user interface that evolves to fit the preferences of an individual user), the number of candidates that may reasonably be considered can drop into double or even single digits.

Typically, restrictions on the architecture of programs that can be evolved in genetic or evolutionary programming are often undesirable, because, given a particular set of restrictions, it may be difficult to know a priori that a program solving one's problem may even exist in the search space. Thus many of the methods are directed toward increasing the flexibility of the programs that can be discovered to ensure that some program is in principle discoverable that would solve the problem. But by expanding the flexibility of the programs that can be discovered, the search space is further enlarged, which may make it even harder to find a solution. Moreover, the methods may have missed a critical feature that may have greatly aided biological evolution in designing such powerful creatures. Such methods may deal with one environment, one fitness measure, one termination condition at a time. They are proposed, and applied, as a means to deal with one problem at a time. They do not extract, store, and utilize data that enables them to perform better as evolution methods on later different problems. But evolution faced a long series of different problems, having different environments, fitness measures, and data. It may have made cumulative discoveries that facilitated later progress, including facilitating its ability to rapidly evolve to solve new and different problems. For example, evolution may have discovered gene networks of Hox genes, facilitating the construction of certain kinds of body types. Then evolution may have been free to experiment with higher level constructions, such as adding legs, or lengthening legs, or rearranging body plans in a macroscopic fashion. That is, once evolution had created sub-routines for performing certain kinds of constructions, experimentation with rearrangements of relatively large, meaningful parts may have been facilitated, corresponding to a faster, more meaningful search of program space. The same genetic circuitry that evolved for one reason in one creature, facing one environment and set of problems and data, was later rearranged and slightly modified to solve new problems in new environments in other creatures. Often modules produced for solving one problem were re-utilized, in modified fashion, to solve other entirely different ones.

Genetic programs produce hierarchic programs monolithically from one environment. This greatly limits them because the search space for very complex problems is much too vast to be so solved, so that in practice genetic programming can only solve relatively small problems.

The basic problem is that new program discovery may inherently only be possible for programs of a certain small size, because for larger problems the search spaces become too big, and the computational complexity of finding successful programs too large. To solve deep problems, it may be necessary to make cumulative progress, discovering a series of powerful modules that solve intermediate problems, and building a solution to a deep problem on these modules.

SUMMARY OF THE INVENTION

The methods presented herein generate far more powerful means of creating programs and complex structures that address the above problems. A system is described that can learn from one problem so that its performance on other problems is enhanced, leading to cumulative progress. The invention provides for finding compact or constrained enough programs so that the programs will generalize to new examples, and to new classes of examples. A new method of communicating with the computer or the evolutionary system is provided, by which concepts and sub-concepts can be independently trained from examples or supplied fitness functions. This provides additional data, as well as structure, to guide the evolution process.

Additionally, a set of so-called computational scaffolds and modules are provided, for use by the system, that may be analogous to some of the major discoveries made by biological evolution in constructing minds. The "scaffold" is a new program construction that is like the traditional notion of a procedure, but contains extra structure useful for constructing programs that will be fed to the procedure as arguments. For example, scaffolds may contain annotations specifying what type of data should be used to evolve programs that are fed to the scaffold as arguments, or may contain annotations specifying what classes of instructions are to be used in evolving programs fed to arguments (or fed to arguments of) the scaffold.

In some contexts, scaffolds may be thought of as procedures with an additional ability, that of calling an evolutionary programming module to solve some sub-problem or problems, and then specifying how the results are to be combined. In this way, scaffolds may direct genetic or evolutionary programming to tractable subproblems, and specify how the results serve to solve larger problems of interest.

Such scaffolds and modules may be immediately employed by the evolutionary framework, thus short-cutting the massive computation that would be needed to discover them. These scaffolds and modules thus short-cut the massive resources evolution brought to the development of intelligence, and thus may massively cut the amount of evolutionary exploration necessary to solve new problems.

These concepts may be employed in two aspects. In one aspect, they form a method for the automatic design of computer programs or complex structures. In an alternative embodiment, however, the invention is a tool for Computer Assisted Design, greatly expediting human abilities to produce programs solving new problems, and offering new modalities for humans to accomplish this task.

In one aspect of the present invention, a method of creating a program to solve a problem pertaining to a first task is provided which may comprise the steps of: receiving user input data from an operator pertaining to a second task, in which the second task is different from the first task; automatically obtaining a number of subprograms based on the received user input data; and creating the program based on the obtained subprogram or subprograms.

In another aspect of the present invention, a method of solving a problem pertaining to a first task is provided which may comprise the steps of: creating a program by receiving user input data from an operator pertaining to a second task different from the first task, automatically obtaining a number of subprograms based on the received user input data, and creating the program based on the obtained subprogram or subprograms; inputting data pertaining to the first task; and using the data pertaining to the first task in the created program so as to solve the problem.

In another aspect of the present invention, a system for creating a program to solve a problem pertaining to a first task is provided. The system comprises: a receiver operable to receive user input data from an operator pertaining to a second task different from the first task; an obtaining circuit operable to automatically obtain a number of subprograms based on the received user input data; and a creating circuit operable to create the program based on the obtained subprogram or subprograms.

In another aspect of the invention, a system for solving a problem pertaining to a first task is provided. The system comprises: a program device operable to create a program, the program device including a receiver operable to receive user input data from an operator pertaining to a second task different from the first task, an obtaining circuit operable to automatically obtain a number of subprograms based on the received user input data, and a creating circuit operable to create the program based on the obtained subprogram or subprograms; a device operable to enable data to be inputted pertaining to the first task; and a circuit operable to use the inputted data pertaining to the first task in the created program so as to solve the problem.

Additionally, the invention may provide an apparatus and method by which the evolution of programs can be guided so that they robustly solve complex domains, achieve design constraints or provide useful functions, or construct complex structures, achieve design constraints or provide useful functions, and provides tools to facilitate the process of creating such programs and structures. A process of creating a program to robustly solve problems in a complex domain first creates modules that compute useful sub-concepts and then uses them in creating the program. An aspect of this creation process, is that some or all of the modules as well as the final program may be independently evolved, learned, or automatically created so as to perform well on supplied examples or as measured by supplied fitness functions or measuring programs. Thus, the programmers, in addition to creating modules and programs in ways familiar to artisans, can teach the computer to learn sub-concepts by providing examples of the sub-concepts or environments in which sub-concepts can be evolved. Moreover, if sub-concepts prove too hard to be learned from the provided examples, the learning can be further facilitated by providing examples of sub-sub-concepts useful in the computation of the sub-concepts, and so on.

This process may rely on a component called a module constructor that may take as inputs a collection of examples and an objective function, or some other means of supplying a fitness function, and/or a set of instructions, and returns a program that approximately optimizes the objective function run on the examples, or finds a sufficiently fit function, or else reports that it failed.

The module constructor may be first applied to sub-concepts. It may return programs computing the sub-concepts, and names invoking these programs may then be added as instructions to the instruction set. The module constructor may then be run to produce the overall program. If the module constructor fails to produce a desired concept or program, it can be applied recursively to generate other sub-concepts facilitating the construction of the concept or program.

As will be detailed, module constructors can be readily embodied using techniques or variants of techniques such as genetic programming, although other techniques may offer advantages in certain cases. Although genetic programming has been previously described, the use of a component or a function like a module constructor, that can be called by computer programs or utilized as a component within machines is presented as is the use of it recursively to construct sub-concepts from independently supplied data.

Several varieties of module constructors are disclosed that have different advantages, or are tailored for particular types of environments or module construction problems. For example, module constructors are described that may construct programs that perform a focused and efficient search over alternatives. There are many design problems which would be very hard if not impossible to solve without search, for example problems such as playing chess. While methods for evolving programs may have been proposed, methods for evolving programs that efficiently search in particular domains are novel.

Another aspect of the invention is the use of scaffolds. A scaffold may be defined as a procedure, with arguments, together with additional structure, in the form of data or annotations that can be used to suggest or constrain which instructions or modules or scaffolds should be fed to it, or evolved, or created, for which of its arguments. Scaffolds may also call module constructors.

In programming, procedures or modules or subroutines may be created or invoked that take arguments. If typing is employed, procedures may provide some guidance as to which instructions or modules should be supplied as their arguments, in that the instructions supplied as arguments may need to have the appropriate type. Such typing information has been used in genetic programming. Scaffolds, however, allow the provision of much more structure, which can guide creation or automatic creation or evolution of programs. For example, scaffolds may give data allowing or facilitating arguments to be separately evolved, including data indicating which instruction sets should be used in such evolutionary programming, or which separate objective functions and examples should be used in such evolutionary programming, or which specialized module constructors should be used in such evolutionary programming. Scaffolds may reach inside immediate arguments, giving data useful for specifying the evolution or creation of sub-programs fed as arguments to programs fed as arguments to the scaffold. Scaffolds may facilitate a sequence of evolutions, in which programs are evolved that are fed as arguments to an evolution process that is fed as an argument into the scaffold.

For many applications, it may be impractical to apply genetic programming or other evolutionary programming methods directly to find a program or a structure satisfying the given design specifications, for example because the search space is too vast. But it may be possible to write a program calling named sub-concepts, and giving a description of the sub-concepts, which would, if the programs implementing the sub-concepts could be written, solve the problem. This program may be supplied as a scaffold that calls module constructors to discover programs implementing the sub-concepts. In this way, a problem too large for practical application of genetic programming may be reduced to a tractable application of genetic or evolutionary programming, or a series of tractable applications of genetic or evolutionary programming, or a combination of tractable problems of ordinary and genetic or evolutionary programming. Note that in this way, genetic programming problems involving one particular fitness function or set of design constraints may be reduced to other genetic programming problems involving other fitness functions or design constraints, which may be much simpler or more practical to solve. Alternatively, it may be possible to specify an evolutionary programming problem, where the evolved program is allowed to call as basic instructions, modules implementing sub-concepts, such that if code implementing the sub-concepts could be written, the evolved program would suffice to solve the design problem. Such problems may be solved by creating a scaffold, which then calls for producing the sub-concepts using separate runs of evolutionary programming, and then solving the evolutionary programming problems in the specified order. For many problems, the associated procedures may be of broad applicability, so that the scaffold may be applied to different problem domains simply by redoing some of the embedded genetic programming runs in the new domain.

Several particular scaffolds are also described that may be useful for solving various kinds of problems. Some such scaffolds have been hand coded to emulate a function of human reasoning. For example, scaffolds for Dividing up Problems into a collection of Causes, Relevance Based Planning (RBP), and Graph Based Reasoning (GBR) will be described. Such scaffolds may contain a complex procedure that may require several arguments to be supplied prior to the proper operation thereof. The procedure itself may be so complex, that it is highly unlikely that genetic programming would ever discover it using feasible computational resources. However, the problems of finding the procedures to be supplied as arguments may be tractable using Genetic Programming, or other Module Constructors, or alternatively the scaffold may supply sufficient guidance to allow construction of these programs, for example by allowing them to be trained from separate data to the whole problem, and by restricting the instruction sets used in their construction.

Another aspect of the invention is a tool to facilitate the program construction process called the computer aided design (CAD) tool. The CAD tool may allow programmers to enter instructions, examples, objective functions, satisfaction criteria, and/or other data or programs useful for producing modules, scaffolds, or the overall program, to apply the module constructor as appropriate, and to organize modules and scaffolds into bigger programs. When modules have been created (for example, using a module constructor) the CAD tool may make the names of these modules available, so that a programmer may use them as instructions in programs that he/she hand-crafts, or so that module constructors may use them in other constructions. The CAD tool may also report when construction of a module or program has failed, allow recursive construction of sub-modules to facilitate construction of the module, and keep track of recursive nesting of such constructions. The CAD tool may contain a library of previously constructed useful modules or scaffolds (such as the RBP module and the GBR module) and make them available as appropriate both to the module constructor and human programmers.

One component of the CAD tool may be an apparatus or computer program that implements a module constructor, that is that takes as inputs a collection of examples, an objective function, and/or a collection of instructions and returns a program that approximately optimizes the objective function run on the examples, or else reports that it failed. In fact, the CAD tool may contain several different kinds of module constructors, particularly appropriate to different module construction problems.

The CAD tool may act as an Interpreter or a Compiler for a programming language, with the additional aspects that it may invoke a library of scaffolds, and may invoke processes for building programs using scaffolds, and may invoke module constructors, and may support the specification of modules by means of invoking a module constructor, and may learn from attempted program constructions to better construct programs on future problems.

The CAD tool may also maintain a data structure containing or listing modules, scaffolds, and instructions that have already been constructed, and thus are available for construction of new modules or programs. This library, containing known useful scaffolds, can vastly extend the power of the system to discover programs solving new design specifications. These instructions and scaffolds may be labeled and annotated in ways that facilitate the construction of new programs, for example allowing specification of which instructions should be used in which module construction. Including the right sets of instructions can guide module construction so that it becomes tractable in regions where it would otherwise be intractable, for example because the search space can be greatly narrowed. Moreover, data useful for suggesting appropriate later use of instructions and facilitating module construction for later problems may be learned from previous problems.

When module construction fails, the CAD tool may allow the programmer to make modifications and run the module constructor again. In particular, the CAD tool may allow the programmer to construct sub-concepts useful to constructing the module. If construction of the sub-concept also fails, the CAD tool may allow the programmers to construct sub-sub-concepts useful to constructing the sub-concept, and so on. The CAD tool may keep track of all such recursions, facilitating programmers in guiding the construction of the program.

The CAD tool facilitates a means of communicating with computers, in which humans can guide computers to solve problems or to construct programs or to build structures by means including supplying examples of concepts and choosing from menus of scaffolds and procedures.

By use of the concepts provided in this invention, the building of a CAD tool may be accomplished by applying techniques associated with compiler and interpreter design in a way that may be familiar to those skilled in the art of programming.

In another aspect of the invention, statistics or scores may be kept on which instructions or modules or scaffolds are useful in the automatic creation of new concepts, so that the module construction process may be made more efficient by preferentially using higher scoring instructions, modules, or scaffolds and by removing from consideration instructions, modules, or scaffolds that prove not useful.

In another aspect of the invention, the process or CAD tool may keep statistics and scores on which mutation and modification operators have been used in successful module or scaffold constructions, and automatically evolve or automatically recommend using high scoring modification and mutation operators, so as to improve the module or scaffold construction process over time.

Another aspect of the invention is a method to automatically assign data to instructions and use the encoded data automatically to facilitate construction of new programs. For example, the method may assign data to instructions that may be used in later program constructions to choose promising orderings or classifications of instructions. This data can be independently evolved and evaluated, thus factoring the problem of finding useful instructions and learning how to use them efficiently. For example, this data can take the form of automatically assigned labels that may indicate when an instruction may appropriately be employed.

Each of these methods of learning how to better produce programs may extract and apply information from a solution of one problem, with one goal or design specification, to the solution of other problems, which may have entirely different goals or design specifications, and may run in different environments.

These may have applications to virtually any complex domain. Particularly appropriate are domains that can be simulated, so that a program can be built and its effects can be tested, and the module constructor can get rapid feedback on numerous examples so that it can use interaction with the simulation to learn powerful sub-concepts. Examples of such applications include flying an airplane (particularly if the program is first trained on a flight simulator), scheduling complex tasks such as running factories, computer design of complex components such as chip layout, playing games such as Go or video games, where, for example, programs may be constructed to control computer entities playing against humans in a much more natural and powerful way than ordinary game algorithms, controlling robots or vehicles, giving advice to humans in conducting battles, practicing medicine, strategic planning, and/or trading financial instruments. For example, programs produced in this way could look over the shoulders of pilots or doctors and advise if a serious error were present. It may typically be true that the program evolution process may be computationally intensive, but the final program may be relatively fast. Thus this method is also particularly appropriate for applications where intelligent decisions or control have to be made faster than humans are capable of doing well, such as flying an airplane in combat or controlling routing and packet switching on a network or the Internet.

In many applications the examples supplied to the module constructor may take the form of a simulation environment, and problems to be solved within the simulation environment, and the instructions supplied to the module constructor may include instructions that perform simulated actions. The module constructor may then attempt to produce a program that solves the simulated problems. For example, the simulation environment might include a program for simulating the flight of an airplane, and the problems might include landing safely in various simulated airports and weather conditions, and the instruction set might include a set of instructions moving ailerons up and/or down and applying thrust and so on, and the module constructor may then attempt to construct a program or programs solving the posed landing examples.

Note that since the inputs to recursive calls of Construct Program used to construct modules independently request inputs, one simulation environment might be used to train a module which may then be included as an instruction inside a program that is evolved to solve problems in an entirely different environment.

In particular, the CAD tool and the methods of the present invention may be applied to any environment or application to which genetic programming could be applied. In order to apply the methods of genetic programming, one may need a certain amount of structure, which is enough structure to enable module constructors to work. However, it will usually be true that problem domains that one might consider addressing with genetic programming may be solved more easily. And for, larger examples or for more complex environments or structures, the methods of the present invention may be applied to break huge and intractable program evolution problems up into manageable chunks.

In another aspect of the present invention, a method to search for a solution to a problem in a domain is provided. The method may comprise obtaining a plurality of agents each operable to produce one or more numerical bids and to propose one or more actions and a plurality of nodes each representing a state of the domain; automatically selecting a respective agent and a respective node based on a bids from the plurality of agents; and automatically adding a new node representing a new state which is obtained by applying to the state represented by the selected node an action proposed by the selected agent. The plurality of nodes may each have a depth associated therewith and the respective agent and the respective node may be selected regardless of the depth associated with the selected node. In such situation, the depth associated with the selected node may not be adjacent to the depth associated with the most recently added node. Alternatively, the selected node may not be the most recently added node.

DETAILED DESCRIPTION OF THE INVENTION

The present invention is directed to processes that may allow and facilitate construction of programs and complex structures that may satisfy presented design constraints or that serve useful functions in supplied domains or environments. An element of the present invention is the use within programming of instructions that call for module constructors which may be called by a program, to solve a presented design problem. By providing a compiler and an interpreter and languages that incorporate such instructions, users may be allowed to interact with computers in new ways. They can not only program computers, but they can create submodules within such programs by supplying examples of concepts to module constructors. In fact, if they choose, they need not program at all, but can guide computers to solve problems by providing a series of examples of sub-concepts and concepts.

This new ability may allow many complex design problems to be solved that were not solvable by other evolutionary and automatic methods alone, by dividing up the problem of solving the design problem using a program that computes using input from solving a number of different design problems.

Before discussing the details of the present invention, an overview of how the present invention works will be described below with regard to FIG. 26.

Figure 26A:
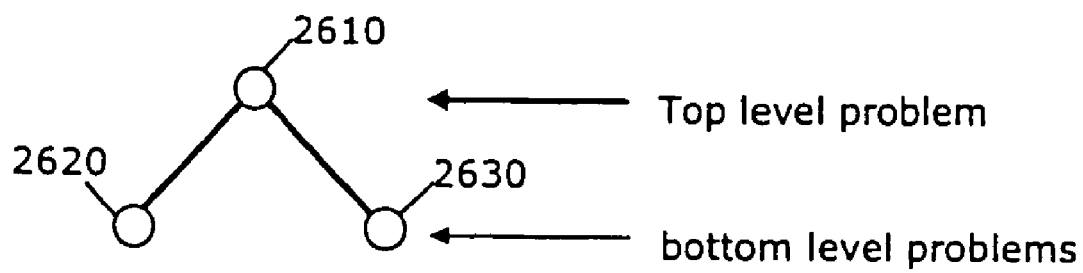
FIGS. 26a-b are schematics that illustrates some important aspects of the invention, with FIG. 26a representing a program that has been created and FIG. 26b representing various methods for constructing the program.
Figure 26B:
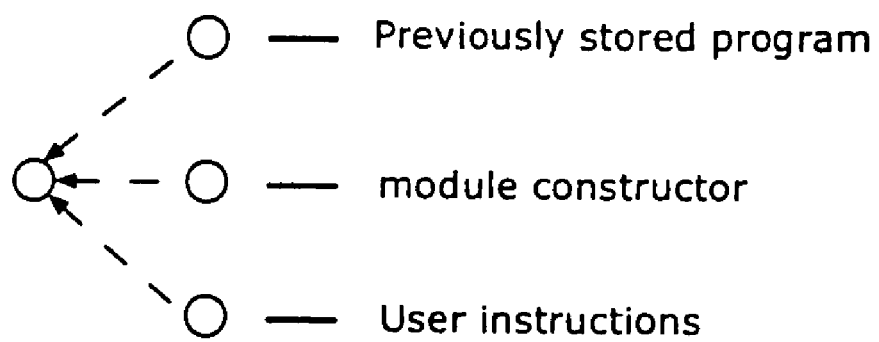

FIG. 26a represents a program that has been created, or alternatively may be under construction, to solve a problem, which we call the top level, first level, or higher level problem. Programs often have a hierarchic structure, such as represented in FIG. 26a. The present invention may utilize methods that allow problems to be broken up into a collection of subproblems, so that subprograms may be constructed using different specifications, objective functions, or parameters, and then assembled into the finished product. Thus 2610, 2620, and 2630 represent subprograms or modules.

As illustrated in 26b, each of the subprograms in FIG. 26a may be constructed in one of three ways. It may be chosen from a stored set or library of modules or scaffolds. Alternatively, it may be constructed by a module constructor that may assemble it to optimize or satisfy objectives or specifications that may be different from the top level objectives or specifications. The module constructor may assemble a subprogram or module automatically or the assembly might require some or minimal user input. Alternatively, it may represent new code entered by a user.

For example, consider the problem of constructing a program to estimate the number of oranges that would fit in a room. A system for program construction might contain a subprogram, called a scaffold, that could be substituted in at the top level, in position 2610. The scaffold in position 2610 would ask that a program to compute the number of oranges that could fit in a box be constructed and substituted in at position 2620, ask that a subprogram to compute the number of boxes that could fit in a room be constructed and substituted in at position 2630, and would then multiply the products of the numbers returned by the subprograms at positions 2620 and 2630 in order to estimate the number of oranges that might fit in the room. In this way, such a system might reduce the top level problem, of constructing a program that computes the number of oranges that fit in a room, into different problems which may be easier to solve.

While this example is very simple, note that practical problems often require construction of a program that will work in a variety of situations. In this example, the top level goal may be a program that would accurately estimate from the output of a digital camera the orange holding capacity in a variety of chambers. Even in this simple example, collecting such data might be much more difficult than collecting data to solve the subproblems.

The detailed specifications indicates how a library of scaffolds may be supplied that may apply to a variety of problems and greatly facilitate construction of programs solving them.

Evolutionary programming may refer to any method that starts with a collection of instructions, functions, or other components out of which a computer program can be built, and a procedure for evaluating the fitness or utility of a program, and returns a program judged sufficiently fit or a failure condition, implying that it was unable to generate a sufficiently fit program. Genetic programming may be a kind of evolutionary programming. Evolutionary programming procedures often work by beginning with a working set of one or more candidate programs, and then iterating the process of evaluating the fitness of candidate programs, creating new candidates by modifying one or more existing candidates in some way, evaluating the fitness of the new candidates, and replacing one or more candidates in the working set with new candidates if they are sufficiently fit.

One may think of evolutionary or genetic programming as a black box, a computer program, or a machine. To use this box, one may supply a number of inputs, such as an instruction set out of which programs can be built, and a fitness measure which specifies which programs more nearly achieve design goals than others. The box may then return a program satisfying the design criteria, or else may report that it is unable to discover a satisfactory program, for example within a given time constraint.

An input to such genetic or evolutionary programming is the fitness measure, which is supplied to the machine and guides it to satisfy design considerations. In most embodiments, fitness of programs may be evaluated by supplying an objective function, and a set of inputs to the programs, together with desired outputs, or a set of inputs together with constraints the outputs are to respect, or by supplying a means of generating inputs such as a program that outputs a randomized (but not necessarily uniform) distribution of inputs, together with constraints the outputs are to respect. The objective function combines the performance of the program on the various examples to arrive at a single numerical evaluation or score of the program. The objective function may typically consider programs to have a higher score if they solve more of the examples, use a shorter program, solve the examples in less time, and/or use less memory.

The instruction set may be a collection of all instructions, functions, procedures, etc. out of which an evolutionary programming procedure is allowed to build programs.

Modules, subroutines, subprograms or procedures may be isolated chunks of computer code that may take arguments and may be called by name within computer programs or modules, thus allowing one or more of them to be readily composed with any number of other modules or code into larger computer programs. So once modules have been created, they may be added to instruction sets for constructing later programs.

Concepts or sub-concepts may be modules that satisfy some design constraints. For example, if we were interested in producing a program to plan movements in a two dimensional region, it might be useful first to have a module that recognizes barriers, which may be a collection of obstacles that separate the region into two disconnected pieces, and a module that when invoked pushes one or more obstacles out of the way, connecting the two regions. These two modules might be considered concepts or sub-concepts.

Figure 1:
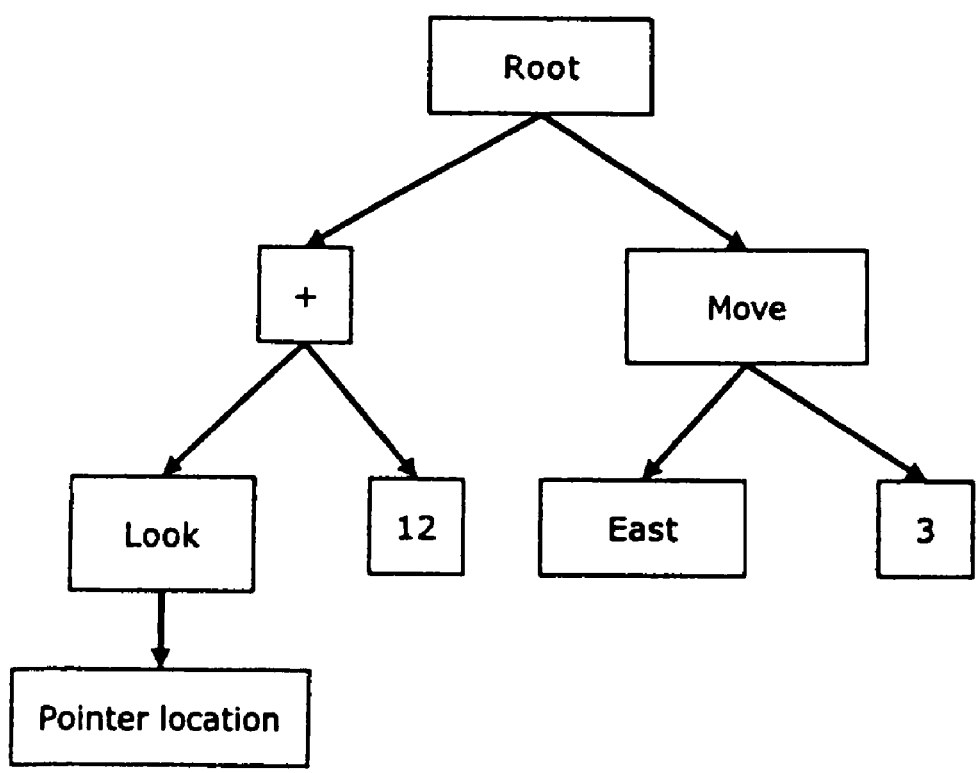
FIG. 1 is a diagram of an S-expression.

The programs and modules may be written in a variety of programming languages. As an example, one of the programming languages is known as LISP which employs S-expressions, (symbolic expressions). S-expressions can be represented by trees, with each node associated with an instruction in the instruction set, and branches from each node for each argument the instruction at the node has. The instructions may have side effects, such as taking actions on the problem domain. FIG. 1 shows an example of such a tree. The root node is an instruction taking two arguments, the left one being associated with addition, which in this case has two arguments in turn, the left one being a function look that returns the number found at the position designated by a pointer-location and the right one being 12. The addition node will add the number returned by the look instruction to 12 and pass it to the Root. The Root instruction may be a built in instruction that depending on its left argument may execute its right argument. If it executes its right argument, it may move an activator 3 steps east in a particular simulation.

If a language is typed, then the instructions may each have a specific type, and an expression will be well formed only if each argument is of the appropriate type. Typed S-expressions are only well formed if each instruction is of the correct type to fit into the argument slot of the instruction at the node above it.

An embodiment of the invention is directed to a method that allows a user to build a hierarchic computer program by using a module constructor to build sub-concepts, and then applying a module constructor to build the final program using the sub-concepts as inputs. As will be seen, the module constructor may employ genetic or evolutionary programming to build the sub-concepts automatically or with minimal user interaction. By allowing a big evolutionary or genetic programming problem to be broken up into steps, programs that solve design problems can be evolved that standard genetic programming or evolutionary programming would not in practice be able to solve directly.

Figure 2:
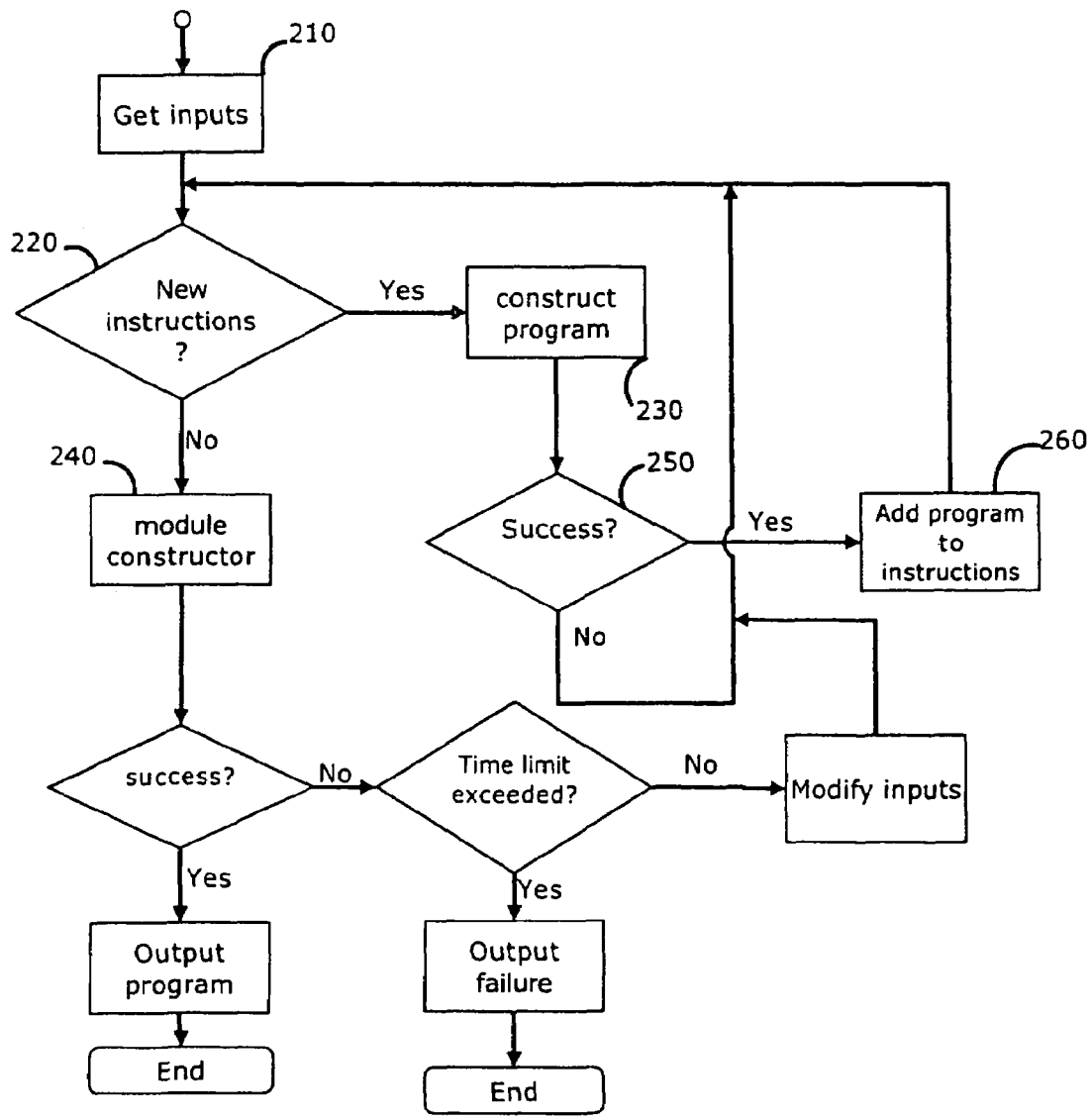
FIG. 2 is a flowchart of an embodiment of "Construct Program", the process of producing programs.
Figure 3:
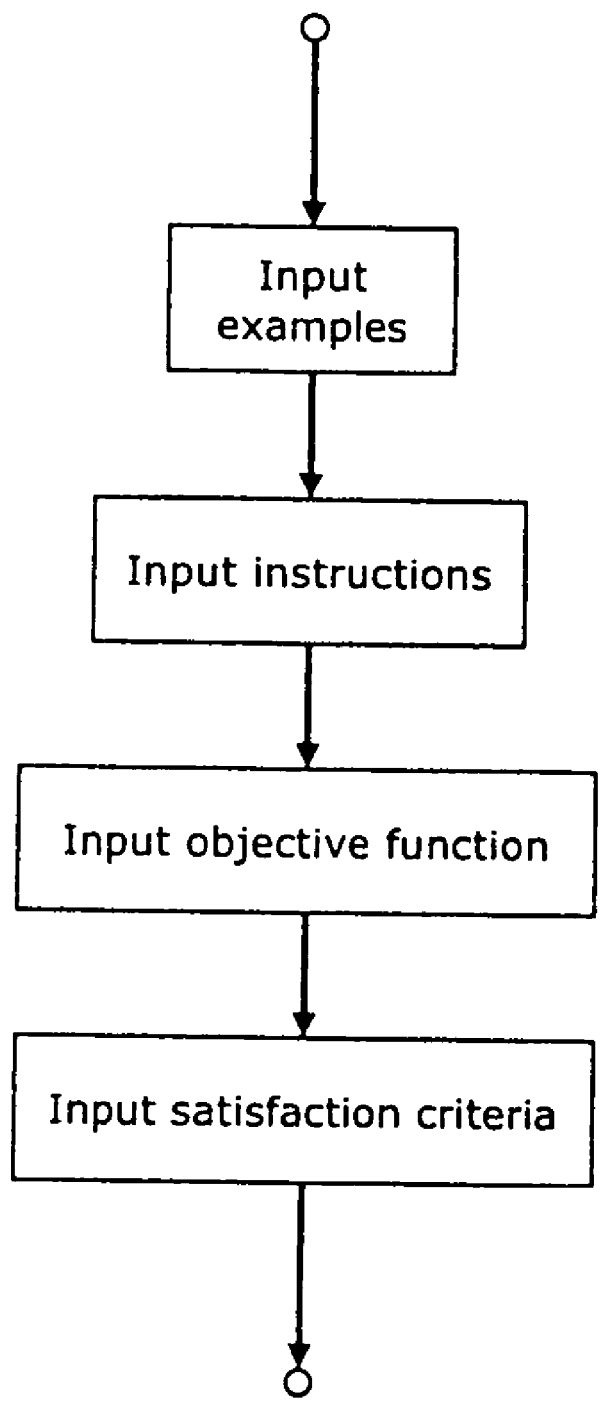
FIG. 3 is a flowchart of an embodiment of "Get Inputs", a detail from FIG. 1.

FIG. 2 shows a flow chart of an embodiment of a process "Construct Program" that constructs a program. First the necessary inputs may be obtained in step 210. FIG. 3 shows an embodiment of Get Inputs in more detail. In FIG. 3, inputs may include examples the program is to solve, an instruction set the program is to be built out of, an objective function that judges how well the program solves the examples, and/or satisfaction criteria that judges whether the program has solved the examples well enough. The objective function may typically consider solutions to have a higher score if they solve more of the examples, use a shorter program, solve the examples in less time, and/or use less memory. In other embodiments, Get Inputs may take any set of inputs that might be supplied to a genetic programming or evolutionary programming algorithm.

Continuing with reference to FIG. 2, after inputs are obtained, the programmers may choose (220) to create further instructions using the process "Construct Program" (230), which is thus called recursively. The recursive call may be used to learn a sub-concept or module that may aid in producing a program for the outer problem. Note that in the recursive call, new inputs may be solicited. In particular, in the recursive call, a different set of examples and/or a different objective function that are relevant to learning the sub-concept may be input. The recursive call may be applied to a different design problem than the original one, and this different design problem may be simpler to solve. If the recursive call successfully returns (250), the program that was automatically constructed or constructed with minimal user interaction may be added to the instruction set (260). If the recursive call fails, the programmer may have the option to continue computation at the outer layer, for example by choosing (at 220) to add other instructions, or by proceeding to the module constructor (240) to attempt construction of the module without adding further sub-concepts.

Once desired sub-concepts have been created and added to the instruction set, a Module Constructor (240) may be applied. A module constructor applies a method, such as genetic or evolutionary programming, to return a program meeting the design characteristics that have been input into it or reports failure. Embodiments of module constructors are shown in FIGS. 5-10, 11, and 17, and are described below.

If the module constructor returns a program, Construct Program may output it and is done. If it reports failure, Construct Program may check to see if too much time has elapsed and it should quit. In an alternative embodiment, Construct Program may ask the programmers if it should continue or quit. Assuming computation is not concluded, programmers may modify the inputs and return to allow new instructions to be constructed, and then try again to generate a program.

An alternative embodiment of Construct Program may take a module constructor as one of its inputs, so that it is possible to use different module constructors in learning different sub-concepts. As we will see below, it may be useful to use specialized module constructors for particular applications.

Another aspect of the invention is the use of constructions that we call scaffolds. Scaffolds are modules or programs which may take arguments, specify or indicate how modules or programs are to be constructed to fill the arguments, and then indicate how the arguments are to be computationally combined.

It is envisaged that scaffolds may be used within program construction processes, for example to solve design problems. Methods for doing this will be described in detail below, but the basic idea is that one may start with a scaffold. The scaffold may have arguments, and the arguments may have annotations. The annotations give guidance in how programs, or modules, are to be prepared that will then be substituted in place of the arguments. For example, the annotation may specify that examples of a concept are to be provided to the system, and a program may be generated from these examples using a module constructor. Once the arguments have been fully instantiated, the scaffold may be evaluated, yielding the solution to the design problem. For example, the scaffold may consist of a procedure P(x), together with instructions that a certain kind of module construction is to be used to generate a program A. Then the solution to one's design problem may be the program P(A). Note that in this way, one program design problem may be transformed into another, which may be easier to solve. Alternatively, the scaffold may consist of a procedure P(x y), together with instructions that certain module constructions are to be used to generate programs A and B. Then the solution to one's design problem may be P(A B). Note that in this way, one program design problem may be broken down into a series of simpler program design problems, breaking down a single seemingly intractable problem into pieces which may be much more tractable.

In one embodiment, a scaffold is a procedure, together with instructions for how to evolve or produce programs for its arguments. Thus we may denote a scaffold as:

$P(a\_1, a\_2, \ldots, a\_n) [c\_1, c\_2, \ldots, c\_n]$ where P is a procedure or a function, the $a\_i$ are its arguments, and the $c\_i$ are annotations, $c\_j$ giving instructions in how to construct the j-th argument. Here $P(a\_1, \ldots, a\_n)$ may be a specific procedure or function in the ordinary sense of computer programming, and may be written in a standard programming language, such as C, Python, or Lisp. (However, in some embodiments, P may be more general, as will be described below.)

When the code for a procedure, such as P, is executed, it may invoke some or all of its arguments. Thus it may not be executed properly until evaluable quantities have been supplied for such arguments. For example, a procedure times(x, y) might be defined to return x X y, the number given by multiplying x and y. It could not actually be evaluated in a particular environment until x and y are specified. The solution to a particular program evaluation problem might involve specifying that x is the number of oranges in a basket and y is the number of baskets, so that times(x,y) would predict the total number of oranges. The annotations $c\_i$ that are added in a scaffold give instructions as to how these variables are to be supplied. Module constructors will often be used to find programs computing relevant quantities to be substituted into P, and the annotations give instructions or guidance as to how this is to be done. Scaffolds thus come with a program building process herein called the training of the scaffold, and an evaluation process. As a program is built for a particular application using the methods described herein, scaffolds may be employed, and the training process describes how arguments are to be supplied to them for that application. Once the program building process is over, one is left with an overall program in which the necessary scaffolds have been trained, and thus the arguments have appropriate bindings as the overall program is executed. Once each necessary argument has been bound to an ordinary terminal or function or procedure, the procedure of the scaffold may simply be evaluated as any procedure would normally be in the given programming language.

Next a description is provided as to how the annotations are coded and read. In a preferred embodiment, there may be 5 kinds of annotations. Note that there may be annotations of multiple kinds specified for each argument.

(1) The first kind of annotation may be a scaffold or a list of scaffolds. If a single scaffold is listed, it indicates that this scaffold should be inserted in place of the argument. If a plurality of scaffolds is listed, it indicates that each of these scaffolds could be tried in the program building process. More details will be provided on the program building process shortly.

(2) A second kind of annotation may be text intended to be read by users. This might, for example, suggest that the user provide examples of a certain concept or kind of concept to a module constructor for training this argument. An example would be a suggestion that the argument is intended to identify local structure in the problem and the user should train it by presenting examples of localized structure. The important kinds of localized structure may differ from domain to domain: in the game of Go, groups are important, in the game of Sokoban, localized deadlocks (local configurations that prevent solution of the problem) are important, and so on. A scaffold may request that the user feed in examples of whatever localized structures are important in the particular domain used to train particular functions, and then employ these functions at a higher level. Thus the scaffold would adapt to different domains, yet greatly constrain the evolutionary computations necessary, thus making them much more efficient. When type 2 annotation is present, the system may be set up to allow the user, if the user chooses, to insert a program in place of the argument, or to supply examples or a design problem to a module constructor so that the module constructor may automatically construct a program to bind the argument to.

(3) Annotations may be given that specify which particular module construction algorithm or module constructor should be used (e.g. from a selection of pre-programmed module constructors), and/or may give an objective function useful for construction of the argument, and/or may specify other parameters useful for module construction.

(4) Annotations may specify which instructions should or should not be used in module construction to construct a module for a particular argument. This may be done in a variety of ways. For example, instructions in the system may be organized into a collection of labeled lists (where each list may comprise a plurality of instructions, and the sets of instructions in the various lists are not necessarily exclusive, so that individual instructions may appear in several lists). The scaffold may then give a list of labels for a particular problem, and the instructions in those lists only would be given to the module constructor for it to construct a program therefrom. By restricting the instruction set in this way, the module constructor may be made to work much more rapidly and reliably since inappropriate instructions are not experimented with.

(5) Annotations may specify any of the methods described herein for improving module construction. For example, annotations may specify particular sets of mutation operations or transformation operations be used in evolving an appropriate module.

Note that these alternatives are complementary, not exclusive. For example, an annotation to be presented to users (category 2 above), a particular module constructor (category 3 above), and guidance on which instructions should be used (4 above) may all be provided, indicating that the user should supply particular kind of training examples as input to a particular module constructor which is run using particular instructions as its instruction set.

Note that implementation of machine readable annotations of the above kinds may utilize any programming techniques. For example, each annotation may be listed as a pair, with the first element in the pair being a label of the type of annotation, and the second element indicating the annotation itself. A program to read the annotations can read the label and simply switch to appropriate code to handle the annotation. For example, if the label is a type 2 the program will print the annotation (coded in the second element of the pair) for the human user and switch into a mode to accept appropriate input from the user, and if the annotation is a type 3 the program may look at the annotation to find a pointer to a particular module constructor.

Note also the class of annotations described above is not necessarily exhaustive, and embodiments may invoke other kinds of annotations. For example, another embodiment may contain an annotation that runs a program on supplied data, where the program returns annotations of the above types. For example, the program might run in a user supplied environment and return a particular scaffold to be used.

Note that the ability to employ scaffolds in these ways is useful. To begin with, by having scaffolds fill in their arguments by choosing a scaffold from a stored list of other scaffolds (which may in turn fill arguments by choice from such a list) or by training from examples supplied by a user, a system can be built that may be analogous to a menu-driven system for assembling software, but with improved features.

One might in an ordinary system have a menu that asks a human user questions, and that then assembles a working program using the answers. For example, when a user wants to print a document, the software will often ask the user which printer the user wishes to use and whether the user wishes to print in color or black and white, and then receiving answers the software will print the document appropriately. In the present case, however, the user may inform the scaffold by supplying a set of examples for a module constructor. Thus the user may be able to direct the construction of sub-programs that the user could not program, and that are not programmed in advance, but rather are module-constructed at the time to be relevant to the particular case at hand. For example, scaffolds are immediately useful in any problem domain where it is possible to solve important design problems by writing a function of sub-functions, where humans can supply examples of the sub-functions, and especially so where they are not capable of writing programs to compute the sub-functions. It is commonplace for domain experts to be able to provide examples of concepts they can not easily write programs to encode.

The various modes of guidance that can be offered are also highly useful. For example, by restricting the instructions within the instruction set used by the module constructor (type 4 annotations), the search space for the module construction can be greatly narrowed down, making genetic programming or whatever method is employed within the module constructor far more likely to succeed.

For example, programs can be built that are sensitive to local structure, for problems over 2-dimensional structures, if the world is fed in to the system as a matrix, and the program senses values of the world through an instruction like look (pointer) that returns the value of the world at a particular point specified by the pointer, and instructions are supplied that move the pointer by one unit east, west, north, or south. In this case, shorter and earlier evolved programs may naturally sense local structure, since one may have to build longer programs to shift the pointer further. A scaffold for exploiting local structure, can specify that appropriate arguments be produced using such local instructions only, by specifying only the label of a set of instructions that has been crafted to be local. By restricting the module construction process to only relevant instructions, the search space is greatly reduced.

An alternative embodiment allows a scaffold to restrict instructions used not only in constructing a function to substitute into it as argument, but also in constructing any functions substituted into such functions as arguments. This may be accomplished by simply allowing an additional annotation stating the restriction is inherited downwards in the program construction process.

Next a description is provided of embodiments of the use of scaffolds in program construction. A description is presented as to how to use scaffolds to solve a presented program construction (design) problem. The form of program construction problems is that there is some fitness function, typically including a set of inputs and a constraint on the outputs, or a set of inputs and a set of corresponding outputs, or a method of generating inputs and a constraint on outputs. The goal is to find a program P_G that applied to the inputs, generates the appropriate outputs, or generates outputs satisfying the constraints, or at least does these things as well as possible as measured by an objective function that weighs how accurately the program realizes this goal.

How to use a scaffold $P(a\_1, a\_2, \ldots, a\_n)$ [$c\_1, c\_2, \ldots c\_n$] that is to yield P_G is described. That is, it is desired to find a set of programs $q\_1, \ldots q\_n$ such that $P(q\_1, q\_2, \ldots, q\_n)$ satisfies the constraints on P_G, solving the design problem. (Assume for the moment, that P is fixed code. Also discussed will be the alternative embodiment where P is a module constructor

TABLE 1

Scaffold_Solve(D,S)
//solves design problem D using scaffold S with no annotation of type 1.
    For arguments a of S:
        if annotation suggests design problem d,
            if Design_Problem1(d,annotation) fails, fail.
            if Design_Problem1(d,annotation) succeeds,
                substitute returned program for a.
    Solve_Over_Remaining_Variables(S,D)
Design_Problem1(d,annotation)
//Solves design problem d given annotations A which do not suggest a scaffold
    Apply suggested or default module constructor.
        If succeeds, return program found
        Else, return "Fail".
Text 1PSEUDOCODE shortly.)

First described is a procedure that solves the case where none of the annotations suggests a scaffold or a list of scaffolds to be substituted in for any of the arguments (that is, there are no annotations of type 1). An example of the pseudocode for this is shown in Table 1 above, outlining the procedure "Scaffold_Solve". The procedure may be as follows. First, the arguments are examined in order. (In an alternative embodiment, that is otherwise the same, the user may be offered the possibility of first assigning an order in which the arguments are to be considered.) For each argument, if the annotation suggests a separate design problem, (e.g. there is an annotation of type 2, asking the user to supply examples of some design problem to a module constructor to produce the input program) the design problem may be solved first by calling a module constructor. (This may be the suggested module constructor, if the annotation suggests one, or if an annotation suggests a list of module constructors, may first try the first one and if that fails, attempt solution with the second one and so on through the list, or if no annotation suggests a particular module constructor, may be a default module constructor, or may be a particular module constructor suggested by the user.) If this call is successful, it returns a program with no further free arguments, which may be substituted in place of that argument. If module construction fails to construct a satisfactory program, then the calling scaffold fails also (or in an alternative embodiment, the argument may be treated as if no embedded design problem had been posed).

When there are no further embedded design problems, the remaining problem may be solved by applying a module constructor to the remaining variables. The difference between this and any other module construction problem is that a portion of the program is fixed, and not allowed to be mutated or modified during evolution. This is handled straightforwardly by many embodiments of evolutionary module construction, so long as the restriction is imposed that no mutations, crossovers, or modifications are allowed that affect the fixed portion of the program.

Figure 5:
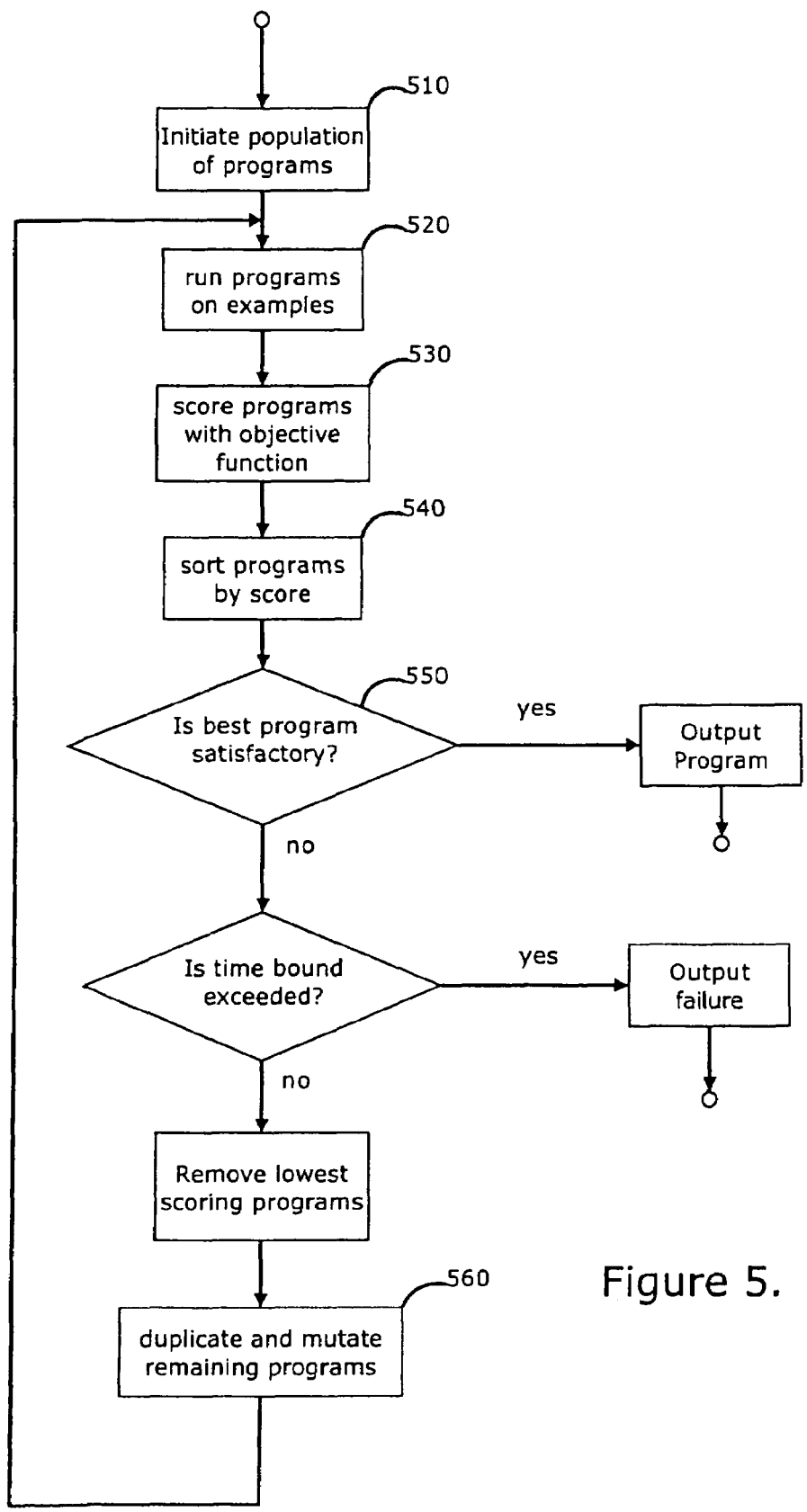
FIG. 5 is a flowchart of an embodiment of "Module Constructor", which may take as inputs instructions, examples, satisfaction criterion, and/or objective function, and return a program built out of the instructions satisfying the satisfaction criterion when run on the examples, or reports failure.

Consider for example the procedure $P(a\_1, a\_2, a\_3)$ [$c\_1, c\_2, c\_3$] where $c\_1$ suggests instruction set $L\_1$ to be used in evolving a program for the first argument and $c\_2$ suggests an instruction set $L\_2$ to be used in evolving a program for the second argument and $c\_3$ suggests that examples of a given type be supplied to a module constructor for the third argument. First the embedded design problem may be solved, producing a program g. Since there are no further separate design problems suggested for arguments 1 or 2, a module constructor may be applied directly to construct $a\_1$ and $a\_2$. With reference to FIG. 5, this works as follows. First, (510) a population of programs may be initiated. These programs are all of the form $P(x\_1, x\_2, g)$, where P is fixed code, $x\_1$ is a program constructed out of instruction set $L\_1$, and $x\_2$ is a program constructed out of instruction set $L\_2$. Next (520) these programs may be run on the examples provided for the overall design problem (of producing P_G), and then they are scored (530). Then the remaining steps outlined in FIG. 5 are performed. The only difference is that mutations, crossovers, or modifications performed in step 560 may only be allowed to modify the portions of the program $x\_1$ and $x\_2$, and only modifications and mutations that respect constraints $c\_1$ and $c\_2$ (in this case using only instructions from $L\_1$ for $x\_1$ and from $L\_2$ for $x\_2$) may be allowed.

If crossover is to occur, these restrictions are particularly easy to enforce. The crossovers that may be allowed either swap a subtree within the $x\_1$ code on one program with a subtree within the $x\_1$ code on another, or swap a subtree within the $x\_2$ code within one program with a subtree within the $x\_2$ code on another, or swap the whole $x\_1$ portion of one program with another and possibly also swap a portion of the $x\_2$ codes, or swap the whole $x\_2$ portion of one program with another and possibly swap a portion of the $x\_1$ code. All of these crossovers leave the "P" and "g" portions of the code inviolate. The only mutations that may be allowed replace instructions within the $x\_1$ code with other instructions from set $L\_1$ and replace instructions within the $x\_2$ code with other instructions from set $L\_2$.

Figure 4:
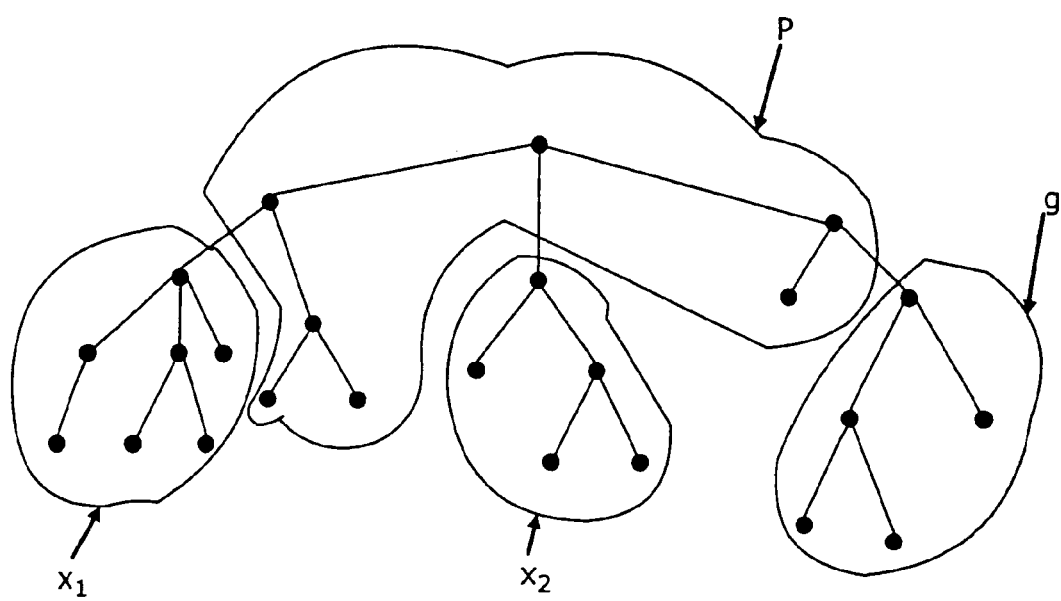
FIG. 4 is a tree representing a program and marked to indicate certain sub-programs.

FIG. 4 shows a tree, with a portion of the tree marked as P, another portion marked as g, and other portions of the tree marked as $x\_1$ and $x\_2$. Genetic programming may be implemented in LISP, where programs correspond to trees, with an instruction associated with each node of the tree, and with branches from a node for each of the arguments of that instruction. In the restricted module construction process, only mutations or modifications that affect the $x\_1$ portion or the $x\_2$ portion (but not the P or g portions) may be allowed, and only then if they respect other constraints imposed by the annotations (such as to stay within a restricted set of instructions) and crossovers between two such trees may only be allowed if they left inviolate the P and g portions of the tree, and respected constraints imposed by the annotations.

Figure 7:
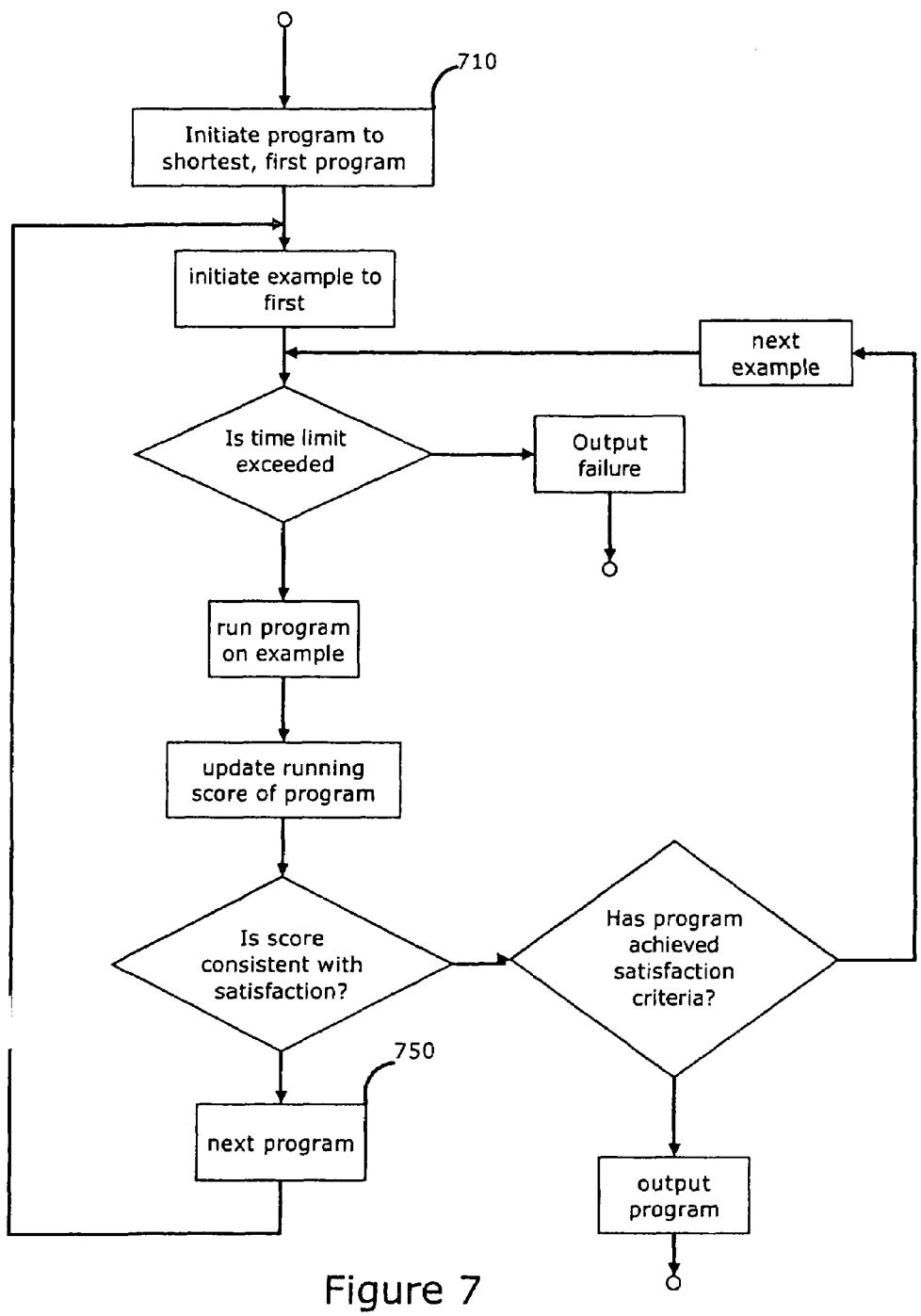
FIG. 7 is a flowchart of an embodiment of a module constructor that performs a breadth first search.

Other module_constructors can also be used in connection with such constraints. Consider for example the Breadth-First-Search Module Constructor (FIG. 7). As shown in FIG. 7, the module constructor steps through programs that maintain the P and g code inviolate. So Breadth-First-Search will search over programs of the form P(X__1, X__2, g), where in step 710 the program is initiated to a program of form P(nil, nil, g), where nil represents an empty program, and then in step 750 X__1 automatically steps through all possible programs composed of instructions in set L__1 from shortest to longest program and X__2 steps through all possible programs composed of instructions in set L__2 from shortest program to longest, and each time a loop occurs through step 750, X__1 or X__2 is updated to the next program that has not yet been tried in combination. This procedure may not necessarily find the shortest program satisfying the design criteria, but it may find the shortest program satisfying the design criteria that can be written in this form (unless it times out, in which case it will report failure).

Note that the restriction to keep the P code inviolate may greatly narrow the search space for a program solving the design problem. If it weren't for this restriction, genetic programming (or whatever module construction algorithm is used) would have to discover the correct form for this code, which entails additional search. Instead, we may find the correct form for a portion of the program.

Of course, if the P code is poorly chosen, or the g code is inappropriate, no possible code for the remaining portion of the problem may suffice to solve the design problem. This may happen if the scaffold is inappropriate for the problem. The point is, however, that by using properly chosen scaffolds we may greatly facilitate solution of hard problems that would be too large to be solved by other automatic methods. Moreover, if we have a library of scaffolds that includes one which is appropriate for the problem, even if we have to engage in considerable search through alternative scaffolds in the library to find one that works, that will generally be far faster than solving the problem directly through genetic or evolutionary programming without the use of scaffolds. If we try, say, 1000 different scaffolds, eventually finding one that works, that may multiply the time to solve the design problem, relative to simply having the right scaffold, by a factor of 1000. But if we have to evolve the code from scratch, and the necessary code is, say, the composition of 50 instructions each of which could be chosen in 10 different ways, we may have to search through $10^{50}$ possibilities, slowing the search for the program by a factor of $10^{47}$ relative to searching through the library for the appropriate scaffold. Even if genetic programming or evolutionary programming is able to vastly prune this search, which is not guaranteed, it may still be many orders of magnitude slower than searching through the library for an appropriate scaffold and then solving using the scaffold.

Note that some of the possible types of annotations offer guidance that can not be used in this way. In particular, guidance of type 3 may suggest a particular module constructor be used on argument 1, and guidance of type 5 may suggest that particular modifications be used with the module constructor as we construct argument 1. But when we construct argument 1 in conjunction with argument 2 as described above, this may not make sense. In such circumstances, we may disregard this additional guidance. This guidance is used when sufficient information is provided for argument 1, i.e. an embedded design problem is provided for argument 1, and may be disregarded otherwise.

TABLE 2

Design__Problem(D,A):
//solves design problem D given annotations A.//
    If A does not suggest list of scaffolds,
        apply suggested or default module constructor.
    if succeeds, return program found,
        else, fail.
    If A suggests list L of scaffolds,
        for S in L,
            Fill(S)
            Solve__Over__Remaining__Variables(S)
            if succeeds, return program.
            if fails, next S.
        if no further S in L, fail.
Fill(S):
// walks down tree of scaffold substitutions till filled. Fills scaffold and maintains list of annotations on variables.//
    if no unfilled arguments, return S.
    for unfilled arguments a of S:
        if annotation suggests design problem d,
            if Design__Problem(d,annotation) fails, fail.
            if Design__Problem(d,annotation) succeeds,
        substitute returned program in a.
        elseif annotation suggests scaffold list L,
            choose l in L,
                if Fill(l) fails,
                    mark off choice and choose another l.
                elseif Fill(l) succeeds:
                    record choice and annotation,
                    substitute Fill(l) in a.
        else (neither design problem nor scaffold list)
            assign variable to argument,
            update annotation record.
Text 2PSEUDOCODE Table 2 above shows an example of pseudo-code for an embodiment of a simple recursive procedure Design-Problem(D,A) for solving the design problem in the full case where scaffolds or lists of scaffolds are suggested to be inserted for the variables (that is, where there are annotations of type 1). (The pseudo-code assumes that if a single scaffold is presented, this may be considered a list of length 1.) The algorithm may do the following. First, if no scaffolds are presented for the design problem, we may use an annotation-suggested, user-suggested, or default method of solving the design problem, such as genetic programming. However, if a list of scaffolds is suggested, we may try the suggested scaffolds in order. If we succeed with one of them, we have solved the design problem, and we return the program found. If they all fail, we fail. (Alternatively, the user could be offered at this point the possibility of inserting a program or making some other choice.)

To try a scaffold, we first "Fill it". Filling the scaffold may be a procedure that returns the scaffold in a state that we can present to a module constructor as described above (in the discussion of the case with no annotations of type 1), because all internal design problems have been solved, and all annotations of type 1 have been resolved. To Fill the scaffold, we may go through the unfilled arguments of the scaffold. If they have a design problem suggested, we solve it (by a recursive call to Design_Problem) and fill the argument with the returned program. Else, if they have a list of scaffolds suggested, we choose one of them, and recursively Fill it, and insert it in place of the argument. Else, if there is no design problem suggested nor scaffold suggested, we assign a variable to the argument, and keep a record of what annotations will be needed when we evolve over that variable.

When we are done with this procedure, we have a structure as above which has a list of variable functions of variables. This may be presented to a module constructor, that searches for code that can be inserted in place of all the remaining variables to solve the given design problem. This is the step we call Solve_Over_Remaining_Variables because there are no scaffold lists remaining.

The algorithm Fill(S) is nondeterministic. That is, at each list of scaffolds L (containing more than one scaffold) it chooses one. In one embodiment for making these choices they may be presented to the user. An alternative embodiment is to begin by using the first element in the list, and to keep a record as each choice is made over which element has been used, and then to iterate the whole procedure over successive choices until a choice is found that succeeds at solving the overall design problem, or else till all choice sequences have been exhausted, in which case the overall design problem fails. An alternative method for making these choices may be hill climbing. Hill climbing may be performed automatically or with minimal user input. In this procedure, we may first use the first element in each list, and record the fitness of the solution to the overall design problem, and assign this solution as the current_favorite_solution (CFS). Then we iterate the following 3 steps.
  (1) If the CFS is satisfactory, we have solved the problem.
  (2) Else if we have exceeded time limitations, we have failed.
  (3) Else, we randomly pick one choice, randomly alter it, walk down through all subsequent new choices (i.e. choices not made in the previous CFS because they are within scaffolds not previously chosen) and make them randomly, and if the result leads to a more fit solution to the overall design problem than the CFS, replace the CFS with this program.

The algorithm described above, involving a search over choices until we find a successful choice, can alternatively, pedagogically, be described as follows. First we may proceed lexicographically and depth first. That is, we proceed on finding the arguments for P in order, first addressing argument 1, then argument 2, and so on. (In an alternative, embodiment, the user may be offered the possibility of first assigning an order.) As a given argument is considered, if its annotation suggests a list of scaffolds that may be used to fill it, we may proceed to consider the first of those (before considering the other arguments). If this scaffold in turn has arguments, its arguments are considered first, recursively.

In this way, we may encounter an argument whose annotation suggests a design problem. We recursively solve embedded design problems first. If the recursive application of Design_Problem succeeds, it will return a program with no remaining free arguments. We plug it in, and proceed with the algorithm. If it fails, then we may go up to the next possibility in lexicographic order. That is to say, we have then ruled out the choice of substitutions of scaffolds into arguments that led to this design problem, so we back up to the next possible substitution, and consider it in turn. (If there are no further substitutions possible, then we are at the top level design problem, and it fails.)

For example, consider solving design goal D using the scaffold S_t denoted by: $P\_t(a\_1, a\_2)$ [list for 1: $S\_1, S\_2$; list for 2: $S\_3, S\_4$], where $S\_1$ is the scaffold:
  $P\_1(a1\_1, a1\_2)$ [$c\_1$ is design problem X, $c\_2$ is scaffold list $S\_5, S\_6$] and $S\_2$ is the scaffold: $P\_2(a2\_1, a2\_2)$ [$c\_1$ is, use instruction set 2 and solve design problem Y; $c\_2$ is use instruction set 5] and $S\_3$ is the scaffold: $P\_3(a3\_1, a3\_2)$ [$c\_1$ is use instruction set 3, no $c\_2$] and $S\_4$ is the scaffold $P\_4(a4\_1)$ [$c\_1$ is use instruction set 4]. ($S\_5$ and $S\_6$ are not listed because in the example, they turn out not to be needed for solution.)

We begin by trying the substitution of $S\_1$ in $P\_t$, yielding $P\_t(S\_1, a\_2)$. We proceed depth-first and encounter a design problem X for the argument of $S\_1$. We apply module construction. Say (for hypothesis) this design problem fails. Then we return to the top level or higher level and substitute $S\_2$ for $a\_1$ in $P\_t$. We now have $P\_t(S\_2, a\_2)$.

Now we descend to $S\_2$, which proposes a design problem Y for its first argument. Say (for hypothesis) this design problem succeeds, returning program G. We now have that $S\_2$ is the scaffold $P\_2(G, a2\_2)$[use instruction set 5]. As there are no further scaffold substitutions or design problems suggested, we proceed to the next lexicographic substitution and consider argument $a\_2$ of $P\_t$. The first suggested substitution is $S\_3$. We proceed down to $S\_3$. $S\_3$ has no further suggested substitutions. So we are left with a design problem, solve design goal D using $P\_t(P\_2(G, a2\_2)$ [use instruction set 5 for $a2\_2$], $P\_3(a3\_1, a3\_2)$ [use instruction set 3 for $a3\_1$]). We apply the module constructor to this (where recall we only consider mutations or modifications that leave the $P\_t$, $P\_2$, and G code intact, and that use instruction set 5 for the $a2\_2$ and use instruction set 3 for $a3\_1$.)

If this design problem succeeds we are done. It automatically returns a program that solves the design problem D, and has form $P\_t(P\_2(G,A), P\_3(B,C))$ where A, B, and C are some fixed programs that were returned by the module construction. If on the other hand this design problem fails, then we back up to try the final alternative of substituting $S\_4$ in the second argument, resulting in the design problem D over $P\_t(P\_2(G,a2\_2))$ [use instruction set 5], $P\_4(a4\_1)$ [use instruction set 4]) which we send to the module constructor. If it succeeds, it returns a solution. If it fails, we fail on solving the design problem D.

In an alternative embodiment of Scaffolds, whenever a scaffold in a list of suggested scaffolds is used in a successful module construction to solve a posed design problem, it is moved to the front of the list for future design problems. This learns from experience and automatically orders the lists within annotations of type 1 so as to be efficiently organized, with more likely substitutions being tried first.

In an alternative embodiment, each list of suggested scaffolds keeps a score of the fraction of the time when the scaffold is substituted in that it participates in a successful solution of a design problem. The lists are kept sorted in order of score. Scaffolds having a sufficiently low score may be deleted from the list, and new ones may be inserted, either by being inserted by a user, or as random modifications of an existing scaffold. This embodiment learns from experience, creating a collection of scaffolds that is efficient.

In an alternative embodiment, each time a scaffold is employed, a score is updated that is associated with each argument on the fraction of times it fails in finding a program to fill that argument, either because the argument's annotation proposes a design problem (annotation of type 2) that we fail to solve, or because the argument's annotation proposes substituting in some other scaffold, that returns a failure. The scaffolds may then keep a list of arguments ordered by failure rate, and the above training algorithms modified to consider the arguments in order of this list, so that arguments less likely to succeed are considered first. Since we ultimately have to find successful functions for all arguments, this ordering makes the algorithm more efficient by ruling out failing alternatives sooner.

Note that embodiments may allow the procedure P in a scaffold $P(a\_1, a\_2, \ldots, a\_n)$ [$c\_1, c\_2, \ldots c\_n$] to act on the code returned for the arguments. This is more general than simply being able to evaluate the arguments and use the returned values for computation. However, code acting on code is familiar to those versed in the language LISP, where code is simply a list and so is data. By using LISP, for example, as a programming language for scaffold procedures, or using methods such as those employed in LISP, we may support the ability for scaffold procedures to act on returned code and incorporate it into a procedure in general ways. Alternatively, if we use a programming language that does not support such operations, or additionally (if we use one that does) we may supply special functions that act on returned code, allowing such instructions (and programs built from them) to be employed in specifying the procedure P of a scaffold.

A particular useful embodiment of such a special function occurs when a scaffold specifies that some arguments may be constructed using a variety of EES module constructors or some other module constructor that returns a program that is a specific combination of learned modules or agents. In the EES module constructor, as we shall see, the returned program may be a combination EES_combination(Agents instance) where Agents may be the set of agents result from the training process, and thus changes depending on the supplied design problem, (e.g. on the supplied objective function, instruction set, and environment), but the function EES_combination is fixed for the particular module constructor. Then a particular embodiment of a function P combining code from its arguments a__1 and a__2, is EES_combination(union_agents(a__1, a__2) instance). Union agents may be the set that is the union of the set of agents in a__1 and the set of agents in a__2.

In simple terms, this scaffold may train two different EESs on subproblems, and then combine them by forming the EES which has all the agents of both. This may be useful, in particular, for problems where there may be a number of different causes or concepts or functions that can be learned separately but may interact. By teaching or evolving them separately, you isolate on the particular phenomenon, and can evolve a program much more effectively and rapidly. This is similar to how a violin student will learn to control pitch and then learn to do vibrato or a tennis player will focus on different aspects of his game and combine them. Note that the algorithms above may work equally well for procedures that combine the code (rather than simply the values) of their arguments. First, it is clear how to evaluate the scaffold for such procedures after training. Once the scaffold is trained, the arguments may be fixed as code. The Procedure P may be run on the code, produce some other code, and that code may then be executed in the ordinary manner.

Also the training process works just as before. Consider the first example discussed above. After solving the embedded design problem, we are faced with evolving P(a__1, a__2, g) to solve a particular design problem. Before we discussed first how to do this using an evolutionary algorithm, which searched over code for a__1 and a__2 such that P(a__1, a__2, g) would be fit. The same steps may work again. We can mutate or crossover or modify the a__1 and a__2 code, and then check its fitness by evaluating P(a__1, a__2, g). Code for the combination (a__1,a__2) is assigned the fitness value of P(a__1, a__2, g) in either case, and P(a__1, a__2, g) may be evaluated whether P acts on its arguments only through evaluating them or by extracting and modifying code in them.

Likewise, the process may work just as before if we use the breadth-first-search module constructor. Again, we run in breadth-first order over programs (a__1, a__2), and for each program, we evaluate P(a__1, a__2, g) on examples to see if it solves the design problem. If it does, we have solved the design problem. If it does not, we proceed with the breadth first search and consider the next program (a__1, a__2).

Scaffolds may also support procedures with an indeterminate or variable number of arguments. In LISP, for example, one has operators like (+a b c . . . ) which computes a +b+ c+ . . . (where the . . . can represent an arbitrary number of arguments) which specifies the addition of an arbitrary number of numbers. One way to define such operators in LISP is with a dotted-tail notation. That is in LISP the statement: define (f . a) <body> may create a procedure f, with code specified by <body> that could be called with 0 or more arguments. If we then evaluate (f x y z), then in the body of f, a will be replaced by the list (x y z).

An embodiment of a scaffold that supports indeterminate numbers of arguments is with an annotation of type two. In place of an argument, the procedure of a scaffold may have a symbol (such as .). This may be accompanied with an annotation telling the user that he/she is to specify the number of arguments at run time. Then, as the scaffold is evaluated, the system will request guidance from the user. This may occur when the user is asked to supply examples of a particular kind of concept. As noted above, when a scaffold with an embedded design problem is encountered, the embedded design problem is addressed before the overall design problem. In this case, the system may first ask the user to supply examples of a concept of this kind. The user may supply examples and the embedded design problem may be solved. Then the user may be asked to supply examples of a second concept of this kind. The user may supply examples and the embedded design problem may be solved again. This continues until the user supplies an indication that he/she does not wish to supply any further concepts of this kind. The modules learned in the previous design problems are treated by the procedure of the scaffold as a list, analogous to how they would be in LISP, as discussed in the preceding paragraph.

For example, the procedure of the scaffold might be P(. a__1, . a__2) [supply examples of concept1; supply examples of concept2] This scaffold would be trained by asking the user to supply examples of a concept of type concept1. (Concept1 might be, important local structures). The user might supply such examples, and a module g__1 may be constructed to solve the presented design problem. Then the user would be asked to supply examples of another concept of type 1. The user might indicate he did not wish to train any further concepts of this type. Then the user would be asked to supply examples of concept of type concept2. The user might supply such examples, and a module h1 may be constructed. Then the user would be asked if he wished to supply examples of another concept of type concept2. The user might supply such examples, and a module h2 may be constructed. The user would be asked if he wished to supply examples of another concept of type concept2. The user might decline. In that case, the scaffold would be trained, and would be evaluated as the function P((g1) (h1 h2)) where in the first argument of procedure P we have inserted the list (g1) containing only the module g1, and into the second argument of procedure P we have inserted the list (h1 h2). P could then be evaluated in a programming language such as LISP that accepts lists for arguments of modules, functions, or procedures.

An alternative embodiment may also allow the procedure P in a scaffold to be defined at training time by a module constructor. The evaluation of scaffold (after it has been trained) may be similar to what it was in the previous embodiments: at evaluation time, one has a procedure with all of its arguments filled with code, so it can be evaluated.

The training of such a scaffold can also be accomplished just as before. The only difference is that when we perform the Solve_Over_Remaining_Variables step, the topmost function may not be fixed. That is after solving embedded design problems and filling scaffolds, we will be left with a module construction problem of finding a program looking, for example, like F(a__1, b__1, a__2(a__3(b__2))) where the a_i label variables that may not be bound, and the b_i label specific programs that may have been produced by solving embedded design problems. We may then employ a module constructor, as discussed above, that searches for a program of this type, holding the b_i fixed, but varying the a_i as well as the code of F.

Note that scaffolds may be employed in the module construction process itself in several ways. First, the module constructor may offer the user a choice of scaffolds. The user selects an appropriate scaffold, and a process above for solving a design problem using a scaffold is then followed. Second, a module constructor may contain a list of useful scaffolds. It attempts to solve design problems using the first scaffold on the list, and if it fails, then the next, and so on until the list is exhausted, in which case it may apply other embodiments of module construction, or fail. Module constructors may associate scores with scaffolds, update the scores to reflect the fraction of the time that using a given scaffold succeeds in solving design problems, and reorder their lists to try higher scoring scaffolds first, thus learning to become more efficient as they solve multiple design problems. Scaffolds having a sufficiently low score may be deleted from the list, and new ones may be inserted, either by being inserted by a user, or as random modifications of an existing scaffold.

Module constructors may take as inputs a fitness function and a set of instructions, and construct a program judged sufficiently fit out of the instructions or report failure. Module constructors may be implemented using genetic programming or other evolutionary programming methods, or in other ways. We describe several embodiments, with various features, some of which may be particularly appropriate for particular applications. The fitness function will generally be comprised of a set of examples (or a program for generating examples), and an objective function that combines performance on multiple examples to a given valuation.

FIG. 5 shows an embodiment of a module constructor. First a population of programs may be initiated in a randomized way. In one embodiment, a randomized population of programs may be initiated by repeating n times the randomized construction of a program, for an appropriate population size n. One way each randomized construction of a program may be accomplished is as follows. A first instruction may be chosen randomly from the instruction set. If this instruction has no arguments, the construction is done. Otherwise, instructions may be chosen from the instruction set for each of its arguments. These choices are again at random from the instruction set, except that if the instructions are typed, instructions are chosen randomly from among the instructions of appropriate type. This process may be iterated until no instruction in the program has unfilled arguments, and at each step the probability of choosing those instructions in the instruction set that do not have arguments (sometimes known as atoms) is increased, so that the process terminates with programs that are on average of a size deemed appropriate. This process may be appropriate for S-expression languages, in which the process can be seen as starting from the root (see FIG. 1), and walking down filling each of the arguments with randomly chosen instructions, but increasing the likelihood of choosing instructions that have no arguments as one gets lower in the tree. Often one includes an instruction sometimes called "Prog" in the language that takes an arbitrary number of arguments and executes them in turn from left to right. One may then start a new randomized programs with a Prog instruction at the root, allowing more complex randomized programs to be written. If one's language has instructions like Prog that take varying number of arguments, one may choose randomly how many arguments to insert when such an instruction is chosen in a randomized program initiation.

We refer to the process of starting from an instruction in a program, and choosing in a randomized fashion instructions to fit into its arguments, and so on as described above, as "growing the program down". We will refer to this method again later.

In an alternate embodiment, the randomized creation of each program in the population may be accomplished by repeating a number of times the random selection of an instruction and stringing the instructions into a list or an appropriate data structure for the particular programming language. In an alternative embodiment, the programmers may enter one or more programs in the population, and the remaining programs in the population may be created as described above.

Proceeding with the discussion of FIG. 5 at 520, next each program in the population may be run on each of the examples. If a program fails to terminate within a given time bound on any example, it may be deemed to have failed on that example and given a score of 0 for the example. Next (530), each program's performance may be scored on each example according to the objective function and an overall score for each program on the examples may be accumulated. The programs may then be sorted by score (540). In step 550, if the highest scoring program scores high enough to achieve the satisfaction criteria, it may be returned and the module constructor terminates. If the highest scoring program does not satisfy the criteria, and total time used has exceeded a timeout criteria, the module constructor may terminate, returning failure. Otherwise, a portion (such as half) of the population of programs scoring lowest may be deleted.

Remaining high-scoring programs may be duplicated, and one copy of each duplicate may be mutated randomly (560). One way of mutating a program is to choose at random an instruction from the program, replace it with another randomly chosen instruction (of appropriate type if the language is typed), and grow the program down from there. Alternatively (or in addition) new programs may be formed by applying the crossover operation of genetic programming to two or more programs in the population, and such new programs added to the population. Execution then returns to step 520.

Figure 6:
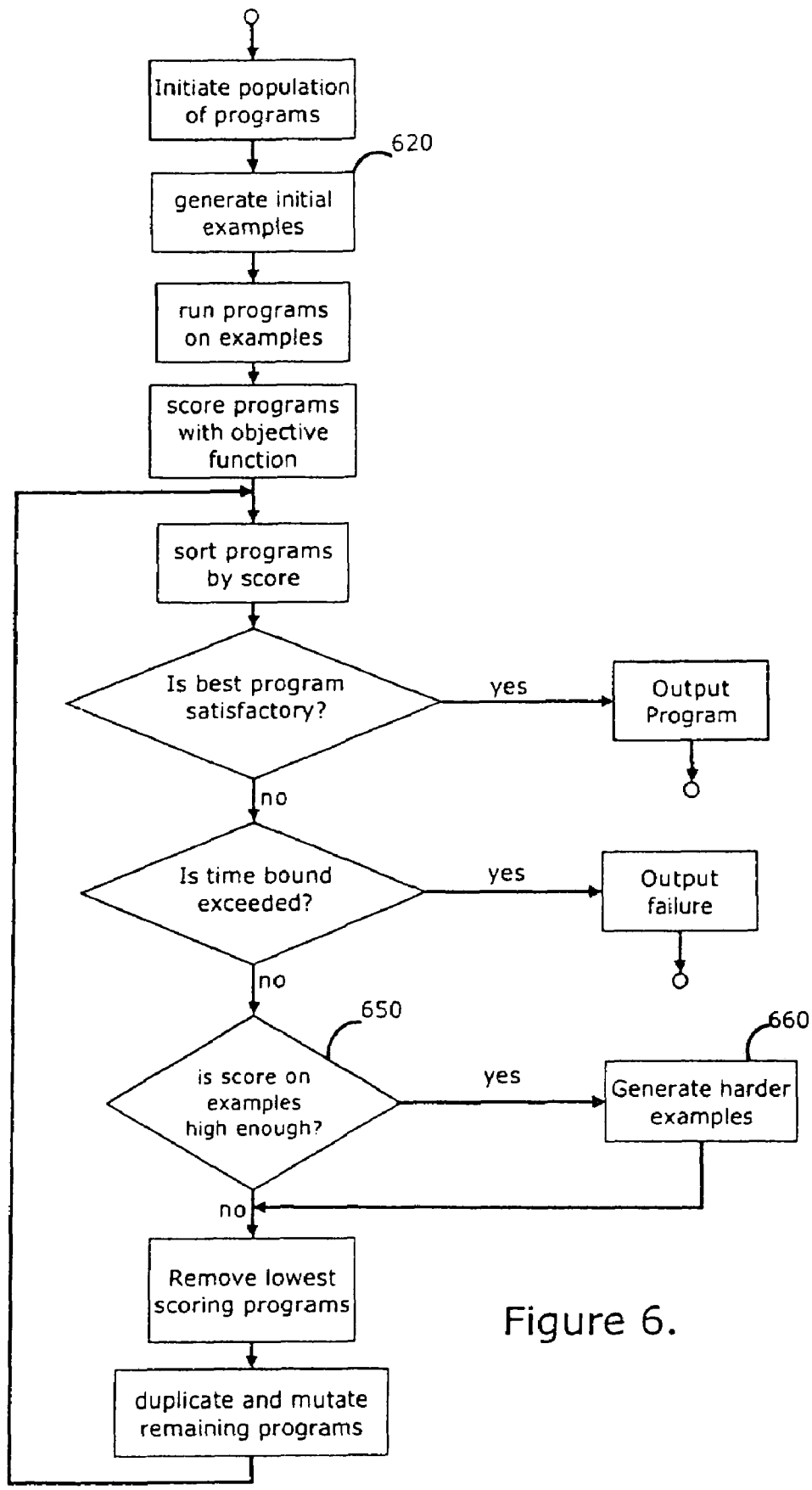
FIG. 6 is a flowchart of another embodiment of "Module Constructor" appropriate when, instead of a set of examples, a program that produces examples may be supplied with a parameter determining how difficult the examples are.

FIG. 6 shows an alternative embodiment appropriate when a program to produce examples is input rather than a collection of examples, and the program has a parameter for how hard the generated examples are. This Figure differs from FIG. 5 in two respects. First, an additional step 620, "Generate Initial Examples", may be inserted. This step runs the supplied example-producing program to generate an example set. This example set may then be used as in the embodiment of FIG. 5. After the population of programs has been tested and scored, a comparison step 650 compares the score to an objective level. If the score is high enough, a new population of harder examples may be generated (660) and the test set replaced. This embodiment has the advantage that the module constructor is run first on simpler examples, and as it learns these, then more challenging examples. This method facilitates training, so that programs may be evolved in this way to solve design problems which might be too hard to solve were such an ordering of the examples not supplied.

An alternative embodiment of Construct Module may be a breadth-first-search-over-programs approach that may be built out of the instructions in the instruction set to find the smallest program that achieves the satisfaction condition on the examples. The instructions are given a lexicographic order, and programs are generated in order from shortest to longest (and within a given size in lexicographic order), rejecting any programs that are not well formed according to the rules of the language. As each program is generated, it is tested on examples, until it either achieves a satisfactory score, or is rejected for demonstrating inability to achieve a satisfactory score. A particularly efficient embodiment of this method (shown in FIG. 7) may test each program generated in breadth first order (that is, from the shortest program to the longest), against each example until enough examples have been tested to falsify the satisfaction condition for that program, in which case the search may proceed to the next program, or until the satisfaction condition is established for a program, in which case Construct Module may output said program, or until the search exceeds its allotted time bound, in which case it may halt and output failure. If the satisfaction condition is that the program solves every example, then the method is particularly efficient because a program can be rejected as soon as it fails on a single example.

It is important to find very short programs solving the examples, because it is theoretically suggested that very short programs solving sufficient number of examples will generalize to new examples not previously seen.

Figure 8:
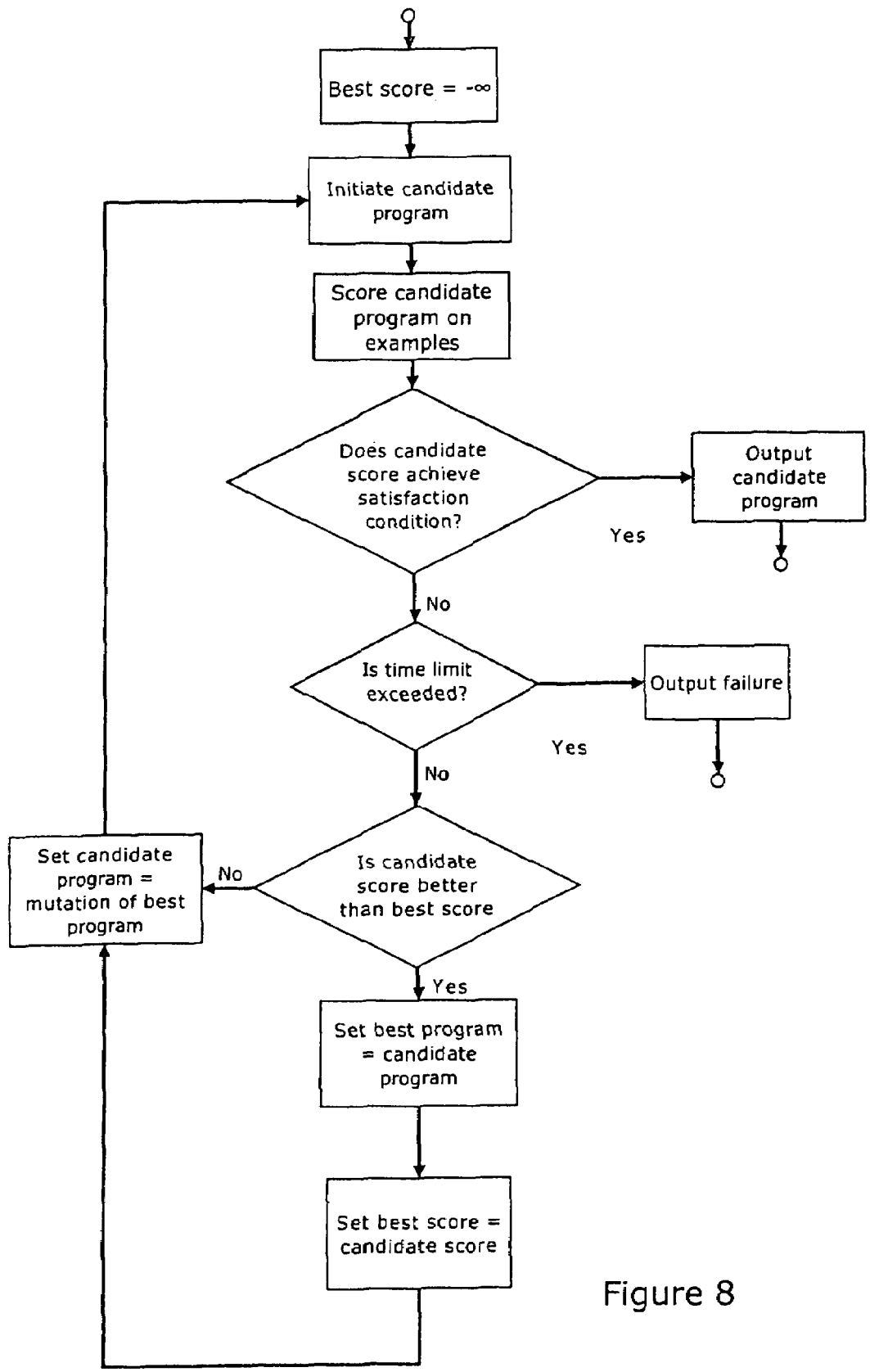
FIG. 8 is a flowchart of an embodiment of a module constructor that performs a local search.

An alternative embodiment of Construct Module, as shown in FIG. 8, may perform a local search, by starting with a candidate program, keeping in storage the best program yet seen, testing a mutation of it against the examples, replacing the best program yet seen with the mutated version when the test shows the mutation is better than the previous best program, and iterating this process till a satisfactory program is found or time runs out.

Figure 9:
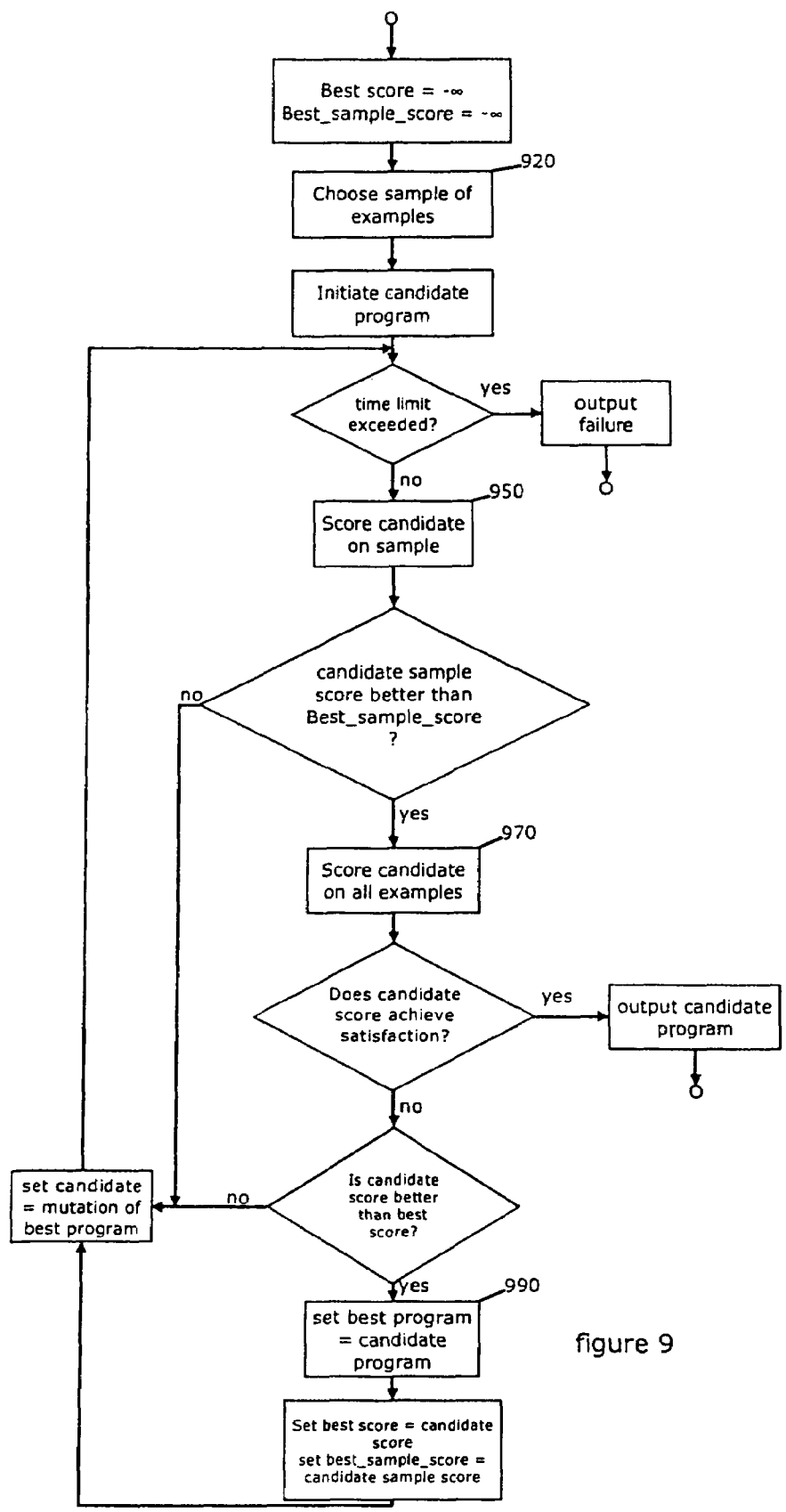
FIG. 9 is a flowchart of an embodiment of a module constructor that performs an efficient local search.

FIG. 9 shows an alternative version of the local search approach. One first chooses a sample of the examples (920). New candidate programs are then first tested on the sample (950). If the new candidate does not outperform the best program yet seen on the sample, it is rejected. If it does outperform the best program yet seen on the sample, then it is tested on the full set of examples (970). The best program is replaced by the candidate only when the candidate does at least as well as the best program on the sample and on the full set (990). This approach may sometimes be more efficient because it allows faster (although inexact) testing of new candidates. Once a fairly good best program has been found, one will usually have to look through many candidates to find a replacement, so adopting a fast test that can reject inappropriate candidates may provide a substantial savings in time.

Figure 10:
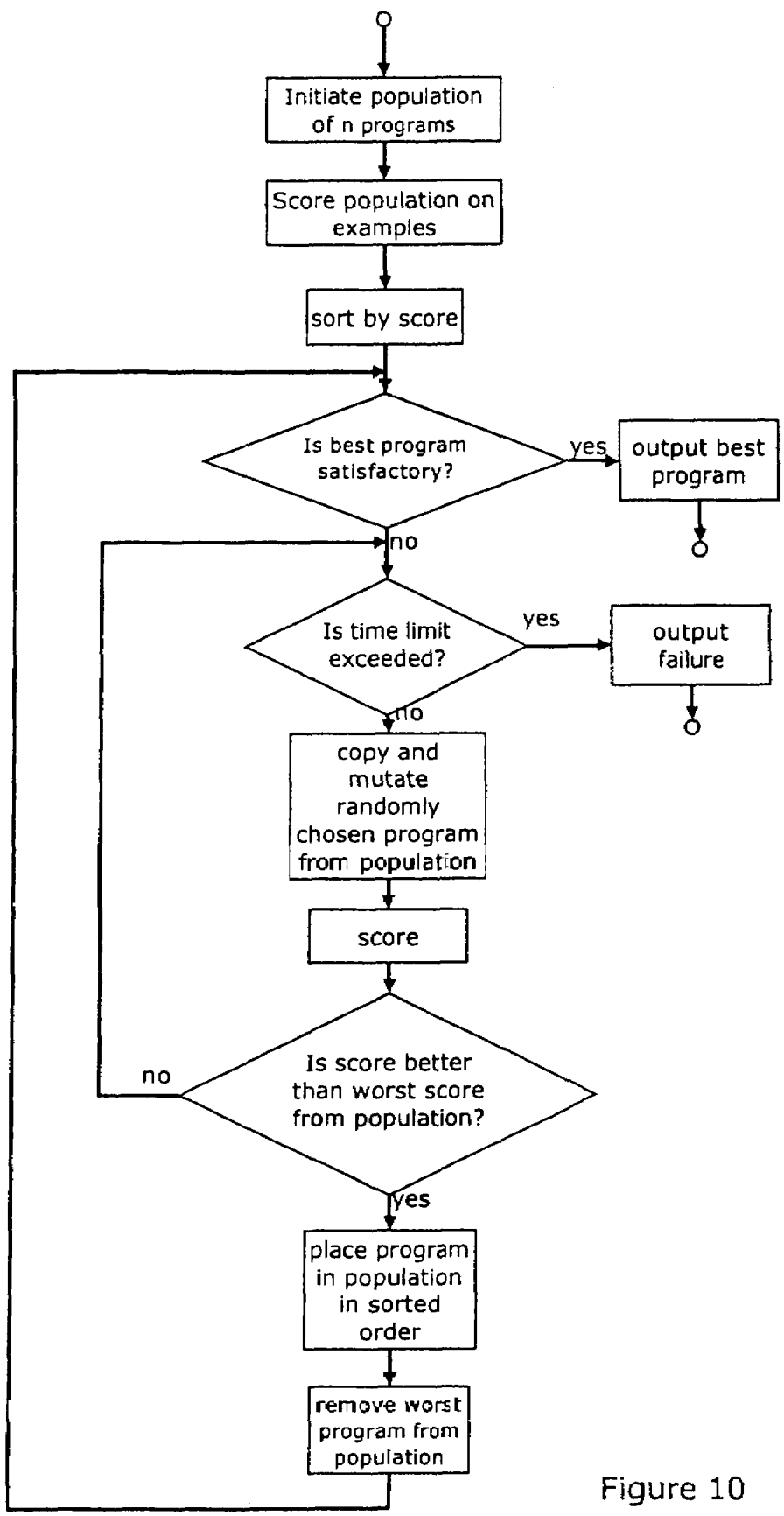
FIG. 10 is a flowchart of an embodiment of a module constructor that performs a beam search.

An alternative embodiment of Construct Module, as shown in FIG. 10, may perform a beam search by maintaining a population of the n best programs yet found according to a test on the examples, picking one of these at random to mutate, testing the mutated program, and, if the mutated program tests better than the worst program currently in the list, it may insert the mutated program into the list of best programs and delete the worst program from the list. This process may be iterated until a program is found satisfying the satisfaction criterion, when said program is returned, and/or the time bound is exceeded, when Construct Module outputs failure and halts. Beam search may be an effective technique because it has many of the advantages of local search, yet is less likely to discard a strong program for random reasons (such as when the programs are tested on random sets of examples.) Beam search may also be useful because it may keep a population of n programs around, so that crossover, rather than simple mutations, may be used to generate new candidate programs.

It is envisaged that the various methods described in this disclosure may all be supported by one or more software packages that we may collectively call "The CAD Tool" because they provide a means for users to interact with one or more computers to guide the computer or computers to construct programs solving design problems. The CAD Tool thus may be a software package that contains one or more interpreters and/or compilers of languages that may support calls to one or a plurality of Module Constructors and/or to one or a plurality of scaffolds (and which may implement algorithms such as those described for the training and evaluation of scaffolds) and/or to one or a plurality of programs such as Construct Program that invoke module constructors. The CAD tool may store and make available a library of scaffolds and/or instructions to programs and module constructors. Additionally, the CAD tool may learn from repeated solutions of module construction problems, storing data that allows better future solution of module construction or program design problems, and/or may manage an environment in which users may interact with computers in part by supplying examples of concepts and sub-concepts to be learned.

Figure 11:
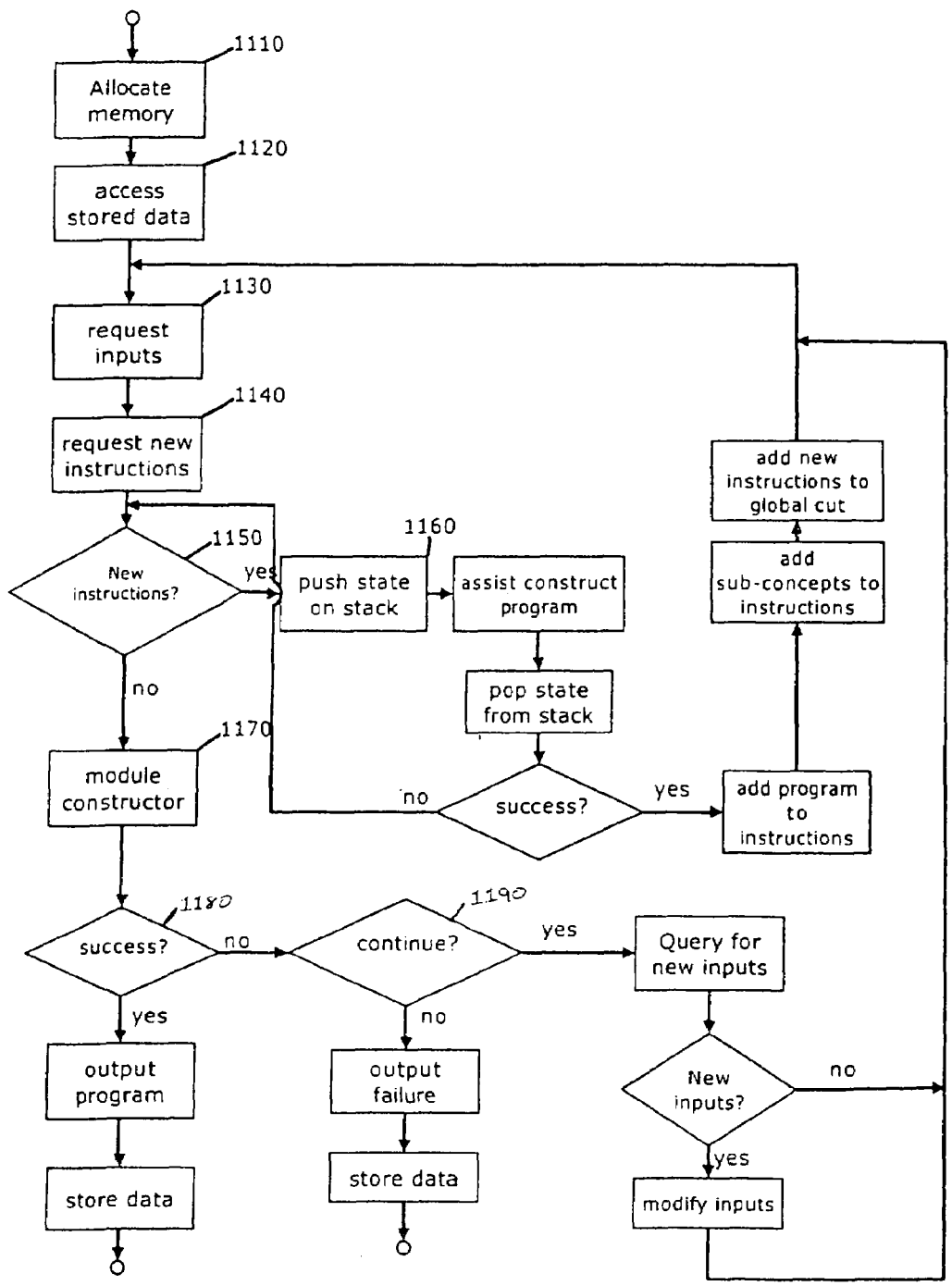
FIG. 11 is a flowchart of stacking in CAD tool.

As a further example, FIG. 11 shows an embodiment of a CAD tool that may support Construct Program (see FIG. 2). 1110 allocates working memory for the implementation. 1120 accesses stored data useful for producing programs. For example, a collection of instructions previously entered or discovered may be stored in a globally accessible memory bank. Once the instructions are accessed, they can be suggested to programmers or included by default in program constructions. 1130 requests inputs from the programmers, such as examples. 1140 asks the programmers if they wish to use the CAD tool to discover new instructions. If they answer yes (1150), the CAD tool may then facilitate the construction of such new modules. This involves a recursive call on Construct Program. Recursive calls may begin by pushing state information on a stack (1160). The recursive call may then be made, and when execution returns from the recursive call, state information may be popped from the stack allowing computation to proceed at this level. If the recursive call successfully generates a module, it may be added to the instruction set, and sub-concepts found in the recursive call may also be added to the instruction set. An additional step in the CAD tool may insert the found module and sub-concepts in the globally accessible memory bank, so that they can be used for other processes. After the programmers respond to a query for new instructions at 1150 by indicating they do not wish to discover new instructions at this time, the module constructor 1170 is executed. If the module constructor reports failure 1180, the CAD tool may ask the programmers if they wish to continue 1190. If not, it may store data so that computation may be resumed at a later date. If they wish to continue, it may query if they want to add new inputs, modify inputs, and/or discover new instructions. If the module constructor reports success 1180, the CAD tool may output the discovered program and store data so that, for example, discovered programs may be used as instructions in new applications.

An alternative embodiment of the module constructor may use an economic evolutionary system (EES) to automatically construct a program to solve presented design problems or construct a program with minimal user intervention. As with other module constructors, these module constructors may take as inputs a set of examples to be solved or a program producing examples (also called instances) to be solved, a set of instructions from which to build programs, an objective function, and/or a satisfaction criterion. They then may build a program that achieves the satisfaction criterion or a default satisfaction criterion (typically an adequate score on the examples according to the objective function) or reports failure.

Figure 12:
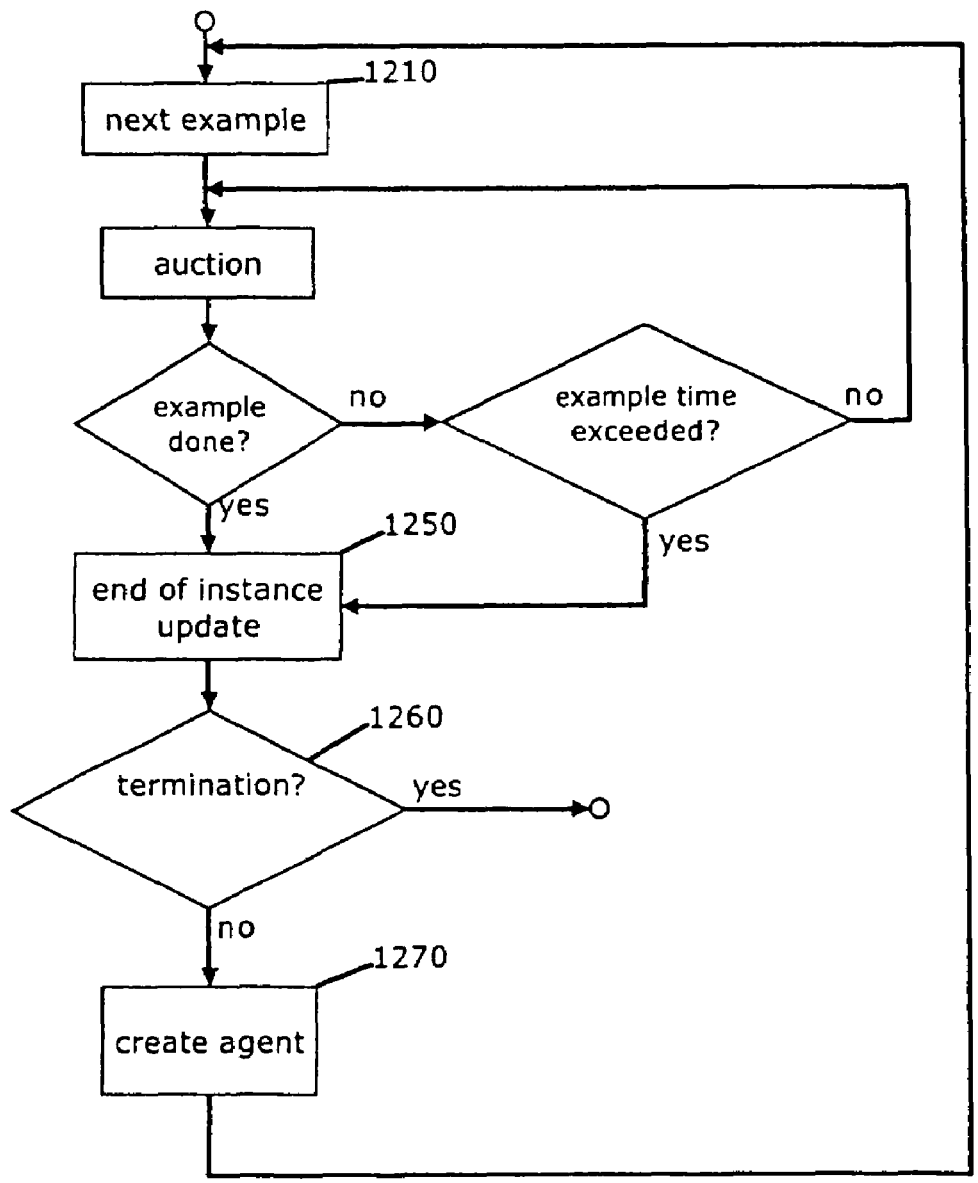
FIG. 12 is a flowchart of another embodiment of Module Constructor that may use a evolutionary economic system algorithm.

FIG. 12 shows an embodiment of a EES system. The EES system may create a modular program organized on economic principles. The system may learn a collection (sometimes called a population) of modules called agents that do the following: they compute whether to bid, how much to bid, and what actions to take. When an example is presented, computation may proceed in a series of auctions. In each auction, the agents' programs may be executed to return bids until the high bidding agent in the population is found. This agent may pay its bid to the previous agent, and its actions may be implemented. If the instance is solved or ends, a reward may be paid as specified in the objective function. Typically, this reward may be a positive amount proportional to the difficulty of the instance if the instance has been solved, and may be zero if computation times out without solution, and there may be a specified partial payment if the agent has made substantial progress as specified in the objective function. Thus the solution of instances may be broken down into a series of actions implemented by a series of agents that win successive auctions. The wealth of the agents that win auctions may change during the course of the instance as they pay their bid to the previous winner and then collect from the next winner or collect an external reward if they are the last agent to act in the instance. After the instance, winning agents may pay a proportion of their money to their parent. Also, all agents may be charged a tax which may be proportional to computational time they used. Agents whose money falls below their initial money may be removed from the system, and any remaining money they have may then be returned to their parent. In an alternative embodiment, agents whose wealth falls below a threshold may be retained in storage but may cease to bid while their wealth is below threshold. New agents are periodically created either by a "Root" agent that creates new agents as random code (using the available instruction set) or by choosing an agent (called the parent) that has sufficient wealth from the population, mutating this agent, and injecting the mutated version into the population with initial wealth taken from its parent. In a preferred embodiment agents are thus automatically created by running computer programs that construct them, but embodiments where some agents, for example initial agents, are programmed by hand or by an interactive process between a human programmer and a machine, may also be useful for some applications.

The motivation for this design is that it divides the solution of complex computational design problems up into a series of simpler problems of finding useful agents. Agents may prosper in this system when they take the state of the instance from one further from solution to one nearer to solution, because typically as the situation nears solution, other agents will bid more. Rich agents may be those that have participated in solution of numerous problems, and mutations of them may often fill useful niches as well. The system learns as the population of agents evolves.

Figure 14:
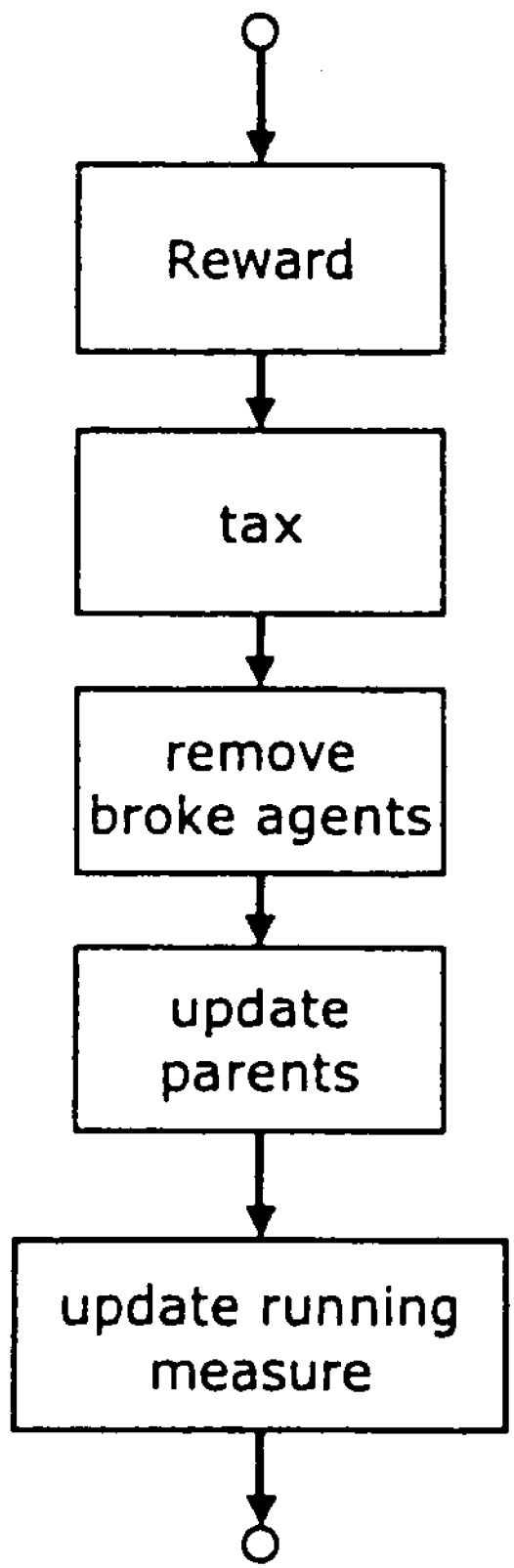
FIG. 14 is a flowchart of an embodiment of an End of Instance Update in FIG. 12.
Figure 15:
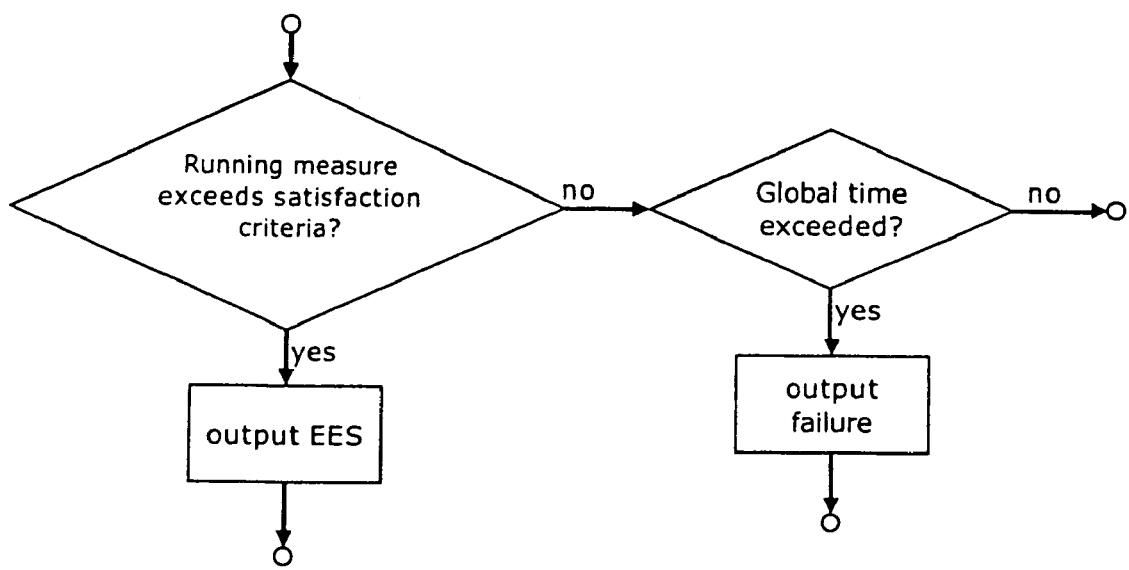
FIG. 15 is a flowchart of an embodiment of a Termination module in FIG. 12.

With reference to the flowchart shown in FIG. 12: computation may begin by presenting the next example (1210). (If a set of examples are presented, the next example may simply be the next example in the set. If a program generating examples is presented, as in the embodiment of FIG. 6, the next example may be obtained by running the program to output the example.) A series of auctions may be held until either the example is done, or allotted time is exceeded. The auction process is shown in more detail in FIG. 13 (discussed below). Each auction may select a winning agent, implement its actions on the example, and/or implement payments. After the example is finished (or time is exceeded) an End of Instance Update (1250) may be executed, as shown in FIG. 14 (discussed below). In the End of Instance Update, appropriate payment may be made to the last agent who acted in the example, other payments and charges may be made, and agents with too little money may be removed from the system. Then, as shown in FIG. 15 (discussed below) a Termination condition may be evaluated (1260). In the Termination calculation, a running measure of effectiveness of the system may be updated, and the measure compared to the satisfaction criterion. If the EES has satisfied the satisfaction criterion, it may be outputted, and computation terminated. Otherwise, a Create Agent process (shown in FIG. 17) may create a new agent (1270), and the next example may be presented (1210).

The successful termination of the EES learning procedure may return a program which is the EES system itself, which may include agents in the population and the auction method for conducting computation. Thus this program itself may be a complex hierarchic modular program. In one embodiment, before the EES is returned, the money updates, new agent creation, and/or agent removal mechanisms are turned off. Then further evolution of the program may be suspended, and it acts perpetually in the final form it was returned. This embodiment may be appropriate when objective information as to success or failure of its applications may not continue to be available. In another embodiment, the EES can be returned with update mechanisms intact, in which case it may continue to evolve and improve as it is applied. Note however that, when a Module Constructor is applied within Construct Program, for example in the embodiment of FIG. 2, the returned program may be regarded as a single instruction available for building later programs. Thus such single instruction may invoke a EES system that may be composed of a plurality of agents and an auction mechanism that applies these agents in a coordinated, sequential fashion.

As the system is evolved on presented examples, the collection of agents in the system may change, which is how the system may learn to solve the presented design problem, but in a preferred embodiment, the method of combining the current set of agents to solve the next presented instance may not change. It may be implemented in fixed computer code, that performs the function of polling the agents to see if they choose to bid, picking the high bidding agent, implementing its action, and so on. Thus we may view the returned program as a procedure EES_Combination(Agents, instance), where Agents is the set of agents in the system, and EES_Combination is the program that takes a set of agents and applies the EES system with that set of agents to the presented instance to solve it or report failure. We will make use of this terminology elsewhere.

In general, the agents may be computer code in any language that is supplied with a method of returning bids (for example, an instruction bid(x) may be added to the language which bids x) and of taking actions (for example, instructions in the language may act on the domain as a side effect). In an embodiment, the agents correspond to typed S-expressions associated with a numerical wealth. In an S-expression embodiment of agents, the agents may each have a root node with two branches, a left branch and a right branch. An example is shown in FIG. 1. The left branch is of numerical type (typically integer) and is computed first, and the bid of the agent is the lesser of the number it returns (if any) and the wealth of the agent. If the agent's bid wins the auction, then the right branch is executed, taking actions on the world. Typically, as the left branch is executed to find the bid, actions proposed are simulated on the instance. Typically the language used for agents includes instructions that sense values in the domain of the instance, such as look(pointer) which may sense the state of a planar problem domain at a location specified by the present location of a pointer and the language may also include instructions that take actions or simulated actions on the problem domain, such as move(direction, distance) which may move a robot arm in the specified direction a specified distance. For example, if the problem domain is to lay out a circuit on a planar chip, the actions might include actions moving a pointer to different locations on the chip and actions writing circuit elements at locations on the current location of the pointer. In the example of FIG. 1, the bid of the agent will be 12+the numerical value located at pointer_location, and if the agent wins the auction, it will take the action of moving a simulated robot arm 3 steps east.

In another embodiment, each agent may be associated with a pattern, and a program specifying actions. During the auction the system may attempt to match the pattern with the problem domain, or possibly against internal computational storage. Such patterns may specify certain structures, and contain "wild-cards" or variables or "don't cares" that can match broad classes of items. Such wild-cards may also be reused in the program specifying actions, and when the pattern matches, the wild-card may be bound in this program to the value it took in the match. Each agent may also be associated with a fixed numerical bid. If its pattern matches, the agent bids the minimum of its numerical bid and its wealth. If it wins the auction, its action program may be run. For example, in a program to play the game of Go (which is played on a 19 by 19 2-dimensional grid by placing black and white stones at grid points) a pattern might specify a 4 by 4 grid with black stones specified at some points, white stones specified at other points, empty grids specified at some points, and don't cares specified at other points. The pattern could be moved over the board to see if it matches the current position anywhere, and if it does, the agent could bid. If the agent wins the auction, its program might specify playing a stone at a particular location.

Figure 13:
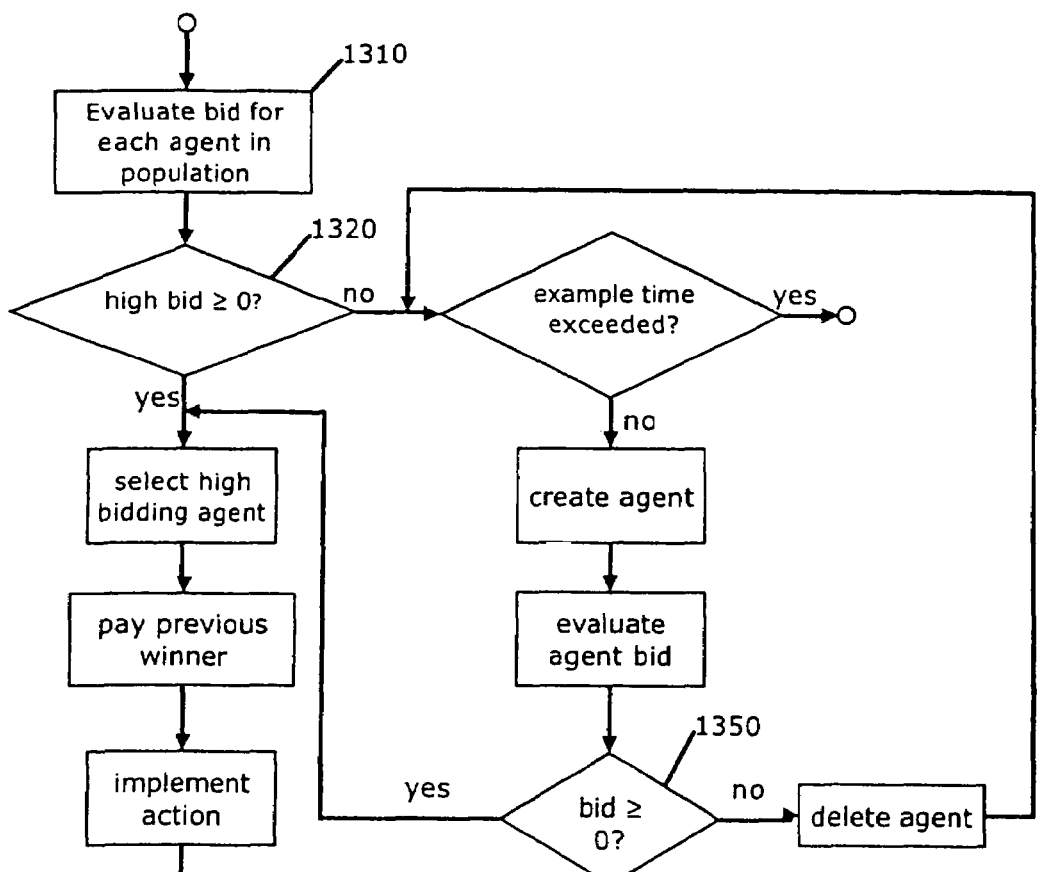
FIG. 13 is a flowchart of an embodiment of an Auction Module in FIG. 12.

FIG. 13 shows an embodiment of the auction process. Each agent in the population may have an associated program consisting of two parts: a bid part and an action part. Step one of the auction (1310) may run through all agents in the population, execute the bid part of each agent's program, and/or maintain, in a register, the name and bid of the high bidding agent yet found. Step two may ask if the high bid found is at least zero (1320). If not, a loop may be executed in which new agents are created and tested to see if it bids at least zero until the time allotted for the example is exceeded. (The time allotted for a single example is a parameter in the system that will typically be substantially smaller than the overall time allotted to evolve a satisfactory EES system.) If time is exceeded, the auction may be terminated. If a new agent is found with a non-negative bid (1350), it may be inserted in the population. If the auction has not terminated, the high bidding agent may be selected. It pays its bid to the agent winning the previous auction. (If there was no previous auction because this is the first auction in the example then the agent pays its bid to a special agent called "Root".) Then the action part of the winning bidder's program may be executed by a computer and any actions it specifies on the example are taken. Then the auction may terminate.

An alternative embodiment of the auction process may be more efficient for the embodiment where agents have a more restrictive form. In some embodiments, (such as the pattern embodiment described above) the bid part of the agent's program may be a condition that specifies whether the agent chooses to bid, but if the agent bids, its bid may be a fixed numeric constant associated with the agent. For such fixed-bid agents, since the auction may simply look for the high bidding agent, the agents can be maintained in order sorted by bid. Then, rather than evaluating the bid condition of every agent, it may be sufficient to evaluate the bid conditions of agents in descending order of bid, until an agent may be found that chooses to bid.

FIG. 14 shows an embodiment of the end of instance update. First, the agent winning the last auction may be paid a reward as specified in the objective function for the example. This payment may typically be zero if time was exceeded, a substantial payment proportional to the difficulty of the instance if it was solved, and/or a partial payment if substantial progress was made. Second, all agents that were evaluated or partially evaluated may have their wealth decreased by a small amount or tax proportional to the number of instructions they executed. This step may be taken to promote evolution of efficient code, and to remove from the population inactive agents. Third, agents with less wealth than the amount with which they were initiated may be removed from the population and any remaining wealth returned to their parent or creator. Finally, a running measure may be updated indicating how well the system is performing on instances. Typically this may be an average of reward paid on instances, weighted to reflect more heavily recent instances.

FIG. 15 shows an embodiment of the termination decision. The running measure of performance may be compared to the satisfaction condition. If the satisfaction condition is exceeded, indicating that the program has solved most recent instances and that those instances have been of adequate difficulty, then the EES may output as a program and execution of the Module Constructor terminated. If the satisfaction condition has not yet been exceeded, a check may be done to see if a global time limit has been exceeded. If it has, the Module constructor may terminate with a report of failure. If time has not yet been exceeded, computation continues.

Figure 16:
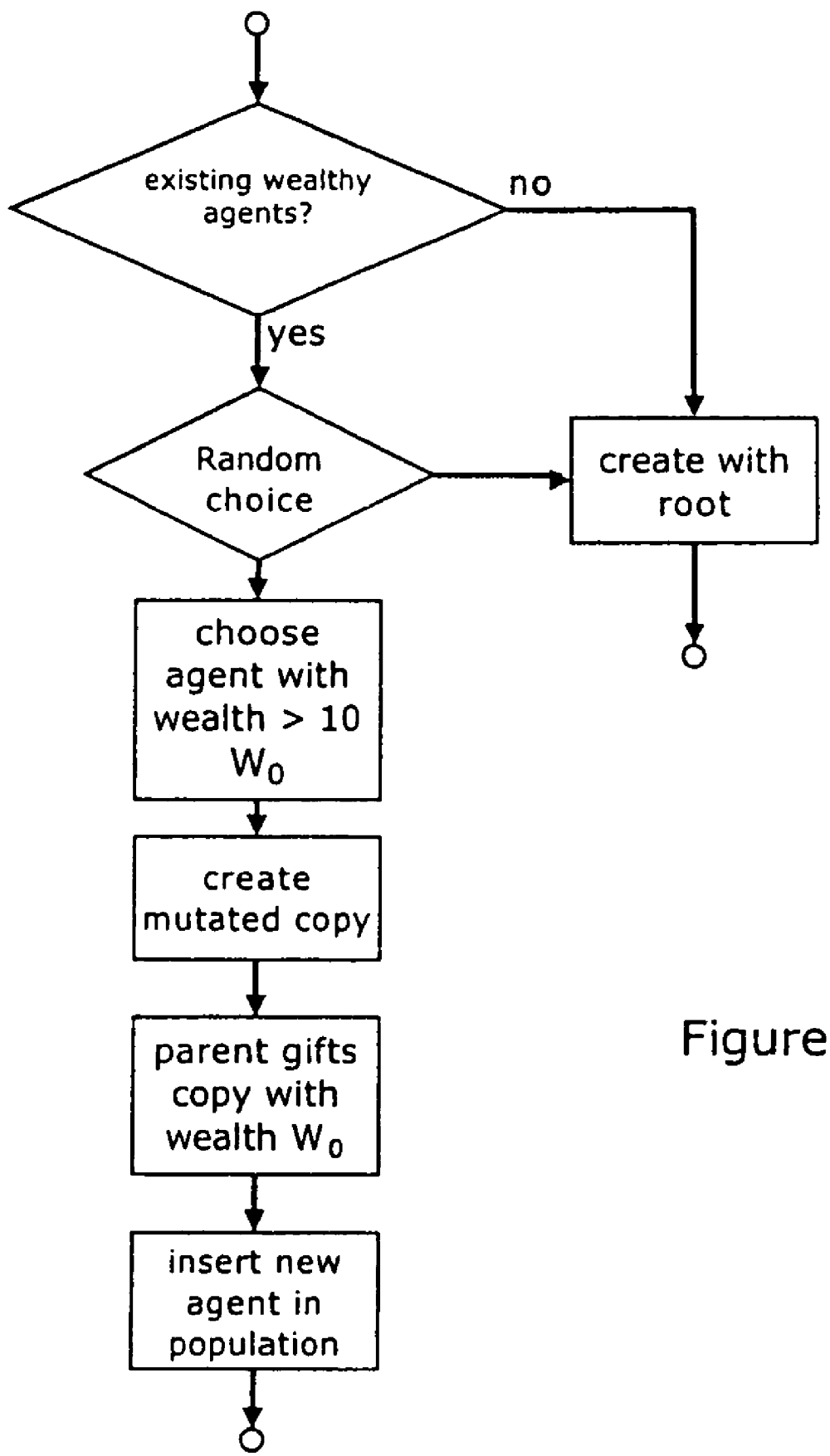
FIG. 16 is a flowchart of an embodiment which may create agents.

FIG. 16 shows an embodiment of the Create Agent process. If there are no agents in the population that have wealth at least 10W_0, for W_0 a constant, "Root" may be used to create an agent. Else, a random choice may be made whether to create agent using "Root" or by modifying an existing agent. Create with Root creates a new random agent, and endows it with zero money if Root has wealth<=0, or with a fixed initiation amount W_0 if Root has wealth>=W_0, or else with all of Root's money. Creation of a new random agent may be done by creating a random program for the action part and a random program for the bid part. The creation of a random program may be done as was discussed with regard to FIG. 5 for creating random code, except that it may be necessary to separately create random programs for the bid part of the agent and the action part of the agent.

Creation by modifying an existing agent may be done by first randomly selecting an agent from the population that has wealth at least 10W_0. A copy may be made of this agent and the copy randomly mutated. Wealth W_0 may be transferred from the parent agent to the mutated copy and the mutated copy inserted in the population.

For many problems, it may be hard or impossible to specify a program that can directly construct a solution satisfying design constraints. One example may be game playing, where human players typically consider numerous lines of play before settling on one, and where computer programs have come to outplay humans in several games (e.g. Chess, Othello, Checkers) by virtue of their ability to search an enormous number of lines rapidly. Another example may be optimization problems, such as the famous Traveling Salesperson Problem, where computer programs can find very nearly optimal solutions for problem instances involving thousands or even tens of thousands of cities by intelligently employing searches. Another example may be planning problems, where it is common to search over various plausible plans before settling on a satisfactory or optimal one. Artificial Intelligence programs very often employ substantial searches.

The module-constructors so far described generate programs that attempt to solve the presented design criteria without searching. To be clear: the evolutionary program itself often does a vast amount of search over programs in an effort to find a program that will solve problems of the presented type (such as a program to find good chess moves), but the program that they design does not itself search in solving problems it is presented (such as finding a good chess move in a presented position). Since, as mentioned above, it may be that for many important design problems, no satisfactory non-searching program exists, or any such program that does exist may be very hard to find, these methods may often be doomed to failure.

Embodiments of module-constructors that construct programs, where the program constructed solves presented problems by search, will be described below. These embodiments are crafted so that they may efficiently evolve programs having the property that the evolved program may do a highly efficient search resulting in a solution to presented design criteria. The module-constructors thus may evolve programs that themselves search only promising avenues to find a solution that is highly fit according to an objective function for the particular problem.

Figure 17:
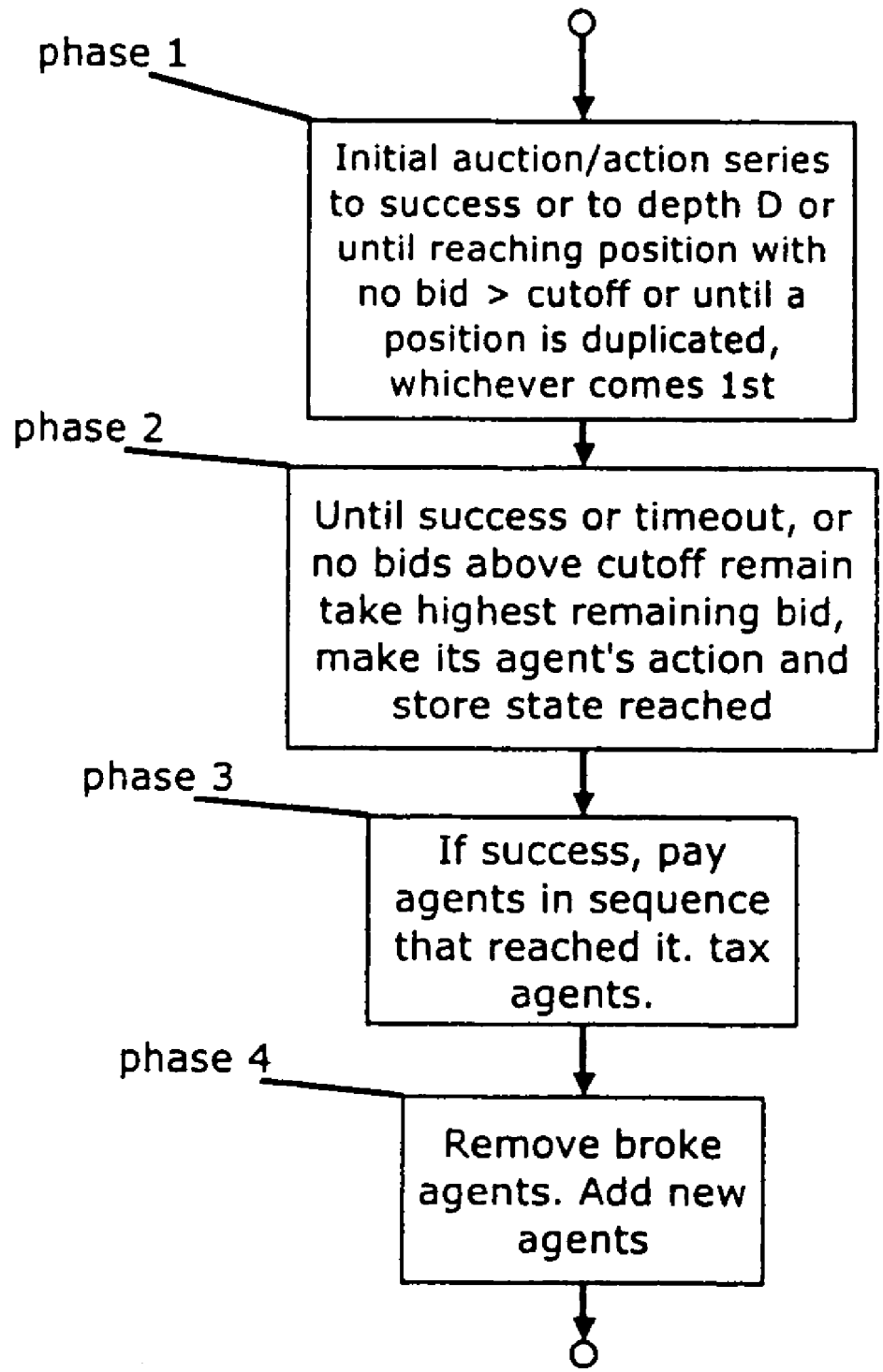
FIG. 17 is a flowchart of an embodiment of a Module Constructor which may construct programs doing an efficient search.

FIG. 17 shows an alternative embodiment of a EES module constructor that may be particularly appropriate for problems involving search. There may be four phases. Phase 1 may be similar to the procedure in other EES implementations, in that there is a series of auctions and actions. However, the winning agents may not pay their bid to the previous agent, but rather may simply be charged (with no other agent being paid). Thus, in this step, a series of auctions may be performed. In each such auction, agents in the system may be evaluated to see if they want to bid, for example, as described above for other EES embodiments, by running on a computer the portion of a program associated to the agent that computes whether the agent wishes to bid and if so how much it wishes to bid. All bids greater than a cutoff may be stored, together with the name and action of the agent, in a table indexed by the simulated position. A hash table may be used for doing such storage efficiently, since it allows rapid check of whether two positions are identical. The bids may also be stored in a sorted list, labeled with the position, so that the position with the highest bid can be rapidly found. This storage is for later use, as will be seen below.

The high bidding agent may win each auction (provided its bid is higher than a cutoff), it may be charged its bid, and its action may be taken in simulation. The state of the simulation reached by applying its action may be checked to see if the design goal has been achieved. If it has, then the instance may be over, and a success compensation routine (that will be described shortly) may be applied. If the design goal has not been achieved, the state of the simulation may be stored. Another auction may then be held, the bids stored as before indexed by the new position, and so on. Each auction in phase 1 may be held to find agents bidding to act at the state reached by the action of the last winning agent, thus the agents, in computing their bids and proposed actions, may access inputs pertaining to the domain or domain simulation corresponding to the last reached state.

As states are reached and stored in this process, the stored information may be said to correspond to a graph, in as much as a graph may be generically defined by a collection of nodes and a collection of edges. Each stored domain state may correspond to a node, and the agent actions taking a domain state to another may correspond to an edge between the respective nodes. The graph may be called a search graph. It may record the series of actions that have been searched and the states reached. The graph may be said to have a root, which is the starting position. So before any auctions are held, the graph might be said to consist of only a single node, the root. Then after the first auction, one might have a graph consisting of the root node, edges from that node corresponding to actions proposed by agents bidding in the auction, and a second node corresponding to a state reached by applying an action proposed by the high bidding agent in that auction (assuming that action reaches a state different than the initial state). In phase 1, a second auction might then be held to find agents bidding to take actions at the state corresponding to said second node, and a third node may be added corresponding to a position reached by applying an action proposed by the winning agent in this second auction.

In said graph, there may be a shortest path from the root to any given other node. The depth of the node may be said to be the number of edges in said shortest path. For example, the depth of the root node would be zero, the depth of the first node added may be 1, and so on. A graph with a root and only one path from the root to any other node is sometimes called a tree. In phase 1, after each auction a new edge is added to the highest depth node, and unless the position found corresponds to a position previously found, a new node of next higher depth may be added. As will be discussed below, in later phases edges may be added to lower depth nodes, and some of these edges may provide alternative (and possibly shorter) paths from the root to previously added nodes, so the depth of the nodes may change.

This process may proceed in phase 1 until either (a) the design criteria or goals are achieved (success); (b) a time limit is exceeded (in which case it may fail on the instance); (c) the depth cutoff is reached; or (d) a position is duplicated. In one preferred embodiment, the depth cutoff may be taken to be 1, so that phase 1 will end after a single auction. In that case, one will typically have a search graph comprising two nodes, the root node and a node representing the position reached by applying the action of the winning agent, and an edge between these two nodes corresponding to that action. There would typically also be associated with each of these nodes a number of stored bids, representing bids by other agents that were made at that position but which have not yet won an auction.

Phase 2 may be followed once phase 1 ends through termination condition (c) or (d). (If phase 1 ends through termination condition (a) or (b), we may go directly to phase 3.) In phase 2, the system may iterate the process of taking the highest remaining stored bid, at any position reached in the search so far, simulating the action of the agent proposing this bid from that position, and charging that agent the bid. The position reached by this simulated action may be checked to see if it has previously been reached. If it has not been previously reached, it may be checked to see if it satisfies the design criteria. If it has satisfied the design criteria, the success compensation routine (phase 3) may be followed. Otherwise, if the position has not been previously reached, this state may be added to the hash table, and a EES auction may be held starting from this state. The bids proposed in that auction may be added to the storage associated with the state, together with the names and actions of the agents proposing them, but the high bidding agent's action may not be immediately taken unless, pursuant to the iteration in phase 2, it is now associated with the highest remaining stored bid. Phase 2 may be followed until either success is achieved, or no bid remains above the cutoff, or a time limit is reached. If it terminates for either of the latter two reasons, the instance may fail.

If phase 1 or phase 2 terminates in success, the agents that directly led to the success state may be rewarded. That is, if the success is achieved in phase 1, all the agents that won auctions may be rewarded (because all these agents took actions, which led in a sequence to the success state). If the success state is reached in phase 2, then the agents whose actions led in a direct sequence to the success state may be rewarded.

Figure 18:
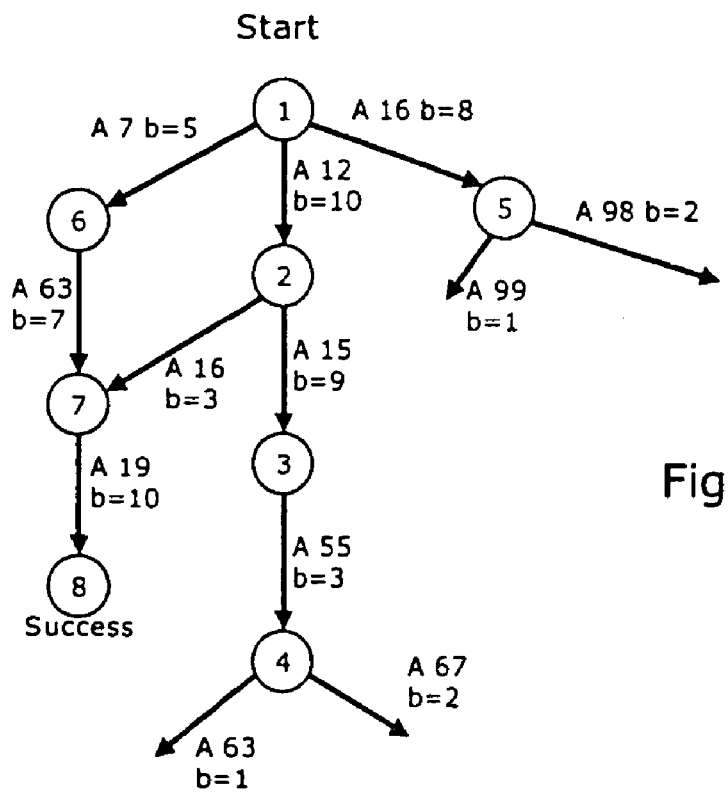
FIGS. 18a and b are diagrams illustrating the operation of the Module Constructor flowcharted in FIG. 17.
Figure 18:
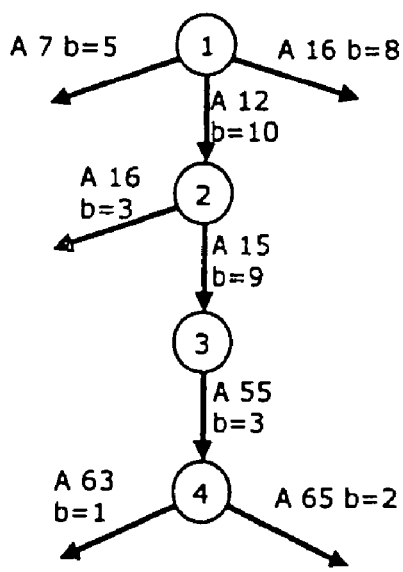

An example of the operation is shown in FIG. 18a. Consider the first operation of the method if the depth cutoff is taken to be 3. The start state is labeled state 1. Three agents bid, A12 bids 10, A16 bids 8, and A7 bids 5. These bids are stored. A12 thus wins the auction, it is charged 10, and its action is taken reaching state 2. In state 2, two agents bid. A16 bids 3 and A15 bids 9. These bids are stored. A15 thus wins the second auction, it is charged 9, and its action is taken reaching state 3. In state 3, only A55 bids, and it bids 3. It thus wins the auction, it is charged 3, and its action is taken reaching state 4. In state 4, two agents bid: A63 bids 1 and A67 bids 2. In this example, the depth cutoff is 3, so phase 1 then terminates, with the bids in state 4 stored, but none yet accepted. At this point, the search tree that has been constructed consists only of the nodes 1,2,3, and 4, and is shown in FIG. 18b.

Next phase 2 begins. Phase 2 begins by backing up to the highest bid that has not yet been accepted, which was the bid of A16 in state 1. A16 is charged its bid of 8, and its action is taken, reaching state 5. An auction is held in state 5, resulting in bids of 2 by A98 and 1 by A99, which are stored. Next we back up to the highest remaining stored bid, which is the bid of A7 from state 1 of 5. This generates state 6, so we hold an auction at state 6, in which there is only one bidder, A63, who bids 7. We store this, and back up to the highest remaining stored bid. This happens to be the bid of A63 in state 6, so we simulate the action of A63, reaching state 7. Then we hold an auction in state 7, which generates only one bid, A19 who bids 10. We store this. Then we backup to the highest remaining stored bid, which is A19 in state 7. We execute the action of A19 from state 7, reaching state 8, which is recognized as a success state (in this example).

Once we have reached the success state, the agents whose actions took us there are compensated. In this example, agents A7, A63, and A19 are rewarded. As shown in FIG. 18a, A16 also would have reached state 7 (by an alternate path) but since A16's action was never implemented, we don't know that and A16 is not rewarded. In a preferred embodiment, if multiple paths lead to the success state, only the first path followed is rewarded.

Note that agents may compute their bid depending on the state, so that for example A63 chooses to bid 1 in state 4 and chooses to bid 7 in state 6. Typically the agent program will take inputs corresponding to the domain state, and compute appropriately depending on its inputs.

With reference to FIG. 18a, the example is next discussed where the depth cutoff is chosen to be 1. In this embodiment, as before, the start state is labeled state 1. As each state is generated, it may be checked to see if it is a success state. Three agents bid, A12 bids 10, A16 bids 8, and A7 bids 5. These bids are stored. A12 wins the auction, it is charged 10, and its action is taken reaching state 2. In state 2, two agents bid. A16 bids 3 and A15 bids 9. These bids are stored, associated with node 2. Now phase 1 ends, because the depth cutoff is 1. Phase 2 begins, and thus the high remaining bid among all stored bids is taken, which is the bid of A15. A15 is charged 9, and its action is taken, generating state 3. Agents are polled to see which wish to bid in state 3, and only one agent chooses to bid, the bid of 3 by A55. This bid is stored. Again the high bid among all stored bids is taken, which is now the bid 8 of A16 at state 1. The action of A16 is simulated from state 1, generating state 5, which is added to the search graph. An auction is held at state 5, in which two agents bid, A99 bids 1 and A98 bids 2. These bids are stored associated with state 5. Note that in this embodiment, with depth cutoff 1, state 5 was generated and added to the search graph before state 4, in contrast to the previous example with depth cutoff 3, in which state 4 was added before state 5. Next the high stored bid again is taken, which is the bid 5 of A7 at state 1. A7's action is simulated on the state associated with node 1 (state 1), yielding state 6. An auction is held at state 6, in which only A63 bids. A63's bid of 7 is stored associated with state 6. Next again the high stored bid is found, which is the bid of A63 from state 6. The action of A63 is taken on the state 6, yielding state 7. An auction is held at state 7, in which only one agent bids, A19 bidding 10. A19's bid is stored. Again the high stored bid is taken, which is A19's bid. A19's action is taken on state 7, yielding state 8, which is recognized as a success state. Now phase 2 ends. Note that in this example, by contrast to the previous example using depth cutoff 3, state 4 is never generated and added to the search graph. As before, the agents that lead to the success state, A7, A63, and A19, will now be rewarded, that is their wealth will be augmented. Note that at any given step in the process, the node selected may simply be the one with the highest remaining bid, and may thus be some node other than the most recently generated node or the deepest node. Note also that the whole process may be performed automatically on a computer, by running an appropriate program, which invokes stored programs associated with the agents. Some agents may be hand programmed, especially initial agents, or the agents may be generated by an automatic program.

The system may be trained on a number of instances in a given environment. After each instance, as with EES embodiments previously discussed, agents that spent time bidding may be taxed, and certain agents (in this case, the ones leading to a success state) may be rewarded. A creation step may be held, in which new agents are introduced either as modifications of existing wealthy agents, or by the Root agent as random agents. This process of introducing agents as modifications of existing wealthy agents may be automated, and performed by a computer program.

As with other EES embodiments, once the system has been trained, it may be employed with the payment, charges, and agent creation disabled, in purely computational (rather than learning) mode.

The reason this EES embodiment may be effective is that it learns to carry out an optimized search. Agents may be rewarded (and thus may be successful in the system) if they lead to success. At the same time, they may be unsuccessful if they bid too high and in too many states, because each time their bid is accepted in a state they may be charged. Thus the agents that profit may be those who only bid when they are likely to lead to a successful outcome. Thus the system may learn to produce a collection of agents that leads only to a brief search. Moreover, when an agent's bid is accepted, as it may only be paid when it is the first to lead to a success state, so it may be rewarded for bidding higher than competing agents. Thus agents' bids may be pushed to estimate the likelihood that the agent soon leads to success, so backing up iteratively to consider the highest remaining bid may be an efficient and effective strategy that first searches the most promising alternatives.

Note that the search-EES may differ from ordinary or non-search EES's in that it may store a search graph of visited positions and may store the bids proposed by agents at these positions and then may return to consider actions proposed by these agents at previously visited positions in this search graph. Ordinary EES's, as described above, and related programs in the existing literature, may proceed in a linear order, following a single line of actions. The search EES's may return to consider actions at previous positions and thus may search a tree or a graph of possibilities. The actions explored in this search may not only be taken from positions other than the last visited, but may be taken from positions of lower or higher depth, or positions not adjacent on the search, to the position last visited or created or added to the search.

In an alternative embodiment, if it is desirable to search deeper or shallower, the procedure of which agents bid is selected may be slightly modified. For example, if it is desired to search more broadly, rather than simply choosing the highest stored bid, one may compare the stored bids minus a factor such as epsilon times the depth of the node, for epsilon of some positive parameter. Or if it is desired to search more deeply one may compare the stored bids plus a factor such as epsilon times the depth of the node.

An alternative (but related) embodiment that may be particularly useful may be the specialization to game playing and other adversarial environments. Search is often very important in game playing. Computer chess programs have recently beaten the best humans by employing massive searches. Even human game players perform substantial searches. An example of an adversarial environment other than a game might be a domain where one wishes to establish conclusively that one could always succeed in achieving some objective, but many events could occur which are not in one's control that may impact the outcome. For example, one might have a simulation of a complex domain, such as a power plant, and wish to establish that no matter what events transpire, one could always find a plan that would ensure a safe shutdown of the plant. In this case, one could treat adversarial events as due to an opponent with the ability to cause certain simulated events in certain circumstances, whose goal is to prevent a safe shutdown of the plant.

The game search EES may be similar to the search EES, but may involve two adversaries, player A and player B, and may train two sets of agents (A agents and B agents.) The success criteria for the two may be in opposition, so that the success of player A may be the failure of player B, and vice versa. For example, we may use a simple evaluation function, returning a number, that shows the value of a given position. A's evaluation may be taken as the negative of B's, and A's goal to achieve a position with a sufficiently high evaluation. The use of evaluation functions is standard in the game tree search literature.

In order to provide a clear exposition, we first sketch the similarities and differences between game-search EES and search-EES, and then return below to provide more detailed description of the game-search EES.

As in the search EES, the game-search EES may involve 4 phases. Phase 1 may call a module, Linear_Search, that searches down a single line (as before in phase 1) until a termination condition is encountered. A difference from before, is that in alternating auctions only A agents (respectively B agents) may be allowed to bid. Thus, linear search goes down the best line for both players (best as indicated by highest bid among their agents) until it reaches a position where it evaluates that one side or the other is winning.

Then as before, in Phase 2, we may go back and expand the search to multiple lines, looking for actions that received lower bids, but which may lead to a better outcome. There may be three differences here from the simple search EES. The first difference may be that, if A is winning, we may only search for deviations by B (and vice versa). A may be said to be winning if the search so far achieves the success criteria for A. So in phase 2, if A is winning, one may go back and call Linear_Search for alternative B agents (in order of decreasing bid) looking for a better move for B. If B finds such a move (so that it is then winning) the search may switch to looking for a better A move. This process may continue until a termination condition is reached. The reason for this constraint may be that it promotes efficiency: we only need to find one alternative that wins, once we know we are winning (satisfying the design constraints) we don't need to look for alternative methods. In problems where there are degrees of winning, one may wish to relax this and do a broader search, as discussed below.

A second difference from the simple search-EES is that one may only consider deviations from positions which are on a primary variation. A position may be in a primary variation if no prior deviation is known for the opponent (say A) that leads to a better outcome for A than playing to this position. Thus, if B plays the sequence of moves that lead to the position, then he can expect that A will also, and the position will be reached. The reason for this constraint is that there may be no point in searching B's alternatives from hypothetical positions that A will never move to.

A third difference from a simple search-EES is that in search EES, one may iteratively expanded only a single action. In game-search EES when one returns and expands a new line, one executes the Linear_Search routine, which may expand down a line a number of moves. The reason for this difference is that in adversarial situations, it may be necessary to consider counter-moves to the newly proposed move before its strength can be reasonably evaluated.

Then in Phase 3, one may reward only those agents on the winning side whose presence was necessary to refute some options by the losing side. As before, this may promote efficient search. Because losing agents may not be compensated, the system may evolve to recognize losing positions and avoid bidding, so the necessary search may evolve to be short. One may also again tax agents who bid.

Finally, in Phase 4, as with other EESs, one may create new agents as modifications of wealthy ones, and may remove agents with too low wealth, so that the system may evolve. In an alternative embodiment, agents with wealth lower than a threshold (such as zero, or alternatively the wealth which they were initiated) may simply become inactive and cease to bid.

We now explain this procedure in more detail. Linear_Search starts from a given position, with a given player (say A) to move, and holds a series of auctions. In the first auction, only agents of the player (A) to move in the opening position bid, the high bidder may win, may be charged its bid, and its action may be taken in simulation. All other bids (and the names and actions of the agents that bid them) may be stored tagged with the position, for later use. The second auction may proceed from the position reached by the action taken in the first, and includes only the agents of the opposite player. This proceeds until a termination condition is fulfilled.

The termination condition may be similar to search-EES. If one reaches a position where the criteria of success (for one side or the other) is established, Linear_Search may conclude. If one reaches a position where no agent offers a bid above a cutoff, Linear_Search may conclude. If one reaches a position that is a depth D auctions from the opening position, Linear_Search may conclude (for some cutoff D, which may be taken to be 1 in a preferred embodiment). If one reaches a position previously visited, Linear_Search may conclude. Finally if allotted time ends, one may terminate.

In phase 1, as before, a series of auctions may be held. The only difference may be that in alternating auctions, only A agents (respectively B agents) are allowed to bid. Thus (if A is to move in the initial position) the first auction may poll A agents to see which wish to bid in the initial position. The bids of the agents are stored, together with their names, as before, and the action of the high bidding agent may be taken in simulation, generating a new position. Then, a B auction may be held, in which B agents are polled to see which wish to bid, and so on, with at each position, only the agents of the player on move participating in the auction. An equivalent way to say this is that, in any given position, one side is on move, and only agents for the side on move may bid.

In phase 2, as in search-EES, one may iteratively return and expand previously visited positions. However, one may only visit positions on primary variations. One may say a position is on a primary variation for A if, should A choose to play toward it at each position, B has no option yet expanded in our search tree that is better for him or her. Thus a position is on a primary variation for A, if the position is reachable by some series of moves by A when it is his/her turn, under the assumption that B makes the optimal moves according to the currently expanded game tree when it is his or her turn. The optimal moves for B and A (and thus the primary variations) may be computed using the well known min-max algorithm that walks up a tree from evaluations at the leaves, assigning values to each node.

Figure 19:
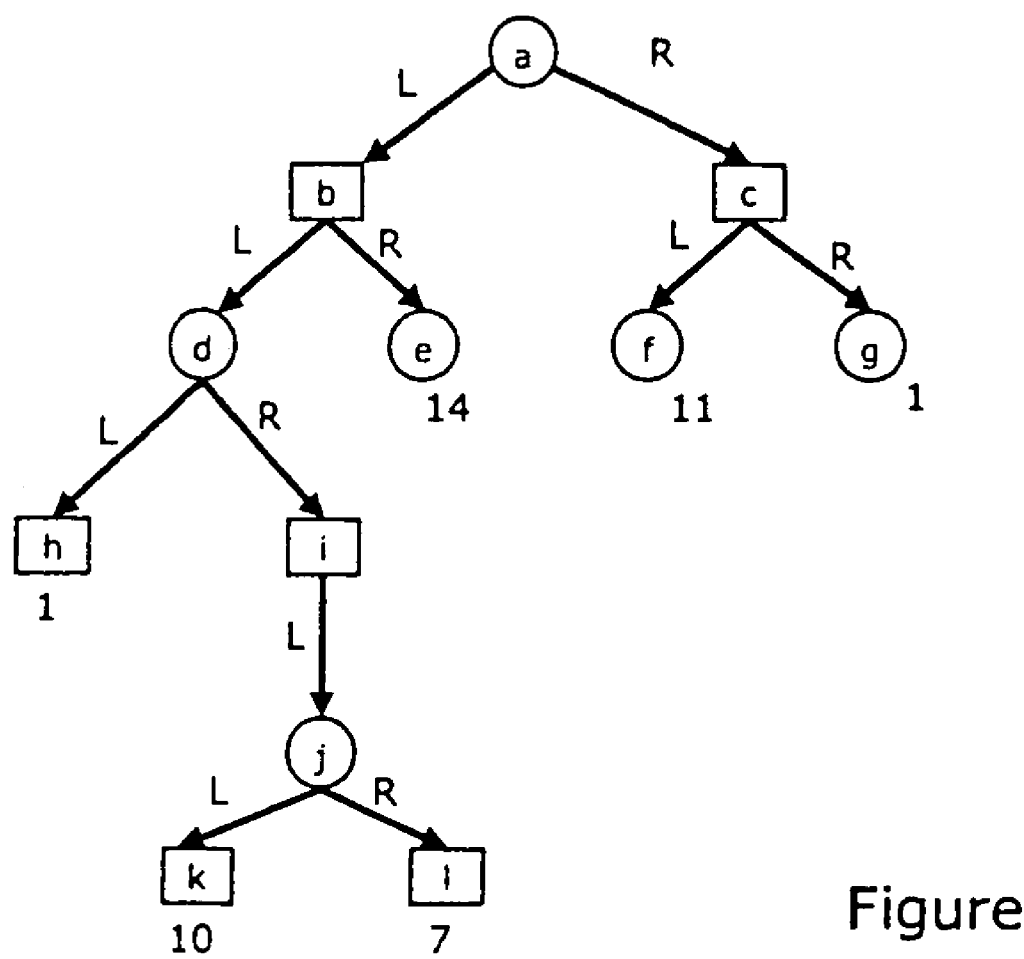
FIG. 19 is an example of a game tree.

This may be clear from the example game tree shown in FIG. 19. Positions where player A is to move are indicated by circles, and positions where player B is to move are indicated by squares. The positions are labeled with letters (a,b,c, etc). The leaves of the tree, that is the positions (h, k, l, f and g) that have no children, are labeled with numbers indicating their evaluation from A's perspective. So a high valuation is a good position for A and a bad one for B. The positions that are on primary variations for player B are positions b,i, and k. The positions that are on primary variations for player A are positions a,d,g, and j. The reason positions b, i, and k are on a primary variation for player B, is that player A will choose the sequence of moves that lead to these positions if B does, because by so doing A maximizes his/her eventual payoff (according to the evaluations of the leaves of the tree). For example, at position a, A's best move according to the min-max algorithm is L, so B can expect to play in position b. If B in position b makes move L, to position d, then A can be expected to move R to i, so B can expect an opportunity to play in position i. The reason positions d, g, and l are on the primary variation for A, are likewise that B will move to these. For example, if A were to choose to move R at position a to reach position c, then B would prefer to move R to reach position g (evaluation 1 for A) rather than choosing move L in position c to reach position f (evaluation 11 for A). Thus if A were to discover a better move at position g (say leading to a position with an evaluation 12 for A), then B would not already have a better option.

After phase 1 terminates, phase 2 may begin. Phase 2 at any given time, may be in one of two possible conditions: B search-mode, or A search-mode. It may be in A search mode if B is currently winning, and vice-versa. So if phase 1 concluded with A successful, then phase 2 may begin in B search-mode, and vice versa. Cases where the current search has not established a path to a position where either side has achieved its satisfaction criteria will be discussed below.

During phase 2, the score at any given time in the search, which side is ahead or winning, may be determined by the principal variation. The principal variation is a standard concept in game tree search. It is defined by assuming that player A, whenever she is to move, makes the best move available to her, and player B whenever he is to move, makes the best move available to him. The best move is defined as the one that results in the best ultimate outcome for that player, according to the leaf evaluations of the tree as so far expanded, assuming that the other player plays optimally according to the same tree (and again may be calculated using min-max).

At any given time, there may be a sequence of moves that A would plan to make because they are the best available to her in the position (so far as analysis has yet determined) and a sequence of moves that B would make because they are the best available to him so far as analysis has yet determined. The principal variation is the line where both players make these best available moves. In FIG. 19, the principal variation is the sequence of positions a, b, d, i, j, k.

In phase 2, if one player (say A) is currently winning, one may iteratively return to the position on other player's (say B's) primary variation with the highest remaining bid and perform a Linear_Search from there starting with this high bidding agent. This iteration may occur until B is judged winning, in which case one may switch the search and continue looking for ways to restore A as the winner. This iteration may continue until either a state is reached where no eligible position has a remaining bid above the cutoff, or the time limit is exceeded.

In phase 3, the highest bidding agent on the winning side in each position may be rewarded. As in other EESs, all agents on either side may be taxed. Agents that are broke (have money less than a cutoff, typically the amount of money with which new agents are injected into the system) may be removed.

In phase 4, new agents may be added as mutations or modifications of existing agents, promoting evolution of the system.

Figure 20A:
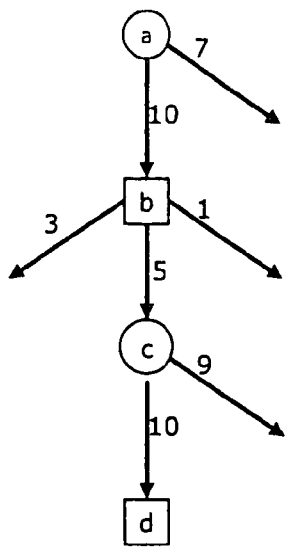
FIGS. 20a-c illustrate an example of operation of a Module Constructor which may construct programs doing efficient search in adversarial domains such as games.
Figure 20B:
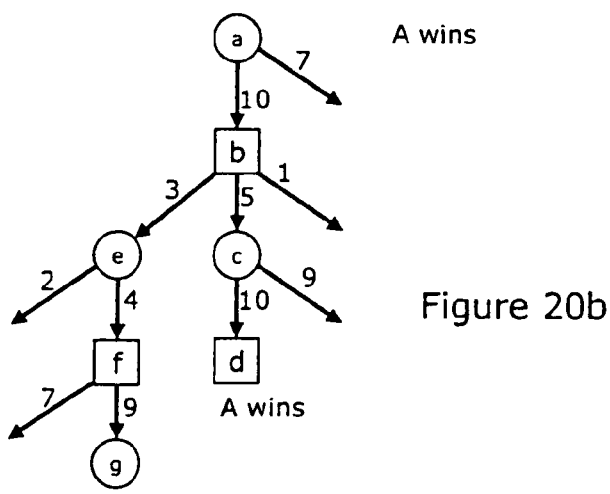
Figure 20C:
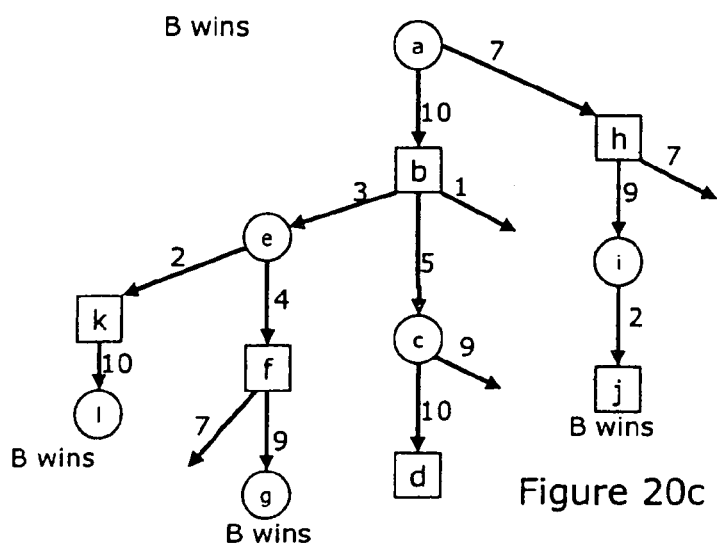

This process may be followed in the following example, diagrammed in FIGS. 20*a-c*. In FIG. 20*a*, phase 1 is shown. The game begins in state (a), with player A to move. A has two agents that match the position, bidding respectively 10 and 7. The lower bidding agent's name, bid and action are stored. The higher bidding agent wins the auction, and his action is taken which generates position (b), with B to move. B has three agents that match position (b), bidding respectively 5, 3, and 1. The lower bidding agents' names, bids, and actions are stored, and the higher bidding agent wins the auction, leading to position (c), with A to move. In position (c) A has two agents bidding respectively 10 and 9. The lower bidding agent's name, bid, and action are stored, and the higher bidding agent's action is followed, leading to position (d). In position (d), it is recognized that A wins, so Phase 1 comes to an end.

Phase 2 now begins, looking for alternative moves by B. This is diagrammed in FIG. 20*b*. There are two stored agents. The higher bidding one is followed, the agent bidding 3 in state (b). This generates state (e), from which a Linear_Search is continued. The Linear_Search finds two A agents bidding in state (e), respectively bidding 4 and 2. The lower bidding agent's name, bid, and action are stored, and the higher bidding agent's action implemented, creating state (f). In state (f) B has two agents that bid. The lower bidding agent bids 7, and its bid, name, and action are stored. The higher bidding agent bids 9, and his action generates position (g). In position (g) it is recognized that B wins, so this linear search terminates. This reaches the position shown in FIG. 20b.

Because B is now winning, Phase 2 continues looking at A alternatives. The highest stored A bid is the bid of 9 in state (c), but this position is not on A's primary variation, because B would choose the agent taking him from state (b) to state (e), rather than the agent taking him to state (c) (because from state (c) A already has a winning alternative, namely to move to state (d)). So it makes no sense for A to consider moves from state (c) at this time. Instead, A performs a Linear_Search starting from the high bidding agent in a state on the primary variation, which is the agent bidding 7 in state (a). This Linear_Search generates states (h), (i), and (j) where it terminates with the recognition that B wins. A then performs a linear search starting from her only remaining stored agent in a state on a primary variation, namely the agent bidding 2 in state (e). This Linear_Search generates states (k) and (l), where it terminates because again it is recognized that B wins. A has no further stored agents at any position on a primary variation, so Phase 2 concludes with B winning. The search concludes in the position shown in FIG. 20c.

The discussion above assumed that there was a satisfaction criteria, which was either fulfilled or not, and that the search continued until it found a path to a position where the satisfaction criteria of one side was achieved. Other cases may include a range of outcomes, or where it may be too complex to analyze far enough to establish one side winning or losing. For example, in the game of Backgammon one might win by various scores, and also since there is a chance element the best that can be generally established in look-ahead is a qualitative or statistical evaluation of a position, rather than a fixed score. In such events, phase 1 may proceed as above. However, in phase 2, if one has no clear winner (or if the winner could potentially find an alternative move that would allow him a higher score), one may iteratively perform search-pairs consisting of an X-search and a Y-search (for X one of A or B and Y the other) until either one exceeds time limitations or a search pair fails to change the achieved score or a search pair achieves a satisfactory score for X. Typically, if one is more interested in establishing a satisfactory score for A (say because one is playing A, or because one is interested in an adversarial simulation in establishing a particular bound on how bad things can become and A represents the side trying to achieve a positive outcome) one may choose A for X so that one does not have to perform an extra iteration. At this point one again may proceed to phase 3 and reward the agents on the winning side.

Note that in many embodiments the game played may be symmetrical. For example, in chess the two sides differ only in color. In such circumstances, it may be appropriate to maintain a single set of agents. Before each instance, two copies of this set may be made, one designated player A and the other designated player B, with the copy designated player A bidding only when A is to move and similarly for the B agents. In this embodiment, at the end of each instance's phase 3, before any agents are removed for having too little money, the monetary gains and losses of each agent may be totaled between the two copies, and a single set of agents again created. Agents having too low money may then be removed. Phase 4 may then be as before, with new agents added to the system as modifications or mutations of existing wealthy agents. Then before the next instance, two copies may again be made for accounting purposes.

The game-search EES may also be useful for cases which are not symmetrical, where different sets of A agents and B agents are maintained. An example where different agents are maintained is in a life or death search in the game of Go. In playing Go, an important concept is to decide whether or not a group of stones of one color are "alive" (meaning they can not be killed by the opponent) or "dead" meaning they can. We may apply the game search EES to learn to calculate this function. In this case, it is appropriate to maintain a set of A agents that learn moves useful for killing groups, and to maintain a separate set of B agents saving groups. Then the game-search EES module constructor may be used to create a EES module that may calculate whether a group is alive or dead. This module may be used as a subroutine in a larger game-playing program, as will be further described below.

As with other EES modules, once they have been trained, it is possible to turn off payments, taxation, death, and/or new agent construction, and just use the system as a program that does an efficient search to perform a function, in this case, to decide life and death of groups. Note however that the program produced by the game-search EES differs from the ordinary EESs in that it does a search over various alternatives to decide the issue or solve a problem, whereas ordinary EESs only produce one linear sequence of agents in an effort to decide an issue or solve a problem.

We next describe a method and scaffold that may be used to learn to compute concepts by combining a number of sub-concepts. We will describe the case for games, but a similar method and scaffold may be used in non-adversarial situations. This may also be seen as an example of several of the methods previously described. The scaffold is: P(. a) [annotation type 2, supply examples of causes until no further causes then enter end; annotation type 3, use Game_Search_EES module constructor] where the procedure P(. a) is: Game_Search_EES(initial_agents=(list_union (map(agents,a))))

Here, as described in the section on scaffolds, the notation ". a" in the argument of the scaffold P is like dotted tail notation in LISP. It instructs the system to expect a series of arguments until told otherwise. So when the scaffold is trained, it will first attempt to solve for its first argument, which it will do, following the type 2 annotation, by asking the user to supply examples of a first cause. The user may supply examples of a cause, which will be used (following annotation of type 3) to train a game_search_EES module constructor to construct a module. Then the scaffold will ask the user to supply examples of a second cause. The user may decline, or may supply examples of a second cause. If she does, then a game_search_EES will construct a second module. Then the scaffold will ask the user to supply examples of a third cause. This will continue until the user indicates that she does not wish to supply further causes.

Since all of the arguments of the scaffold have now been trained, the scaffold will now be trained on the overall design problem. Since its procedure is a Game_Search_EES, it will train a Game_Search_EES on the overall problem. According to its annotation, it will start with an initial agent set constructed as follows. Agents may be supplied a function that when applied to a EES program, extracts the set of its agents. Map may be a function that given a function g and a list l=(a_1, a_2, . . . ), returns the list (g(a_1), g(a_2), . . . ). List_union may be a function that given a list of sets, returns the union of the sets. So the Game_Search_EES may be trained starting with an initial agent set that is the union of the agents found for each of the causes.

Figure 21:
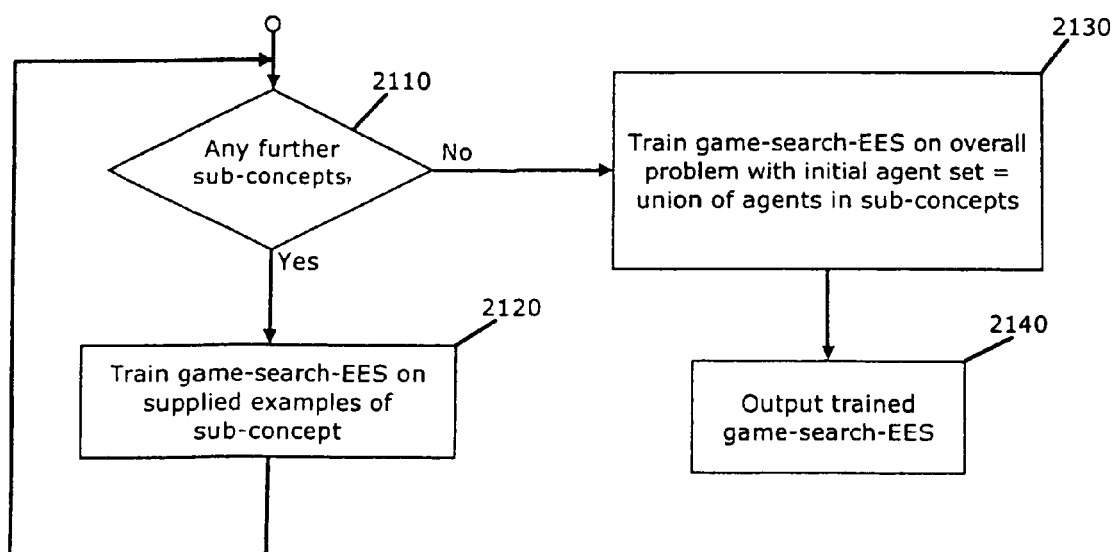
FIG. 21 is a flowchart of training a scaffold for learning how to combine causes in games.

FIG. 21 shows a flowchart of the method specified by this scaffold. So long as the user wishes to supply examples of new sub-concepts (2110), we train a game-search-EES on these examples (2120). Once no more sub-concepts are to be added, we may train a game-search-EES on the overall design problem starting with initial agent set to the union of the agent sets learned from the previous training on sub-concepts (2130). Then we output the trained program as solution to the design problem (2140).

Since a game-search_EES is ultimately trained, the program that is output will evaluate presented situations by doing a search over moves proposed by agents.

This basic method can also be used specifying regular search-EESs or regular EESs or other module-constructors that learn a program which is a fixed function of a collection of agents for other applications than games.

Module-constructors such as EESs may often be better able to learn a single sub-concept at a time than if an overall design problem is simply supplied to a learning algorithm, and once they have learned sub-concepts it may be much easier to learn to solve the overall design problem starting from the progress that has been made.

A particular application may be learning life or death in the game of Go. Go is a game typically played on a 19 by 19 board with black and white stones. An important concept for playing Go is whether a collection of stones called a group can achieve a status of "life" (meaning that the opponent can not kill it) or whether it is "dead". The approach described here may learn a large collection of patterns that work together to solve life or death problems.

In Go, humans recognize that groups can be made to live in several different ways. One way is to connect them to another group of the same color that lives. Another way is to expand the group into an open region of the board and make 2 eyes there. ("2 eyes" is a Go concept that guarantees life.) Another way is to kill attacking groups of the other color. Another way is to make 2 eyes in a large space already enclosed by the group. A user of the above method may supply examples of cases in which groups live by each of these methods. Separate game-search-EESs may learn agents adept at performing each of these methods, as well as learning adversary agents adept at denying these methods and thus killing the group. These agents may recognize patterns and suggest appropriate moves. Since the patterns are automatically created, mutated, and tried, collections of agents may be discovered that cover the space well and interact well together. Then in the final step these agents may be combined into one overall game-search-EES, that is then trained on examples of life and death problems where multiple methods may be combined (for example, feinting at connecting to another living group of the same color, and then turning on an adversary group and killing it.)

We next describe a method and scaffolds for planning. A scaffold may be described that implements the method, and may allow construction of programs that learn how to apply the method in new environments. Moreover, evolutionary programs may invoke the scaffold, so that it facilitates the construction of programs to solve design problems.

A generic scaffold for planning may have the following structure: P(domain_simulation, initial_state, goals, action_operators, useful_structure) [annotations]. Here the domain_simulation may be a program that simulates a domain on which we may wish to solve planning problems. The initial_state may be a starting state in the domain, and goals may be specifications of conditions in the domain we may wish to achieve. Action_operators may be a set of action operators that affect the domain_simulation in ways that simulate corresponding actions that we might take on the domain. A successful plan may be a sequence of action operators that takes the domain_simulation from the initial_state to a state at which the goals are achieved. P may be a procedure, implemented in some programming language, that searches over candidate plans (typically sequences of action operators) and returns a successful plan or reports failure. Useful_structure may be functions that may be computed on the simulated domain and may be used by the planning algorithm to guide its search for plans.

In alternative embodiments, some of the arguments of P may be suppressed or absent. For example, the domain_simulation may not be explicitly supplied, as an argument, but rather separately maintained, and the action operators affect it through side-effects. However, planning algorithms generically need to access a domain simulation (for example, to compute whether a sequence of actions does or does not satisfy the goals). If the scaffold is to be applicable to a variety of domains, it may need to be informed of the particular domain and actions available; and if it is to be able to achieve various goals starting from various initial states, it needs to be informed of these, so we have shown these as arguments.

Figure 22:
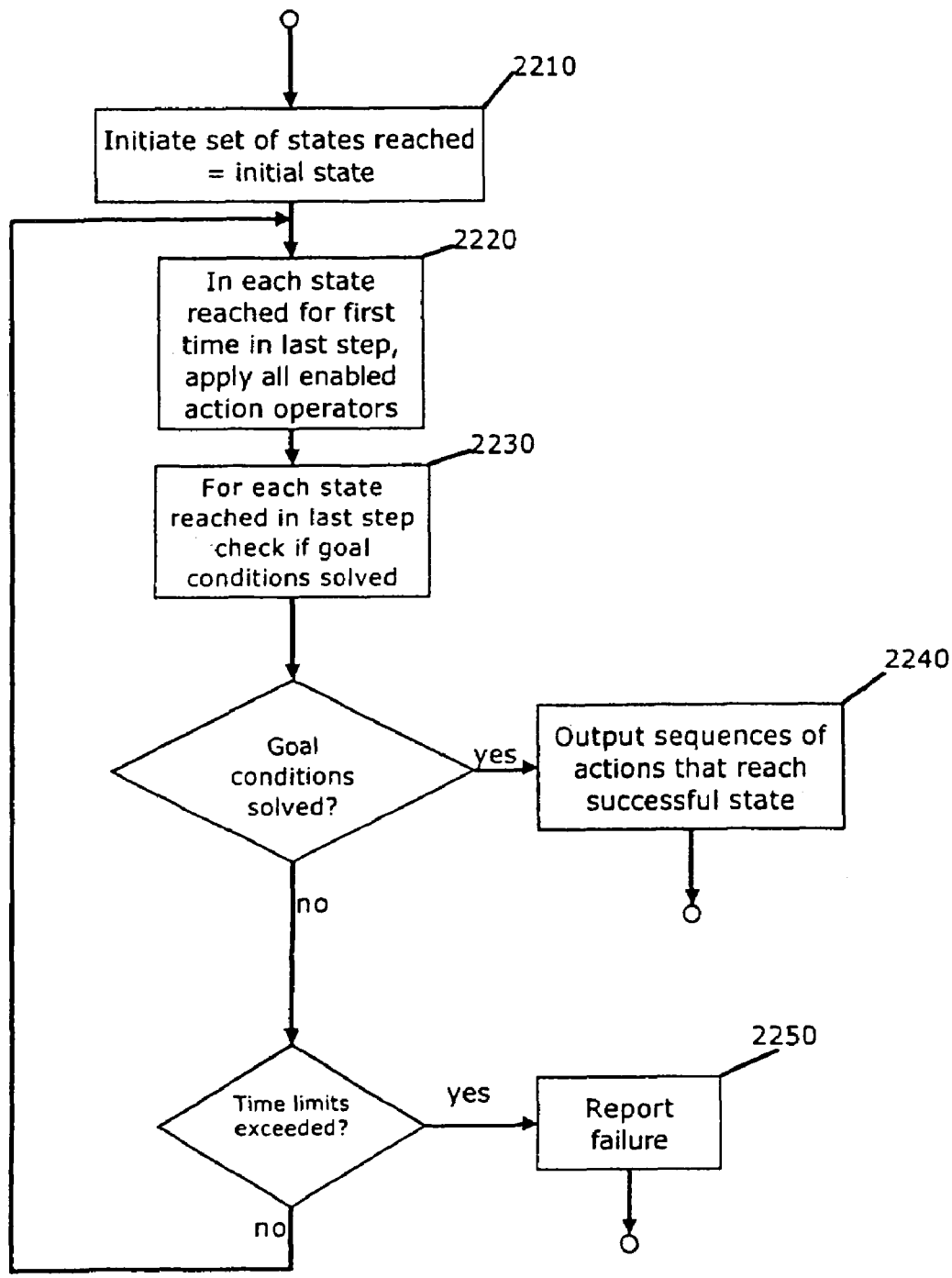
FIG. 22 is a flowchart for a dynamic programming algorithm for planning.

A particularly simple embodiment of such a P may utilize dynamic programming. With reference to FIG. 22, one may start by initiating the set of states reached and the set of states reached for the first time to the initial_state fig (2210). (FIG. 22 assumes that the initial state does not satisfy the goals, a check could be provided and return success if so.) Then we iterate the following process. For each state that has just been reached for the first time, apply all action operators that are enabled in the state, keeping track of all states that are reached in this way (2220). (Action operators often have prerequisites before they can be used, for example you can't walk through a door unless it is open, so action operators will only be enabled in states where their prerequisites are satisfied.) Check if any of these states satisfy the goal condition (2230). If yes, then we have found a sequence of operators that go from the initial state to the goal state, and we output it (2240). Otherwise, if time limits are exceeded we fail (2250). Otherwise we simply iterate the process. This will find a plan, if a plan exists and is short enough that time limits are not exceeded, but in many domains will be highly inefficient because it may search over a vast number of sequences of actions not leading in a useful direction. It is so inefficient, in fact, that it will often fail on realistic problems.

If one or more planning scaffolds are supplied in a system or CAD tool, they may be used by module constructors and automated program constructors such as genetic programming. One embodiment of this is as follows: The procedure P is simply added to the set of instructions available to the module constructor or the automated program constructor, and programs are evolved in the usual way that incorporate this planning instruction.

Typically, this will not be practical, because the search space may be too large. However, if several of the arguments of P are fixed, the search space may be restricted and it may become practical to use a planning procedure in this way, particularly if the planning procedure itself is efficient. In particular, almost all applications of genetic programming or other automated program construction methods, involve a particular domain simulation, so the domain_simulation can be fixed to the relevant domain simulation. Moreover, usually a set of action_operators may be fixed. If the useful structure can be fixed, one is left with a function: P(initial_state,goals) that may reasonably be supplied to an evolutionary programming algorithm. Planning may be a very powerful method of solving problems, particularly if an efficient planner is supplied, so supplying a planner may substantially improve the abilities of an automated programming system.

The "useful structure" in general may be some module or modules that is employed by the planning algorithm to plan more efficiently than the brute force dynamical programming algorithm. The planning procedure P may be a domain independent planner, that utilizes domain knowledge in the form of useful structures, which are then tailored to or specific to the domain. Thus it is natural for the useful structures to be module-constructed from examples supplied by the user, and the scaffold may provide annotations suggesting that such examples be provided and supplied to a module constructor.

Relevance based planning (RBP) may be efficient because it searches only over actions that are deemed relevant to achieving the goal. It proceeds in the following phases.

First, a set of high-level plans are found. An example of a method of finding these is the following. RBP is supplied with a set of obstacles that are potentially movable. It may perform dynamic programming using the action-operator set, but ignoring any restrictions on actions coming from potentially movable objects. In the standard dynamic programming algorithm, discussed above with reference to FIG. 22, one applied all enabled action operators in each new state, where an action operator is deemed enabled if it could be applied in the state. In its first phase, RBP applies action operators even if they are not enabled in the state, so long as the obstacles to their being enabled are potentially affectable by actions. For example, if one wanted to walk south through a door but the door was closed, the action "walk south one pace" might not be enabled, because it would have as prerequisite opening the door. RBP may ignore this prerequisite, and construct a high-level plan that involves walking through the door as if it weren't there. Because it allows such powerful actions, it may find very short high-level plans where standard dynamic programming would time out and report failure.

Second, the plans are scored according to the estimated cost it will take to achieve them. Typically, the cost of a plan may be the sum of the known cost of the actions in the plan, plus a lower bound on the cost of actions to remove obstacles in the way of the plan (such as opening the door).

Third, we iteratively work on the plan with lowest estimated cost. We work on plans by going through them in time order, and expanding the next unresolved element. This will be discussed more below, but basically involves looking at all relevant next actions. A next action may be relevant if it affects an obstacle preventing the next action in the plan. One way an obstacle might prevent such an action is by simply being in the way (like the door in the example above). Another way an obstacle might be relevant to a next proposed action is by being part of a deadlock created when the action is taken in the current position.

The RBP may be supplied with a deadlock detector that detects local configurations that prevent any possible sequence of actions from achieving the goals. The deadlock detector may be "useful structure" that is employed by the RBP to facilitate efficient planning. When the deadlock detector detects a deadlock after a simulated action, it returns the set of obstacles participating in the deadlock. Plans will then be added that have as next subgoal (ahead of performing said simulated action) being to move these obstacles so that said deadlock is not encountered when said action is made.

RBP may iteratively work on the lowest cost plan, and on the next element of that plan in time sequence until either it finds a plan that achieves the goals, or it runs out of proposed plans. Because it iteratively works on the lowest estimated cost plan, when it finds a plan it may find a low cost one. Because it searches only actions judged relevant, it may find a plan efficiently and rapidly. Because it works in time-ordered fashion on the plans, and maintains a simulation of the position the plan has reached to that time, it may judge which actions are possible at any given point, enabling it to avoid considering some actions that might be irrelevant because they are impossible.

The RBP scaffold contains a procedure that implements the RBP algorithm, and has an annotation asking the user to supply a deadlock function appropriate to the problem, or to supply examples of deadlocks to an appropriate module constructor for the problem. One appropriate module constructor takes a known set of deadlock positions (for example, supplied by the user) and backs up to find other deadlock positions. This is appropriate if the action-operators can be simulated in reverse, as is often the case. If one backs up from a deadlock position to find a state such that some action-operator takes that state to the deadlock position, then that state is a candidate deadlock position. It can be promoted to a known deadlock position if all action-operators take it to known deadlocks. One may then iterate the set of steps:

(1) start with a collection of known deadlocks,
(2) create the set of backup states from the deadlocks,
(3) test the backup states to see which are deadlocks, and
(4) update the set of known deadlocks.

This may be iterated as many times as convenient to find a collection of deadlock states.

Alternatively, one may apply a EES or other module constructor to find patterns that reliably indicate deadlocks.

We next describe a scaffold that may guide and facilitate the construction of programs that solve design problems in 2-dimensional domains. If a human expert wishes to evaluate a position on a 2-dimensional domain, he will often recognize local structure in the domain, separately evaluate the local structures, and then form an overall evaluation by combining the local evaluations in an appropriate way. For example, if a human is evaluating a position in Go, he may analyze that certain clusters of stones should be considered as groups and evaluated separately, and then evaluate the board by combining such evaluations. Or if a human is evaluating a proposed traffic flow plan for a city, she may analyze that certain regions should be considered separately and then combine such analysis into an overall evaluation. One could in principle solve the problem of producing a program to evaluate Go positions by providing examples of evaluated Go positions to a genetic programming algorithm, and asking it to produce a program that correctly evaluates those examples. Or one could in principle solve the problem of producing a traffic flow analyzer by supplying examples of evaluated traffic flow problems to a genetic program, and asking it to produce a program that correctly evaluates those examples. But in both cases the problem might be so large that the genetic program would in practice have great difficulty in succeeding. The generic genetic programming approach would address these problems just as it would problems not involving 2-dimensional structure, and thus have no way of exploiting the existence of the 2-dimensional structure in order to solve more efficiently. However, we may instead supply a scaffold that allows such programs to be produced in steps that respect the local structure, and profit from it computationally, in ways motivated by the human reasoning analogue.

A first step may learn a program that finds local structure in the domain. A second step may learn a program that evaluates regions belonging to a given local structure. A third step may learn or produce a program that combines evaluations of local structure into an overall evaluation.

In an embodiment, such a scaffold may have the following structure:

GBR(W,P,Q,R) [annotations] where GBR is the procedure of the scaffold (and will be detailed below), W,P,Q, and R are arguments, and the annotations will be described.

W is a world state, supplied to the program, in the form of a grid, with a data structure assigned to each node of the grid.

For example, W might be data representing the state of a Go board, thus might contain a 19 by 19 matrix of lists, with each list containing data that indicates whether a particular intersection of the board contains a black stone or a white stone or is empty or is empty but has another status than a standard empty point because one side or the other can not play in it on the next move without violating the "Ko" rule (a rule applying to certain restricted situations in Go.) Or alternatively, for example, W might be a similar data structure indicating the state of a war game or a 2-dimensional circuit layout. Since a list may be assigned to each grid-point, the lists are indexed by the grid-points, so that for example a function (list_retrieve (i,j)) returns the list associated with the grid-point i,j. The annotation for the W argument may indicate to the user to supply an appropriate data-structure for the problem.

The annotation for P indicates that the user should supply as P a program that acts on a data structure with the form W and may annotate it by marking out the important local structures that could be used in analyzing the domain. More specifically, P should mark each grid-point in the first local structure with a 1, and each grid-point in the second local structure with a 2, and so on. Alternatively, the annotation should indicate that if the user does not wish to supply a program P, the user should supply examples of local structure to a module creator that will produce a program to analyze data structures of form W and so annotate them. Such training may be accomplished as follows. Examples may be supplied consisting of W matrices, a grid-point z, and a list of grid-points belonging to the same local structure as z. A module constructor may be trained from such examples to produce a program P'(W', z') that acts on a matrix W' of appropriate form and a grid-point z' and outputs a list of grid-points belonging to the same local structure as z'. This may be done using various module constructors where a program will be judged fitter when it correctly classifies the given examples and less fit when it mistakes the given examples. The program P may then consist of F(P'), where F is the function that first applies P' to the grid-point z=(0,0), and then applies P' to the next grid-point not in the local structure including z as determined by P', and iterates this process until it has constructed the desired annotation of the entire grid. P' may be trained from localized examples, and may be trained provided appropriate examples can be supplied by the user even though the user may be unable to specify a program that would actually identify the important local structure. We will call the local structures found by P in W "groups".

A function GP(P(W)) may now produce a list of triples (group-number,nodes,edges) where group-number may be a number running from 0 to one less than the number of distinct groups found by P in W, nodes may be a list of pairs, where the first element of each such pair is a grid-point in W corresponding to the group with annotation group-number and the second element of each such pair are the annotations in W associated with that grid-point, and the list of pairs in a node may include one pair for each grid-point corresponding to the group, and edges may be a list of other group-numbers having the property that a grid-point with that group-number is adjacent to a grid-point with annotation group-number. The function GP may be trivially computed by a program that runs over the grid-points and counts the number of distinct values of P annotations, and then runs over the grid-points and forms a list of the nodes with a given value of P annotation, and then for each value of P-annotation runs over the grid-points with said value and collects a list of P-annotations of their neighbors.

Since in computer science, a graph is defined as a list of nodes together with, for each of the nodes, a list of other nodes deemed connected to it, the function GP can be seen to define a graph, with nodes consisting of group-numbers and edges as specified above.

The annotation for Q indicates that the user should supply, as Q, a program evaluating a local region corresponding to a group, or else should supply examples from which such a program can be trained and invoke a module constructor to construct the examples. Suitable examples may include the same local structures supplied as training examples for P, together with numerical evaluations of the value of said local structure. Note that producing a suitable Q again requires solving a design problem only involving localized structure, and localized examples.

The annotation for R indicates that the user should supply, as R, a program combining values of local structures into an overall evaluation of the state of W, or should choose a suitable program R from a supplied library of such programs, or should supply examples and invoke a module constructor to produce such a program.

Such a supplied library may include the program which runs over all the groups in the set, evaluates Q on each group, and sums the Q values. Said program may be written as $V = \mathrm{sum\_over\_values}(\mathrm{map}(Q(GP(P(W)))))$ where $\mathrm{map}(Q(GP(P(W))))$ may be the function that applies Q to each group in the list returned by GP(P(W)) and sum_over_values simply sums over the values computed by Q. The library may also supply other functions which may be useful alternative methods of combining local values. One such function would be appropriate for games where adversaries make alternating moves, in which case a particular complex alternating sum may be indicated.

To invoke a module constructor to produce a program R, the user may supply examples of W matrices with various local structures, and associated known values, to a module constructor, which could then evolve a function R(Q,GP(P(W))). Note that in the evolution of a fit function of this form, the code for Q is fixed (as it has already been constructed); the code for GP is fixed (as it is fixed supplied code); the code for P is fixed (as it has already been constructed); and W is a fixed data structure. Thus the evolution or module construction of R may be restricted to act only on code that accesses the state of the problem through GP(P(W)) (and by applying Q on components of this structure) and thus may be directed to respect the previously discovered local structure of the problem.

By breaking down the overall design problem of evaluating domain instances specified by a W matrix into a series of steps, some of which are explicit fixed programs and others of which are separately trained from examples, the GBR scaffold may render previously intractable program design problems into a tractable series of steps.

A more general embodiment would allow W to be some other indexing structure than a simple matrix, such as a multi-dimensional matrix, or a graph (list of nodes and edges). Such situations may be more difficult to visualize, but, if the indexing structure preserves the actual topology of the domain of interest, could also be useful.

Another advantage of having a system which employs module constructors many times within solving a given program design problem, and over the course of solving multiple different program design problems, is that the system has the opportunity to learn from these multiple applications data and methods that expedite and facilitate future module constructions. We have already discussed two such learning mechanisms: learning better ordering of scaffold substitutions, and better ordering of consideration of scaffold arguments, and adding constructed modules and submodules to a library of modules usable as instructions for later module constructions. Another embodiment of such data storage and learning is the following.

The term "instruction" may be used to refer to a particular member of the instruction-set that is a particular primitive instruction or atom or computer program available to construct other programs. The term "instruction-instance" may refer to the use at a particular position in a program of a particular instruction.

We may assign labels to all instructions, and to new instructions as they are added to the available set of instructions used in module constructors to construct new programs. Such labels may be assigned when the instruction is added to the set. In many cases, the same label may be assigned to multiple instructions (for example, the label "integer" may be assigned to all integers), in other cases, the label may uniquely identify a given instruction. As new instructions are added to the instruction set (for example, because a module is constructed to solve a design problem, and it is decided to add it to the library of modules available to construct later programs), labels may be assigned to them (which may most often uniquely identify them).

Each time an instruction is used in a module construction, whether successfully or unsuccessfully, we may update data associated with the instruction. We may maintain the following records associated with the instruction. First, a score of the instruction may be incremented each time the instruction is used in a module-construction that successfully solves a design problem, and a frequency of the instruction may be incremented each time the instruction is employed in a module construction (whether successful or not, for example, each time a mutation introduces the instruction into a candidate program being constructed to solve a module construction problem).

Second, for each label of an instruction that takes arguments, a table may be maintained with entries for each possible label in each possible argument. Such a table may be regarded as a function, with a number of arguments equal to the number of arguments of the instruction, and a number of possible values of each argument equal to the total number of labels in the system. So for example if instruction ins3($x,y,z$) takes three arguments, we would associate with ins3 a function: score_table_ins3(label_x, label_y, label_z). Such a function may return a pair (score, frequency) which may be updated to reflect a score and a frequency associated with using said instruction in programs where it has arguments having the given labels. Whenever an instruction is used in a module construction with arguments of given type, we increment the corresponding frequency entry in its table. Whenever the module construction is successful, we may also increment the corresponding score entry.

Thus for example, if ins_3 is used in a module construction with arguments having labels (integer, module43, boolean), we would increment the second (frequency) element of the pair in score_table_ins(integer,module43,boolean) and if the module construction successfully solves a design problem, we would also increment the first (score) element of this pair.

Module constructors may utilize mutations of candidate programs or populations of candidate programs. When we mutate an instruction in a program, we generally substitute another randomly chosen instruction. With the above data, we may learn better how to module construct by using mutations that substitute instructions which are randomized, but non-uniformly chosen to result in better module-constructions. Mutations may insert instructions more often if their score divided by their frequency is higher and less often if it is lower.

In many module constructions, for example almost all module constructions that are constructing S-expressions, the instruction mutated may be filling an argument slot of another instruction which may be called the parent. The system may learn to better construct programs by preferentially using in such mutations instructions that have a higher ratio of the score to the frequency in the parent's score_table. Moreover, after making such a substitution, we may find programs to fill arguments of the inserted instruction. We may choose a tuple of instructions to fill the arguments of the inserted instruction preferentially if the score to frequency of the associated entry in the inserted instruction's score_table is higher. We may then iterate this process, filling the arguments of the instructions newly inserted in the arguments of said inserted instruction (and increasingly preferring to insert atoms as previously described) to build a new candidate program.

Figure 23A:
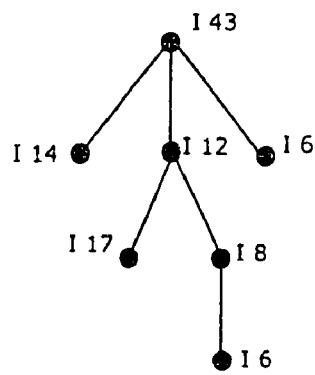
FIGS. 23a-d is an example of growing down a program illustrating how learned statistics may improve module construction.
Figure 23B:
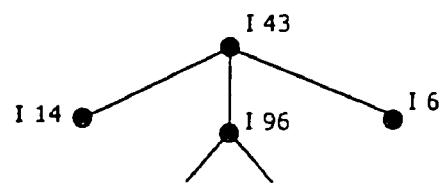

This process may be better understood with reference to the example shown in FIGS. 23a-d. In FIG. 23a, we show a tree representing an S-expression. Recall that an S-expression can be represented by a tree with instructions assigned to each node. Each node has a child corresponding to each argument in the instruction assigned to the node. The leaves of the tree correspond to atoms, which are constants or instructions that do not take arguments. In the process of module construction, the tree shown in FIG. 23a may be a candidate program, and a module constructor may attempt a mutation of this program to try to find a fitter program to solve a design problem. FIG. 23b shows the process partway through constructing a new S-expression from this candidate by mutating the node which is the second child of the root node (which is the node at the top of the tree, that has instruction I43 assigned to it). This mutation has replaced the instruction I12 by a randomly chosen instruction I96. While the process of choosing such mutations may be randomized, it need not be uniform, and may be improved by choosing I96 with probability that increases with higher score/frequency ratio in the table score_table_I43 (label(I14),label(I96),label(I6)). For example, I96 may have been more likely to have been placed here by a mutation than instruction I17 if the score/frequency ratio above is higher than the score/frequency ratio of score_table_I43(label(I14), label(I17),label(I6)).

Once an instruction has been mutated in this way, we need to provide instructions for its arguments to form a new S-expression. FIG. 23b shows that I96 takes two arguments. Thus in FIG. 23c, we may assign instructions to its two children, namely instructions I18 and I14. This pair of instructions may have been more likely to be selected because there was a high score/frequency ratio in score_table_I96(label(I18),label (I14))

Figure 23C:
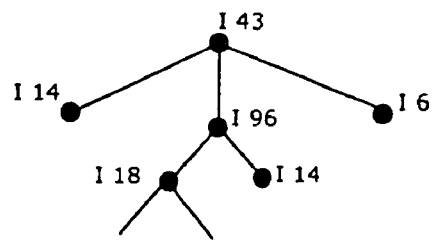
Figure 23D:
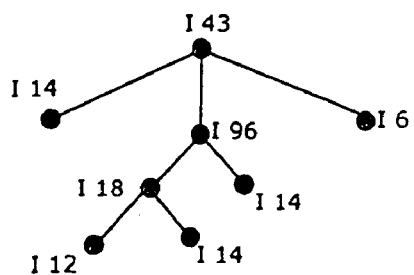

Also, as we descend the tree, instructions may be more likely to be chosen if they are atoms or have fewer arguments. This process may be continued (as shown in FIG. 23c) walking down the tree, choosing new instructions preferentially because of the elements in the associated score_table and preferentially because they have fewer arguments, until a valid S-expression is constructed.

In a more general embodiment of this process, a given instruction may be associated with multiple labels. Each time the instruction is used, it may be used with a given label, and a score and a frequency may be updated that is associated with the instruction-label pair. Likewise, we may maintain a score_table, as described above, for each instruction label-pair.

As was previously mentioned, typing may be useful (and is often applied by practitioners) in constructing S-expressions, because types constrain which instructions can be entered as S-expressions are mutated or constructed, which may make it much more likely to randomly construct useful S-expressions. The process described above is a generalization of this, which may automatically assign type-labels to new instructions, and which may learn over time to better constrain mutations and construction of new S-expressions.

Another embodiment that learns how better to perform module constructions is the following. One may maintain a collection of mutation operators and maintain scores for these mutation operators. The score of a mutation operator may be increased when it creates a module that is successful in being admitted to the evolving population and may be decreased when it creates a module that is not successful. New mutation operators may be periodically inserted into the population of mutation operators. In one embodiment these new mutation operators may be created by mutations of mutation operators. In another embodiment these mutation operators may be created by acting with mutation operators on mutation operators. Mutation operators whose score falls below a threshold may be removed from the population of mutation operators. Examples of mutation operators may include operators that substitute a particular instruction for another particular instruction or that find a particular pattern in a program (such as a small chunk of code, with some instructions in the chunk of code being determined in the pattern and others being freely varying) and substituting another particular pattern into the program in its place.

Figure 24:
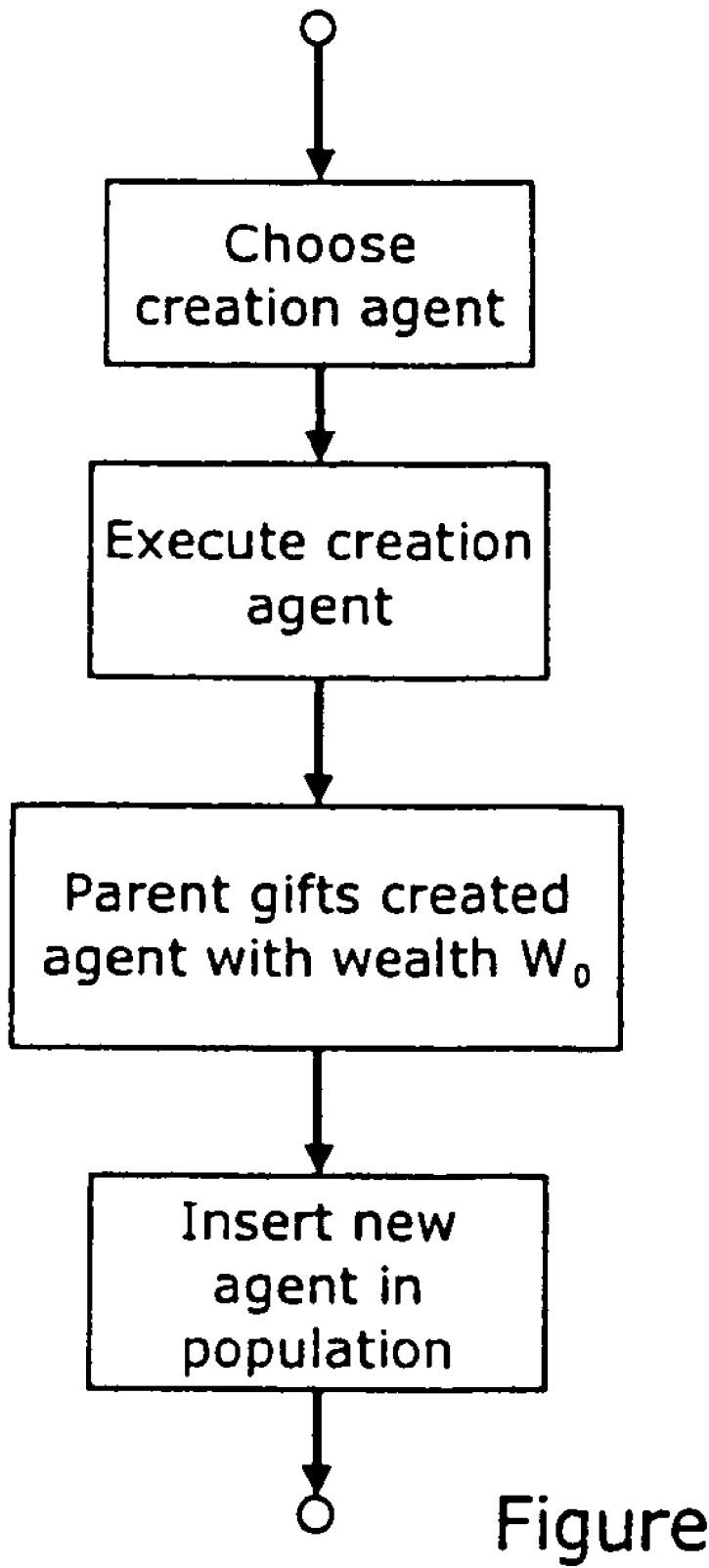
FIG. 24 is a flowchart of an embodiment of a Create Agent in FIG. 12.

A particular embodiment of this process within EES systems will be discussed. FIG. 24 shows an alternative embodiment of create agent that may employ a special create agent instruction. Agents employing the create agent instruction to create agents are called creation agents. With reference to FIG. 24, the creation process is as follows. First a creation agent with wealth at least W_0 may be chosen from the population. Then its code may be run, which may create an agent. Then the creation agent may endow its child with wealth W_0. Finally the newly created agent may be inserted in the population.

Initially, W_0 may be set to 0 and the population seeded with a root creation agent. Thus the process can get started creating. W_0 may be raised once they system is earning money.

One embodiment of the create agent instruction is that it is of the form create_by_pattern_match (left_pattern, right_pattern) where left_pattern and right_pattern can be strings of program instructions and wild cards. When this instruction is executed, it may search through the population of agents for an agent whose program contains the code specified by left-pattern, with any wild-cards in left-pattern matching arbitrary instructions, and it may then create a new agent which has the program of this matched agent except that the code matched by left-pattern may be replaced by right-pattern.

Figure 25A:
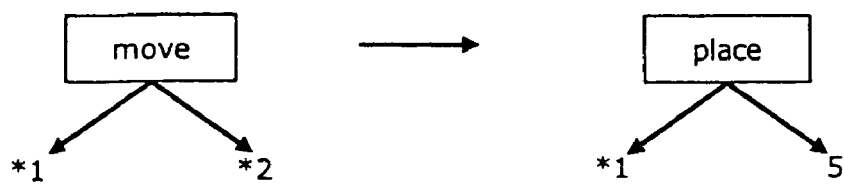
FIGS. 25a-b illustrate an example of a creation agent, with FIG. 25a showing the agent and FIG. 25b showing the result when it acts on the agent with S-expression depicted in FIG. 1.
Figure 25B:
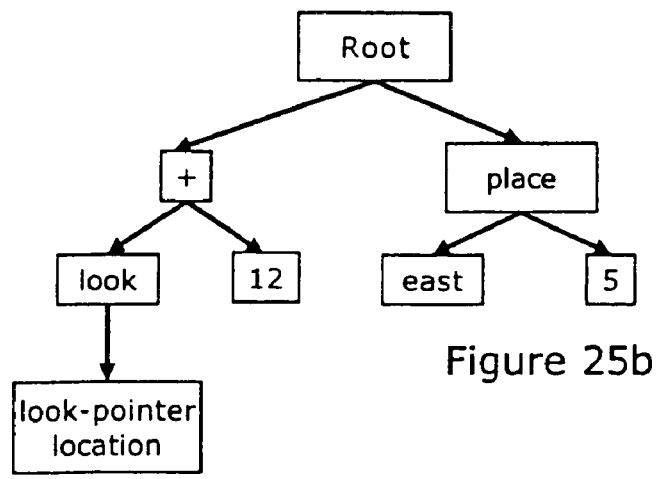

An example of the operation of such a create_by_pattern_match is shown in FIGS. 25*a-b*. FIG. 25*a* shows a left_pattern->right_pattern. Wild cards are denoted by *#, for # a number. The left pattern matches any move instruction with 2 arguments, because it has two wild-cards as arguments, so in particular if the S-expression shown in FIG. 1 were an agent in the population, the creation agent shown in FIG. 25*a* would be scanned over it and would match the move instruction. When it matches, the match would entail binding the wild-cards in the left_pattern: *1 to EAST and *2 to 3. The right_pattern would now be substituted in for the matched nodes, yielding FIG. 25*b*. Note that place was substituted where the move instruction was previously, as was both of its arguments. However, as *1 was bound to EAST, the left argument of Place was EAST again. If a create_by_pattern_match leaves any arguments unfilled, (for example, because in the right hand pattern they contain wild-cards) they may be completed by growing the program down.

As was detailed in the discussion of FIG. 14, at each end-of-instance update the parents of agents may be given a fraction of the wealth earned by the agent, so that creation agents can thus earn money. Unlike ordinary agents, which may be removed from the population at the end of instance update if they have less wealth than that which they were originally endowed, creation agents may be removed from the population if they have less wealth than they were initially endowed and they have no surviving children.

Creation agents thus earn money by creating successful children. A purpose of the create agent algorithm is that the system evolves creation agents that may be effective at creating useful agents. This can be more powerful than simply relying on a fixed set of mutation or modification operators. The creation agents that survive, and that create lots of agents, may be the ones that are good at creating agents that earn money, which they do by improving the performance of the program.

Figure 27:
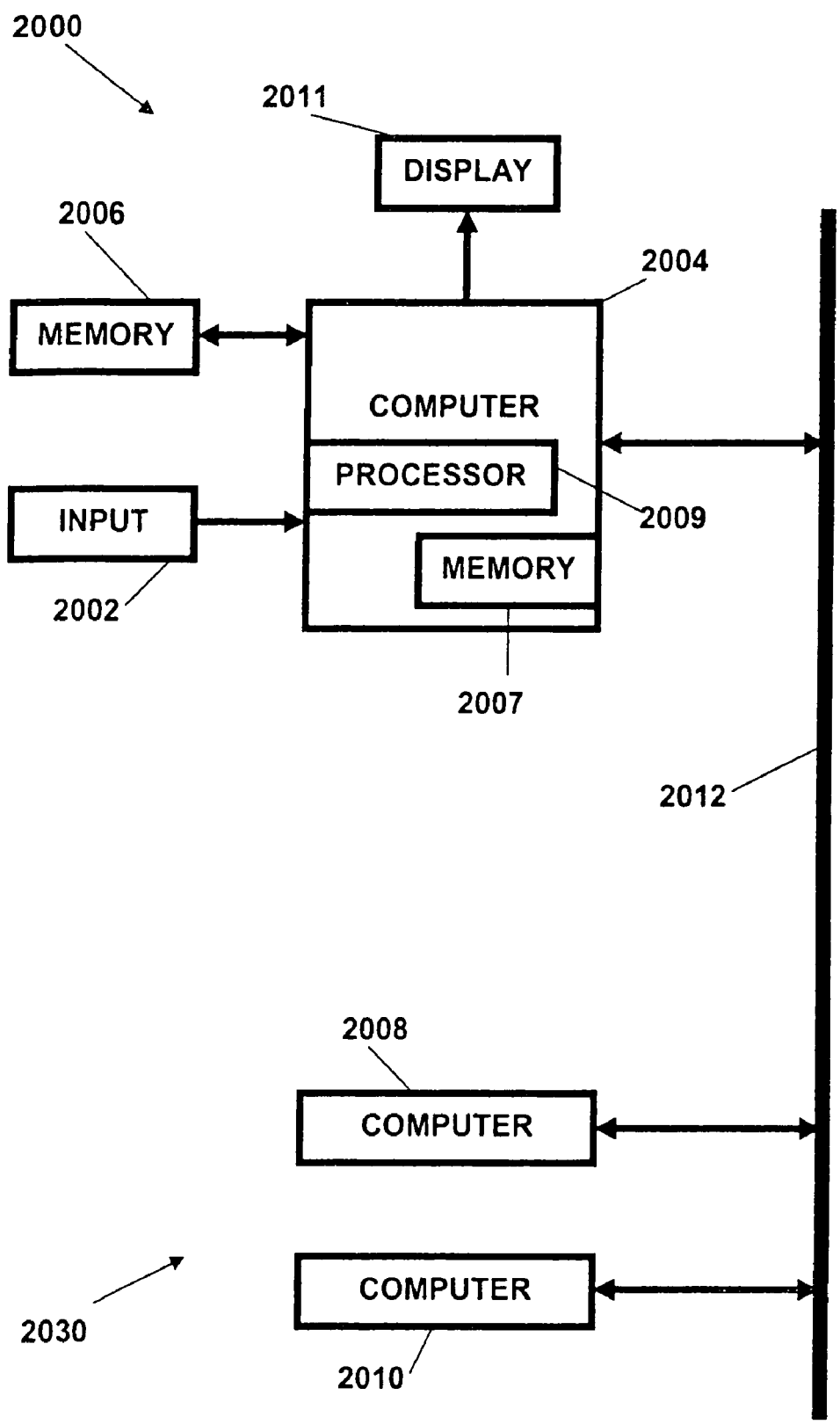
FIG. 27 is a diagram of a system in accordance with an embodiment of the present invention.

FIG. 27 illustrates a system 2000 which may be usable with the above-described programs, modules, scaffolds, instructions, libraries, module constructors, CAD tools, and/or other tools. Such system may include an input device 2002, a computer 2004, a memory 2006, and a display unit 2011 which may be coupled together as shown in FIG. 27.

The input device 2002 may enable a user or operator to enter data into the computer 2004. Such input device may be a computer keyboard, a mouse, a writing tablet, or other types of data entry devices. Such user input data may be a number of examples, a number of functions, a number of instructions, a number of satisfaction criteria, and/or a number of simulation environments. The display unit 2011 may enable data to be displayed to the operator.

The computer 2004 may include a memory 2007 and a processor 2009. The memory 2007 may have stored therein programs for use with the present invention. For example, this memory may contain a number of modules, scaffolds, instructions, subprograms, libraries, and so forth which may be used to create the desired program in a manner as previously described. The processor 2009 may be operable to perform and/or control operations used in creating the desired program. Such operations may include receiving and processing user data supplied from the input device 2002, obtaining a number of subprograms in accordance with the received user data, creating the desired program based on the obtained subprogram or subprograms, and/or running the created program to solve the problem. These operations may also include enabling the problem to be divided into a plurality of subproblems. The subprograms may be obtained from programs previously stored in memory or, alternatively, may be obtained from running a stored subprogram or subprograms utilizing the user input data.

The computer 2004 may be operable to receive a portable type memory 2006 such as a disc, semiconductor memory, or the like. Such memory 2006 may be operable to have all or any part of the above-described programs, subprograms, modules, and/or scaffolds stored therein.

Furthermore, the computer 2004 may be coupled to a network 2030 by way of a connection such as a bus 2012 or, alternatively, by wireless means. Additionally, such network may be the Internet and may include a number of other computers such as computers 2008, 2010 and so forth. As a result of such arrangement, the computer 2004 may be able to communicate with a number of other computers during its operations and/or may be able to use information from such other computers.

The following references and all the references referenced therein are herein incorporated by reference: Baum, E. B. (2004) "What is Thought?" MIT Press, Cambridge Mass.; Baum, E. B., Durdanovic, I. (2000) "An Artificial Economy of Post Production Systems in Advances in Learning Classifier Systems: Third International Workshop," IWLCS 2000 ed P. L. Lanzi, W. Stoltzmann, and S. M. Wilson 3-21 Berlin: Springer-Verlag; Baum, E. B., Durdanovic, I. (2000) "Evolution of Cooperative Problem Solving in an Artificial Economy," Neural Computation 12 (12): 2743-2775.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A computer readable medium having stored thereon a computer program executable by a computer to search for a solution achieving one or more goals in a domain, the computer program comprising:

specifying an initial node and providing a number of other nodes each representing a state of the domain;

obtaining a plurality of agents each having a respective numerical quantity associated therewith and each operable to produce one or more numerical bids and to propose one or more actions;

automatically selecting a first respective agent and a first respective node based on one or more bids from the plurality of agents;

automatically adding a new node representing a new state which is obtained by applying to a respective state represented by the first respective node an action proposed by the first respective agent;

automatically selecting a second respective agent and a second respective node different from the first respective node and different from said new node based on bids from the plurality of agents, in which the second respective agent and the second respective node are selected after the first respective agent and the first respective node are selected, and in which the first respective node and the second respective node each have a respective depth associated therewith in which the respective depth of a respective node is representative of a minimum number of sequential actions applied to reach the respective node from said initial node, and in which the depth of the second respective node is less than the depth of the first respective node; and subtracting from the numerical quantity associated with the second respective agent an amount based on the bid of the second respective agent without paying the subtracted amount into the numerical quantity associated with the agent selected immediately before the second respective agent.

2. The medium according to claim 1, the computer program further comprising automatically removing a respective agent having respective associated numerical quantity which is below a threshold quantity.

3. The medium according to claim 1, the computer program further comprising rendering a respective agent having respective associated numerical quantity which is below a threshold quantity inactive so that said respective agent is unable to bid.

4. The medium according to claim 1, in which the numerical quantities of the agents are automatically respectively adjusted so as to increase the numerical quantity of each agent whose action or actions leads to a path which achieves a desired goal.

5. The medium according to claim 1, in which the numerical quantities of the agents are automatically respectively adjusted so as to increase the numerical quantity of only the agent or agents whose action or actions leads to a path which achieves a desired goal.

6. The medium according to claim 1, in which a plurality of paths accomplish a desired goal and in which the respective numerical quantity or quantities of only the agent or agents along a first path obtained from the plurality of paths are increased.

7. The medium according to claim 1, the computer program further comprising automatically modifying an existing agent so as to create a new agent.

8. A computer system to construct a computer program to search for a solution achieving one or more goals in a domain, the system comprising:

means for specifying an initial node and providing a number of other nodes each representing a state of the domain;

means for obtaining a plurality of agents each having a respective numerical quantity associated therewith and each operable to produce one or more numerical bids and to propose one or more actions;

means for automatically selecting a first respective agent and a first respective node based on one or more bids from the plurality of agents;

means for automatically adding a new node representing a new state which is obtained by applying to a respective state represented by the first respective node an action proposed by the first respective agent;

means for automatically selecting a second respective agent and a second respective node different from the first respective node and different from said new node based on bids from the plurality of agents, in which the second respective agent and the second respective node are selected after the first respective agent and the first respective node are selected, and in which the first respective node and the second respective node each have a respective depth associated therewith in which the respective depth of a respective node is representative of a minimum number of sequential actions applied to reach the respective node from said initial node, and in which the depth of the second respective node is less than the depth of the first respective node; and means for subtracting from the numerical quantity associated with the second respective agent an amount based on the bid of the second respective agent without paying the subtracted amount into the numerical quantity associated with the agent selected immediately before the second respective agent, the means for specifying, the means for obtaining, the means for automatically selecting a first respective agent and a first respective node, the means for automatically adding, the means for automatically selecting a second respective agent and a second respective node, and the means for subtracting are each executable by a computer.

9. The system according to claim 8, further comprising means for automatically removing from the program a respective agent having respective associated numerical quantity which is below a threshold quantity.

10. The system according to claim 8, further comprising means for rendering a respective agent having a respective associated numerical quantity which is below a threshold quantity inactive so that said respective agent is unable to bid.

11. The system according to claim 8, in which the numerical quantities of the agents are automatically respectively adjusted so as to increase the numerical quantity of each agent whose action or actions leads to a path which achieves a desired goal.

12. The system according to claim 8, in which the numerical quantities of the agents are automatically respectively adjusted so as to increase the numerical quantity of only the agent or agents whose action or actions leads to a path which achieves a desired goal.

13. The system according to claim 8, in which a plurality of paths accomplish a desired goal and in which the respective numerical quantity or quantities of only the agent or agents along a first path obtained from the plurality of paths are increased.

14. The system according to claim 8, further comprising means for automatically modifying an existing agent so as to create a new agent.

15. A computer system to construct a computer program to search for a solution achieving one or more goals in a domain, the system comprising:
   a device to specify an initial node and providing a number of other nodes each representing a state of the domain;
   a device to obtain a plurality of agents each having a respective numerical quantity associated therewith and each for producing one or more numerical bids and for proposing one or more actions;
   a device to automatically select a first respective agent and a first respective node based on one or more bids from the plurality of agents;
   a device to automatically add a new node representing a new state which is obtained by applying to a respective state represented by the first respective node an action proposed by the first respective agent;
   a device to automatically select a second respective agent and a second respective node different from the first respective node and different from said new node based on bids from the plurality of agents, in which the second respective agent and the second respective node are selected after the first respective agent and the first respective node are selected, and in which the first respective node and the second respective node each have a respective depth associated therewith in which the respective depth of a respective node is representative of a minimum number of sequential actions applied to reach the respective node from said initial node, and in which the depth of the second respective node is less than the depth of the first respective node; and
   a device to subtract from the numerical quantity associated with the second respective agent an amount based on the bid of the second respective agent without paying the subtracted amount into the numerical quantity associated with the agent selected immediately before the second respective agent,
   the device to specify, the device to obtain, the device to automatically select a first respective agent and a first respective node, the device to automatically add, the device to automatically select a second respective agent and a second respective node, and the device to subtract are each executable by a computer.

16. The system according to claim 15, further comprising a device to automatically remove from the program a respective agent having respective associated numerical quantity which is below a threshold quantity.

17. The system according to claim 15, further comprising a device render a respective agent having a respective associated numerical quantity which is below a threshold quantity inactive so that said respective agent is unable to bid.

18. The system according to claim 15, in which the numerical quantities of the agents are automatically respectively adjusted so as to increase the numerical quantity of each agent whose action or actions leads to a path which achieves a desired goal.

19. The system according to claim 15, in which the numerical quantities of the agents are automatically respectively adjusted so as to increase the numerical quantity of only the agent or agents whose action or actions leads to a path which achieves a desired goal.

20. The system according to claim 15, in which a plurality of paths accomplish a desired goal and in which the respective numerical quantity or quantities of only the agent or agents along a first path obtained from the plurality of paths are increased.

21. The system according to claim 15, further comprising a device to automatically modify an existing agent so as to create a new agent.

* * * * *